US008738545B2

(12) United States Patent
Abhyanker

(10) Patent No.: US 8,738,545 B2
(45) Date of Patent: May 27, 2014

(54) MAP BASED NEIGHBORHOOD SEARCH AND COMMUNITY CONTRIBUTION

(71) Applicant: Raj Abhyanker, Cupertino, CA (US)

(72) Inventor: Raj Abhyanker, Cupertino, CA (US)

( * ) Notice: Subject to any disclaimer, the term of this patent is extended or adjusted under 35 U.S.C. 154(b) by 0 days.

(21) Appl. No.: 14/144,612

(22) Filed: Dec. 31, 2013

(65) Prior Publication Data

US 2014/0115671 A1     Apr. 24, 2014

(51) Int. Cl.
*H04W 4/02* (2009.01)
*G06F 21/31* (2013.01)
*H04W 4/22* (2009.01)
*H04W 76/00* (2009.01)

(52) U.S. Cl.
CPC ............. *H04W 4/021* (2013.01); *G06W 99/00* (2013.01); *G06F 21/31* (2013.01); *H04W 4/22* (2013.01); *H04W 76/007* (2013.01)
USPC ........................................ 705/325; 705/7.11

(58) Field of Classification Search
CPC .................................................. H04W 4/021
See application file for complete search history.

(56) References Cited

U.S. PATENT DOCUMENTS

| 2,035,218 | A |   | 3/1936  | Bloom              |         |
|-----------|---|---|---------|--------------------|---------|
| 5,325,294 | A |   | 6/1994  | Keene              |         |
| 5,581,630 | A |   | 12/1996 | Bonneau, Jr.       |         |
| 5,590,062 | A |   | 12/1996 | Nagamitsu et al.   |         |
| 5,671,342 | A | * | 9/1997  | Millier et al. ... | 345/418 |
| 5,805,810 | A |   | 9/1998  | Maxwell            |         |
| 5,905,499 | A |   | 5/1999  | McDowall et al.    |         |
| 5,926,765 | A | * | 7/1999  | Sasaki ...........  | 455/456.1 |
| 5,940,806 | A |   | 8/1999  | Danial             |         |
| 6,024,288 | A |   | 2/2000  | Gottlich et al.    |         |
| 6,034,618 | A |   | 3/2000  | Tatebayashi et al. |         |
| 6,036,601 | A |   | 3/2000  | Heckel             |         |
| 6,047,194 | A |   | 4/2000  | Andersson          |         |
| 6,088,702 | A |   | 7/2000  | Plantz et al.      |         |
| 6,229,533 | B1|   | 5/2001  | Farmer et al.      |         |
| 6,308,177 | B1|   | 10/2001 | Israni et al.      |         |
| 6,317,718 | B1| * | 11/2001 | Fano .............. | 705/14.39 |
| 6,336,111 | B1|   | 1/2002  | Ashby et al.       |         |
| 6,401,085 | B1|   | 6/2002  | Gershman et al.    |         |
| 6,408,307 | B1|   | 6/2002  | Semple et al.      |         |
| 6,498,982 | B2|   | 12/2002 | Bellesfield et al. |         |
| 6,532,007 | B1|   | 3/2003  | Matsuda            |         |
| 6,557,013 | B1|   | 4/2003  | Ziff et al.        |         |

(Continued)

FOREIGN PATENT DOCUMENTS

| EP | 1426876 A1     | 6/2004  |
| WO | 2006020471 A1  | 2/2006  |
| WO | 2007113844 A1  | 10/2007 |

*Primary Examiner* — Brett Feeney
(74) *Attorney, Agent, or Firm* — Raj Abhyanker, P.C.

(57) ABSTRACT

A method, apparatus and system of map based neighborhood search and community contribution are disclosed. In one embodiment, a neighborhood communication system is described. This embodiment includes a privacy server to apply an address verification algorithm associated with each user of the online community to verify that each user lives at a residence associated with a claimable residential address of an online community formed through a social community module of the privacy server using a processor and a memory. The privacy server automatically determines a set of access privileges in the online community associated with each user of the online community by constraining access in the online community based on a neighborhood boundary determined using an algorithm of the privacy server. The privacy server may constrain the particular user to communicate through the online community only with a set of neighbors having verified addresses using the privacy server.

27 Claims, 34 Drawing Sheets

(56) References Cited

U.S. PATENT DOCUMENTS

| | | | |
|---|---|---|---|
| 6,615,039 B1 | 9/2003 | Eldering | |
| 6,643,663 B1 | 11/2003 | Dabney et al. | |
| 6,647,383 B1 | 11/2003 | August et al. | |
| 6,658,410 B1 * | 12/2003 | Sakamaki et al. | 1/1 |
| 6,662,016 B1 | 12/2003 | Buckham et al. | |
| 6,711,414 B1 | 3/2004 | Lightman et al. | |
| 6,716,101 B1 | 4/2004 | Meadows et al. | |
| 6,719,570 B2 | 4/2004 | Tsuchioka | |
| 6,721,748 B1 | 4/2004 | Knight et al. | |
| 6,745,196 B1 * | 6/2004 | Colyer et al. | 707/608 |
| 6,798,407 B1 | 9/2004 | Benman | |
| 6,834,229 B2 | 12/2004 | Rafiah et al. | |
| 6,882,307 B1 | 4/2005 | Gifford | |
| 6,950,791 B1 | 9/2005 | Bray et al. | |
| 6,968,179 B1 * | 11/2005 | De Vries | 455/414.1 |
| 6,987,976 B2 | 1/2006 | Kohar et al. | |
| 7,006,881 B1 | 2/2006 | Hoffberg et al. | |
| 7,024,455 B2 | 4/2006 | Yokobori et al. | |
| 7,069,308 B2 | 6/2006 | Abrams | |
| 7,080,019 B1 | 7/2006 | Hurzeler | |
| 7,080,096 B1 | 7/2006 | Imamura | |
| 7,117,254 B2 | 10/2006 | Lunt et al. | |
| 7,158,878 B2 * | 1/2007 | Rasmussen et al. | 701/431 |
| 7,177,872 B2 | 2/2007 | Schwesig et al. | |
| 7,188,153 B2 | 3/2007 | Lunt et al. | |
| 7,251,647 B2 | 7/2007 | Hoblit | |
| 7,293,019 B2 | 11/2007 | Dumais et al. | |
| 7,296,026 B2 | 11/2007 | Patrick et al. | |
| 7,353,034 B2 * | 4/2008 | Haney | 455/457 |
| 7,359,871 B1 | 4/2008 | Paasche et al. | |
| 7,383,251 B2 | 6/2008 | Might | |
| 7,386,542 B2 | 6/2008 | Maybury et al. | |
| 7,424,438 B2 | 9/2008 | Vianello | |
| 7,433,832 B1 | 10/2008 | Bezos et al. | |
| 7,433,868 B1 | 10/2008 | Satomi et al. | |
| 7,437,368 B1 | 10/2008 | Kolluri et al. | |
| 7,441,031 B2 * | 10/2008 | Shrinivasan et al. | 709/225 |
| 7,447,771 B1 | 11/2008 | Taylor | |
| 7,477,285 B1 | 1/2009 | Johnson | |
| 7,478,324 B1 | 1/2009 | Ohtsu | |
| 7,505,919 B2 | 3/2009 | Richardson | |
| 7,562,023 B2 | 7/2009 | Yamamoto | |
| 7,587,276 B2 | 9/2009 | Gold et al. | |
| 7,801,542 B1 | 9/2010 | Stewart | |
| 7,812,717 B1 * | 10/2010 | Cona et al. | 340/506 |
| 7,966,567 B2 * | 6/2011 | Abhyanker | 715/757 |
| 8,064,590 B2 * | 11/2011 | Abhyanker | 379/266.07 |
| 8,065,291 B2 | 11/2011 | Knorr | |
| 8,073,907 B2 * | 12/2011 | Roumeliotis et al. | 709/204 |
| 8,095,430 B2 * | 1/2012 | Abhyanker | 705/26.41 |
| 8,149,113 B2 * | 4/2012 | Diem | 340/539.13 |
| 8,190,357 B2 * | 5/2012 | Abhyanker et al. | 701/408 |
| 8,204,776 B2 * | 6/2012 | Abhyanker | 705/7.32 |
| 8,422,994 B2 | 4/2013 | Rhoads et al. | |
| 8,433,609 B2 * | 4/2013 | Abhyanker | 705/14.1 |
| 8,447,810 B2 * | 5/2013 | Roumeliotis et al. | 709/204 |
| 8,660,897 B2 * | 2/2014 | Abhyanker | 705/14.64 |
| 2001/0020955 A1 | 9/2001 | Nakagawa et al. | |
| 2001/0036833 A1 | 11/2001 | Koshima et al. | |
| 2001/0042087 A1 | 11/2001 | Kephart et al. | |
| 2001/0049616 A1 | 12/2001 | Khuzadi et al. | |
| 2001/0049636 A1 | 12/2001 | Hudda et al. | |
| 2002/0026388 A1 | 2/2002 | Roebuck | |
| 2002/0030689 A1 | 3/2002 | Eichel et al. | |
| 2002/0038225 A1 | 3/2002 | Klasky et al. | |
| 2002/0049617 A1 | 4/2002 | Lencki et al. | |
| 2002/0065691 A1 * | 5/2002 | Twig et al. | 705/7 |
| 2002/0070967 A1 * | 6/2002 | Tanner et al. | 345/764 |
| 2002/0077901 A1 | 6/2002 | Katz | |
| 2002/0078171 A1 | 6/2002 | Schneider | |
| 2002/0087506 A1 | 7/2002 | Reddy | |
| 2002/0090996 A1 | 7/2002 | Maehiro | |
| 2002/0091556 A1 | 7/2002 | Fiala et al. | |
| 2002/0097267 A1 | 7/2002 | Dinan et al. | |
| 2002/0103892 A1 * | 8/2002 | Rieger, III | 709/223 |
| 2002/0130906 A1 * | 9/2002 | Miyaki | 345/837 |
| 2002/0147638 A1 | 10/2002 | Banerjee et al. | |
| 2002/0156917 A1 | 10/2002 | Nye | |
| 2002/0169662 A1 | 11/2002 | Claiborne | |
| 2002/0184496 A1 | 12/2002 | Mitchell et al. | |
| 2003/0004802 A1 | 1/2003 | Callegari | |
| 2003/0005035 A1 | 1/2003 | Rodgers | |
| 2003/0018521 A1 * | 1/2003 | Kraft et al. | 705/14 |
| 2003/0023489 A1 | 1/2003 | McGuire et al. | |
| 2003/0023586 A1 | 1/2003 | Knorr | |
| 2003/0154213 A1 * | 8/2003 | Ahn | 707/103 X |
| 2003/0177019 A1 * | 9/2003 | Santos et al. | 705/1 |
| 2003/0177192 A1 | 9/2003 | Umeki et al. | |
| 2003/0200192 A1 * | 10/2003 | Bell et al. | 707/1 |
| 2003/0218253 A1 | 11/2003 | Avanzino et al. | |
| 2004/0030525 A1 | 2/2004 | Robinson et al. | |
| 2004/0030741 A1 | 2/2004 | Wolton et al. | |
| 2004/0054428 A1 * | 3/2004 | Sheha et al. | 700/56 |
| 2004/0109012 A1 | 6/2004 | Kraus et al. | |
| 2004/0111302 A1 | 6/2004 | Falk et al. | |
| 2004/0128215 A1 | 7/2004 | Florance et al. | |
| 2004/0135805 A1 | 7/2004 | Gottsacker et al. | |
| 2004/0139049 A1 * | 7/2004 | Hancock et al. | 707/1 |
| 2004/0153466 A1 * | 8/2004 | Ziff et al. | 707/100 |
| 2004/0162064 A1 * | 8/2004 | Himmelstein | 455/422.1 |
| 2004/0166878 A1 | 8/2004 | Erskine et al. | |
| 2004/0167787 A1 | 8/2004 | Lynch et al. | |
| 2004/0186766 A1 | 9/2004 | Fellenstein et al. | |
| 2004/0215559 A1 | 10/2004 | Rebenack et al. | |
| 2004/0217884 A1 | 11/2004 | Samadani et al. | |
| 2004/0217980 A1 | 11/2004 | Radburn et al. | |
| 2004/0257340 A1 | 12/2004 | Jawerth | |
| 2004/0260604 A1 | 12/2004 | Bedingfield | |
| 2005/0018177 A1 | 1/2005 | Rosenberg et al. | |
| 2005/0021750 A1 | 1/2005 | Abrams | |
| 2005/0027723 A1 | 2/2005 | Jones et al. | |
| 2005/0034075 A1 * | 2/2005 | Riegelman et al. | 715/714 |
| 2005/0044061 A1 | 2/2005 | Klemow | |
| 2005/0049671 A1 | 3/2005 | Bettinger | |
| 2005/0055353 A1 * | 3/2005 | Marx et al. | 707/10 |
| 2005/0091027 A1 | 4/2005 | Zaher et al. | |
| 2005/0096977 A1 | 5/2005 | Rossides | |
| 2005/0114783 A1 * | 5/2005 | Szeto | 715/747 |
| 2005/0131761 A1 | 6/2005 | Trika et al. | |
| 2005/0137015 A1 | 6/2005 | Rogers et al. | |
| 2005/0143174 A1 | 6/2005 | Goldman et al. | |
| 2005/0171832 A1 | 8/2005 | Hull et al. | |
| 2005/0171954 A1 | 8/2005 | Hull et al. | |
| 2005/0187823 A1 | 8/2005 | Howes | |
| 2005/0192859 A1 | 9/2005 | Mertins et al. | |
| 2005/0192912 A1 | 9/2005 | Bator et al. | |
| 2005/0192999 A1 | 9/2005 | Cook et al. | |
| 2005/0197775 A1 * | 9/2005 | Smith | 702/3 |
| 2005/0197846 A1 | 9/2005 | Pezaris et al. | |
| 2005/0216186 A1 | 9/2005 | Dorfman et al. | |
| 2005/0240580 A1 | 10/2005 | Zamir et al. | |
| 2005/0251331 A1 * | 11/2005 | Kreft | 701/207 |
| 2005/0273346 A1 * | 12/2005 | Frost | 705/1 |
| 2005/0283497 A1 | 12/2005 | Nurminen et al. | |
| 2005/0288958 A1 * | 12/2005 | Eraker et al. | 705/1 |
| 2006/0004703 A1 | 1/2006 | Spivack et al. | |
| 2006/0004734 A1 | 1/2006 | Malkin et al. | |
| 2006/0023881 A1 | 2/2006 | Akiyama et al. | |
| 2006/0036748 A1 * | 2/2006 | Nusbaum et al. | 709/228 |
| 2006/0089882 A1 | 4/2006 | Shimansky | |
| 2006/0123053 A1 | 6/2006 | Scannell | |
| 2006/0136127 A1 * | 6/2006 | Coch et al. | 701/208 |
| 2006/0136419 A1 * | 6/2006 | Brydon et al. | 707/9 |
| 2006/0149624 A1 | 7/2006 | Baluja et al. | |
| 2006/0178972 A1 | 8/2006 | Jung et al. | |
| 2006/0200384 A1 | 9/2006 | Arutunian et al. | |
| 2006/0238383 A1 * | 10/2006 | Kimchi et al. | 340/995.1 |
| 2006/0248573 A1 * | 11/2006 | Pannu et al. | 726/1 |
| 2006/0270421 A1 | 11/2006 | Phillips et al. | |
| 2007/0002057 A1 | 1/2007 | Danzig et al. | |
| 2007/0003182 A1 | 1/2007 | Hunn | |
| 2007/0011148 A1 | 1/2007 | Burkey et al. | |
| 2007/0011617 A1 | 1/2007 | Akagawa et al. | |
| 2007/0033064 A1 | 2/2007 | Abrahamsohn | |

(56) References Cited

U.S. PATENT DOCUMENTS

| | | |
|---|---|---|
| 2007/0078747 A1 | 4/2007 | Baack |
| 2007/0105536 A1* | 5/2007 | Tingo .................... 455/414.1 |
| 2007/0106627 A1 | 5/2007 | Srivastava et al. |
| 2007/0112729 A1* | 5/2007 | Wiseman et al. ................ 707/3 |
| 2007/0150375 A1 | 6/2007 | Yang |
| 2007/0150603 A1 | 6/2007 | Crull et al. |
| 2007/0162547 A1* | 7/2007 | Ross ............................ 709/204 |
| 2007/0162942 A1* | 7/2007 | Hamynen et al. ............ 725/105 |
| 2007/0167204 A1 | 7/2007 | Lyle et al. |
| 2007/0208802 A1* | 9/2007 | Barman et al. ................ 709/203 |
| 2007/0218900 A1* | 9/2007 | Abhyanker ................ 455/435.1 |
| 2007/0219659 A1* | 9/2007 | Abhyanker et al. ............. 700/98 |
| 2007/0219712 A1* | 9/2007 | Abhyanker .................... 701/208 |
| 2007/0220174 A1* | 9/2007 | Abhyanker .................... 709/250 |
| 2007/0233291 A1 | 10/2007 | Herde et al. |
| 2007/0233367 A1 | 10/2007 | Chen et al. |
| 2007/0233375 A1 | 10/2007 | Garg et al. |
| 2007/0233582 A1* | 10/2007 | Abhyanker .................... 705/28 |
| 2007/0239552 A1* | 10/2007 | Sundaresan .................... 705/26 |
| 2007/0245002 A1* | 10/2007 | Nguyen et al. ................ 709/223 |
| 2007/0250321 A1 | 10/2007 | Balusu |
| 2007/0260599 A1* | 11/2007 | McGuire et al. ................... 707/5 |
| 2007/0266097 A1 | 11/2007 | Harik et al. |
| 2007/0273558 A1 | 11/2007 | Smith et al. |
| 2007/0281689 A1* | 12/2007 | Altman et al. ............. 455/435.1 |
| 2007/0288621 A1 | 12/2007 | Gundu et al. |
| 2007/0294357 A1* | 12/2007 | Antoine ........................ 709/206 |
| 2008/0005231 A1 | 1/2008 | Kelley et al. |
| 2008/0020814 A1 | 1/2008 | Kernene |
| 2008/0032666 A1* | 2/2008 | Hughes et al. ............. 455/404.1 |
| 2008/0032703 A1 | 2/2008 | Krumm et al. |
| 2008/0051932 A1 | 2/2008 | Jermyn et al. |
| 2008/0070593 A1* | 3/2008 | Altman et al. ................ 455/457 |
| 2008/0071929 A1 | 3/2008 | Motte et al. |
| 2008/0077642 A1 | 3/2008 | Carbone et al. |
| 2008/0086368 A1 | 4/2008 | Bauman et al. |
| 2008/0091723 A1 | 4/2008 | Zuckerberg et al. |
| 2008/0097999 A1* | 4/2008 | Horan ............................. 707/10 |
| 2008/0104227 A1* | 5/2008 | Birnie et al. .................. 709/224 |
| 2008/0115082 A1 | 5/2008 | Simmons et al. |
| 2008/0117928 A1* | 5/2008 | Abhyanker .................... 370/431 |
| 2008/0126355 A1 | 5/2008 | Rowley |
| 2008/0126476 A1 | 5/2008 | Nicholas et al. |
| 2008/0126478 A1 | 5/2008 | Ferguson et al. |
| 2008/0148156 A1 | 6/2008 | Brewer et al. |
| 2008/0154733 A1 | 6/2008 | Wolfe |
| 2008/0155019 A1 | 6/2008 | Wallace et al. |
| 2008/0162211 A1 | 7/2008 | Addington |
| 2008/0162260 A1 | 7/2008 | Rohan et al. |
| 2008/0168068 A1* | 7/2008 | Hutheesing .................... 707/10 |
| 2008/0168175 A1* | 7/2008 | Tran ............................ 709/229 |
| 2008/0172173 A1* | 7/2008 | Chang et al. .................. 701/207 |
| 2008/0172288 A1 | 7/2008 | Pilskalns et al. |
| 2008/0201156 A1* | 8/2008 | Abhyanker .................... 705/1 |
| 2008/0208956 A1 | 8/2008 | Spiridellis et al. |
| 2008/0215994 A1 | 9/2008 | Harrison et al. |
| 2008/0221846 A1 | 9/2008 | Aggarwal et al. |
| 2008/0221984 A1* | 9/2008 | Abhyanker .................... 705/14 |
| 2008/0222308 A1* | 9/2008 | Abhyanker .................... 709/245 |
| 2008/0228719 A1* | 9/2008 | Abhyanker et al. ............. 707/3 |
| 2008/0228775 A1* | 9/2008 | Abhyanker et al. ........... 707/10 |
| 2008/0229424 A1* | 9/2008 | Harris et al. .................... 726/26 |
| 2008/0231630 A1 | 9/2008 | Shenkar et al. |
| 2008/0240397 A1* | 10/2008 | Abhyanker ............. 379/218.01 |
| 2008/0242317 A1* | 10/2008 | Abhyanker ................ 455/456.3 |
| 2008/0243598 A1* | 10/2008 | Abhyanker .................... 705/12 |
| 2008/0243667 A1 | 10/2008 | Lecomte |
| 2008/0250025 A1* | 10/2008 | Abhyanker .................... 707/10 |
| 2008/0255759 A1* | 10/2008 | Abhyanker .................... 701/209 |
| 2008/0263460 A1 | 10/2008 | Altberg et al. |
| 2008/0270158 A1* | 10/2008 | Abhyanker .................... 705/1 |
| 2008/0270945 A1* | 10/2008 | Abhyanker .................... 715/848 |
| 2008/0281854 A1* | 11/2008 | Abhyanker .................... 707/102 |
| 2008/0288277 A1 | 11/2008 | Fasciano |
| 2008/0294678 A1 | 11/2008 | Gorman et al. |
| 2008/0294747 A1* | 11/2008 | Abhyanker .................... 709/218 |
| 2008/0300979 A1* | 12/2008 | Abhyanker .................... 705/14 |
| 2008/0301565 A1* | 12/2008 | Abhyanker .................... 715/744 |
| 2008/0306754 A1* | 12/2008 | Abhyanker .................... 705/1 |
| 2008/0307053 A1 | 12/2008 | Mitnick et al. |
| 2008/0307066 A1 | 12/2008 | Amidon et al. |
| 2008/0307320 A1 | 12/2008 | Payne et al. |
| 2008/0319778 A1* | 12/2008 | Abhyanker .................... 705/1 |
| 2008/0319806 A1* | 12/2008 | Abhyanker .................... 705/5 |
| 2009/0003265 A1 | 1/2009 | Agarwal et al. |
| 2009/0006177 A1 | 1/2009 | Beaver et al. |
| 2009/0006473 A1 | 1/2009 | Elliott et al. |
| 2009/0007195 A1 | 1/2009 | Beyabani |
| 2009/0015582 A1* | 1/2009 | Abhyanker .................... 345/419 |
| 2009/0018850 A1* | 1/2009 | Abhyanker .................... 705/1 |
| 2009/0018925 A1* | 1/2009 | Abhyanker .................... 705/26 |
| 2009/0019004 A1* | 1/2009 | Abhyanker .................... 707/3 |
| 2009/0019085 A1* | 1/2009 | Abhyanker .................... 707/104.1 |
| 2009/0019122 A1* | 1/2009 | Abhyanker .................... 709/206 |
| 2009/0019366 A1* | 1/2009 | Abhyanker .................... 715/706 |
| 2009/0019373 A1* | 1/2009 | Abhyanker .................... 715/751 |
| 2009/0024740 A1* | 1/2009 | Abhyanker .................... 709/225 |
| 2009/0030927 A1 | 1/2009 | Cases et al. |
| 2009/0031006 A1 | 1/2009 | Johnson |
| 2009/0031245 A1 | 1/2009 | Brezina et al. |
| 2009/0043650 A1* | 2/2009 | Abhyanker et al. ............. 705/14 |
| 2009/0044254 A1 | 2/2009 | Tian |
| 2009/0061883 A1* | 3/2009 | Abhyanker .................... 455/445 |
| 2009/0061902 A1* | 3/2009 | Abhyanker .................... 455/456.3 |
| 2009/0063252 A1* | 3/2009 | Abhyanker .................... 705/10 |
| 2009/0063467 A1* | 3/2009 | Abhyanker .................... 707/5 |
| 2009/0063500 A1 | 3/2009 | Zhai et al. |
| 2009/0063565 A1* | 3/2009 | Abhyanker .................... 707/104.1 |
| 2009/0064011 A1* | 3/2009 | Abhyanker .................... 715/764 |
| 2009/0064144 A1* | 3/2009 | Abhyanker .................... 718/100 |
| 2009/0069034 A1* | 3/2009 | Abhyanker .................... 455/456.3 |
| 2009/0070435 A1* | 3/2009 | Abhyanker .................... 709/218 |
| 2009/0254971 A1 | 10/2009 | Herz et al. |
| 2009/0284530 A1 | 11/2009 | Lester et al. |
| 2010/0024045 A1 | 1/2010 | Sastry et al. |
| 2010/0079338 A1 | 4/2010 | Wooden et al. |
| 2010/0197279 A1* | 8/2010 | Krco et al. .................... 455/412.2 |
| 2011/0066648 A1* | 3/2011 | Abhyanker et al. ............. 707/770 |
| 2011/0093340 A1 | 4/2011 | Kramer et al. |
| 2011/0184643 A1* | 7/2011 | Abhyanker .................... 701/201 |
| 2011/0219318 A1* | 9/2011 | Abhyanker .................... 715/757 |
| 2011/0291851 A1* | 12/2011 | Whisenant .................... 340/686.1 |
| 2012/0084289 A1 | 4/2012 | Hutheesing |
| 2012/0166935 A1* | 6/2012 | Abhyanker .................... 715/234 |
| 2012/0324018 A1 | 12/2012 | Metcalf et al. |
| 2013/0041761 A1 | 2/2013 | Voda |
| 2013/0054317 A1* | 2/2013 | Abhyanker .................... 705/14.4 |
| 2013/0072114 A1* | 3/2013 | Abhyanker .................... 455/41.1 |
| 2013/0073375 A1* | 3/2013 | Abhyanker .................... 705/14.39 |
| 2013/0080217 A1* | 3/2013 | Abhyanker .................... 705/14.1 |

* cited by examiner

| USER 700 | VERIFIED? 702 | RANGE 704 | PRINCIPAL ADDRESS 706 | LINKS 708 | CONTRIBUTED? 710 | OTHERS 712 |
|---|---|---|---|---|---|---|
| JOE | YES | 5 MILES | 500 CLIFFORD, CUPERTINO CA | 858, BETTE, 854 BETTE | 858, BETTE, 10954 FARALLONE | CITY, STATE, ZIP, OTHER |
| JANE | NO | NOT ENABLED | 500 JOHNSON, CUPERTINO CA | 851 BETTE, 100 STEVEN'S ROAD | 500 HAMILTON, 1905 E. UNIVERSITY | - - - |
| • | • | • | • | • | • | • |
| • | • | • | • | • | • | • |
| • | • | • | • | • | • | • |

TABLE 750

FIGURE 7

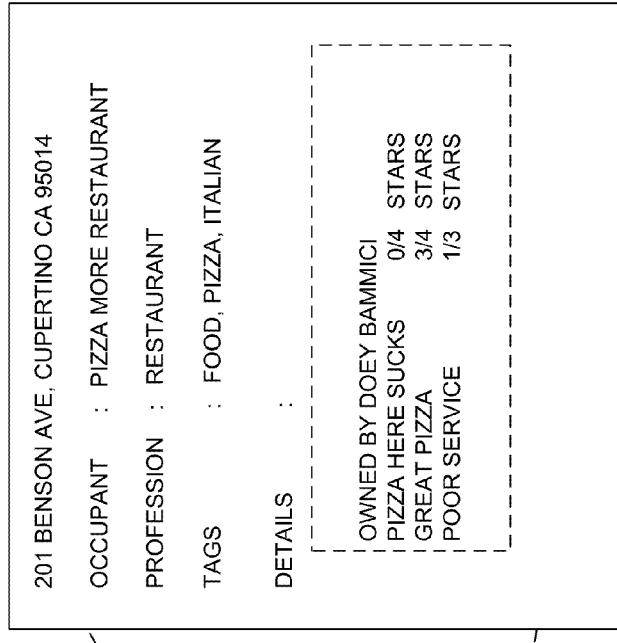
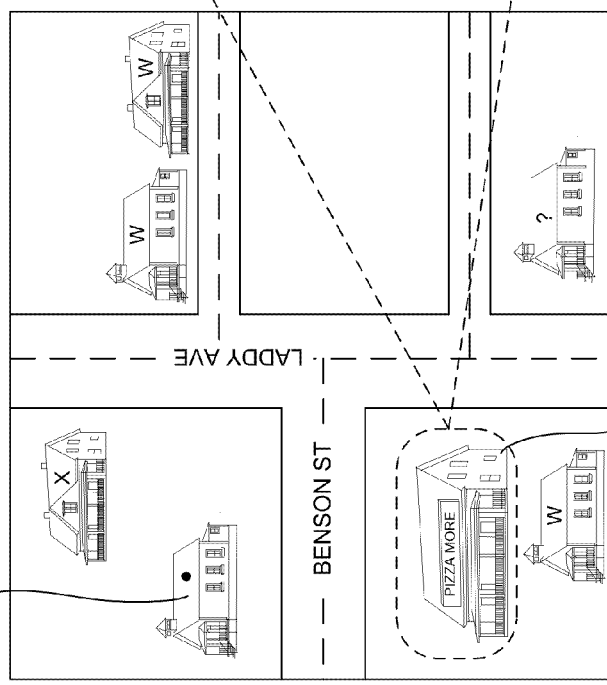
FIGURE 13A

| | | |
|---|---|---|
| EMAIL ADDRESS: | | ← SCREEN 2002 |
| REPEAT EMAIL ADDRESS: | | |
| FIRST NAME: | | |
| LAST NAME: | | |
| PASSWORD: | | |
| REPEAT PASSWORD: | | |
| GENDER: | ○ MALE  ○ FEMALE | |
| INTERESTED IN MEETING PEOPLE FOR: ☑ HOBBIES  ○ FAMILIES  ○ SINGLES ☑ NEIGHBORHOOD WATCH  ○ STUDENTS ☑ FRIENDS ☑ HELP | | |
| ☐ JUST HERE FOR HELP | | |

DID A NEIGHBOR REFER YOU TO FATDOOR?
NEIGHBORS EMAIL ADDRESS: _____
(TO AUTOMATICALLY CONNECT TO YOUR NEIGHBOR AND YOUR NEIGHBOR'S FRIENDS.)

GUI DISPLAY 1802

USER INTERFACE

SCREEN 2004

| | |
|---|---|
| GROUPS: | ○ SCRAPBOOK CLUB ○ BIBLE STUDY GROUP ○ LONE STAR GROUP ○ NEIGHBORHOOD PROTECTORS CLUB |
| DATE OF BIRTH: | ▼  ▼  ▼ |
| COUNTRY: | ▼ |
| ZIP/POSTAL CODE: | _____ (U.S. & CANADA ONLY) |
| HOME TOWN: | _____ (WHERE YOU GREW UP) |
| OCCUPATION: | |
| INTERESTS: | (SEPARATE INTERESTS WITH COMMAS) |

FIGURE 20

MAP BASED NEIGHBORHOOD SEARCH AND COMMUNITY CONTRIBUTION

CLAIMS OF PRIORITY

This patent application claims priority from, and hereby incorporates by reference and claims priority from the entirety of the disclosures of the following cases and each of the cases on which they depend and further claim priority or incorporate by reference:

(1) U.S. Utility patent application Ser. No. 11/603,442 titled 'MAP BASED NEIGHBORHOOD SEARCH AND COMMUNITY CONTRIBUTION' filed on Nov. 22, 2006.

(2) U.S. Utility patent application Ser. No. 11/653,194 titled 'LODGING AND REAL PROPERTY IN A GEO-SPATIAL MAPPING ENVIRONMENT' filed on Jan. 12, 2007, and all provisional cases on which this case depends including 60/783,226 filed on Mar. 17, 2006, 60/817,470 filed on Jun. 28, 2006, 60/853,499 filed on Oct. 19, 2006, and 60/854,230 filed on Oct. 25, 2006.

(3) U.S. Utility patent application Ser. No. 11/827,400 titled 'HOT NEWS NEIGHBORHOOD BANTER IN A GEO-SPATIAL SOCIAL NETWORK' filed on Jul. 10, 2007.

(4) U.S. Utility patent application Ser. No. 11/731,465 titled 'WHITE PAGES AND YELLOW PAGE DIRECTORIES IN A GEO-SPATIAL ENVIRONMENT' filed on Mar. 29, 2007.

(6) U.S. Utility patent application Ser. No. 13/236,964 titled 'NEAR-FIELD COMMUNICATION ENABLED WEARABLE APPAREL GARMENT AND METHOD TO CAPTURE GEOSPATIALLY AND SOCIALLY RELEVANT DATA OF A WEARER OF THE WEARABLE APPAREL GARMENT AND/OR A USER OF A READER DEVICE ASSOCIATED THEREWITH' filed on Sep. 20, 2011.

(7) U.S. Utility patent application Ser. No. 13/242,303 titled 'GEOSPATIALLY CONSTRAINED GASTRONOMIC BIDDING' filed on Sep. 23, 2011.

(8) U.S. Utility patent application Ser. No. 13/272,245 titled 'NEAR-FIELD COMMUNICATION ENABLED WEARABLE APPAREL GARMENT AND METHOD TO CAPTURE GEOSPATIALLY AND SOCIALLY RELEVANT DATA OF A WEARER OF THE WEARABLE APPAREL GARMENT AND/OR A USER OF A READER DEVICE ASSOCIATED THEREWITH' filed on Oct. 13, 2011.

(9) U.S. Provisional patent application number 61/894,443 titled 'RADIO BROADCAST, COMMERCE PUSH-PINS, AND AUTOMATED PAGE UPDATES TO A GEOSPATIALLY CONSTRAINED NEIGHBORHOOD REGION THROUGH AN INTERNET NETWORK AND SEPARATELY A TRACKABLE SOCIAL COMMUNITY FORMED BASED ON TRACKABLE TAG BASED APPAREL THAT CREATES INCENTIVES AND CONNECTIONS BETWEEN USERS WEARING PROMOTIONAL APPAREL AND THOSE OTHER USERS READING THE TRACKABLE TAG ON THE APPAREL' filed on Oct. 23, 2013.

(10) U.S. Utility patent application Ser. No. 14/079,611 titled 'JOB BROADCAST DATA PUBLICATION THROUGH A WORK-OPPORTUNITY LISTING SERVER USING A RADIAL ALGORITHM TO AUTOMATICALLY DISTRIBUTE THE JOB BROADCAST DATA IN A THRESHOLD RADIAL DISTANCE FROM A SET OF GEOSPATIAL COORDINATES ASSOCIATED WITH A MOBILE DEVICE' filed on Nov. 13, 2013.

(11) U.S. Utility patent application Ser. No. 14/089,779 titled 'EMERGENCY INCLUDING CRIME BROADCAST IN A NEIGHBORHOOD SOCIAL NETWORK' filed on Nov. 26, 2013.

(12) U.S. Utility patent application Ser. No. 14/100,034 titled 'SOCIAL CONNECTIONS THROUGH TAGGABLE APPAREL' filed on Dec. 9, 2013.

(13) U.S. Utility patent application Ser. No. 14/102,474 titled 'SHORT-TERM RESIDENTIAL SPACES IN A GEO-SPATIAL MAPPING ENVIRONMENT' filed on Dec. 10, 2013.

(14) U.S. Utility patent application Ser. No. 14/141,432 titled 'HOLIDAY EXPRESSION AND MAPPING IN A GEOSPATIALLY CONSTRAINED SOCIAL NETWORK' filed on Dec. 26, 2013.

FIELD OF TECHNOLOGY

This disclosure relates generally to the technical fields of communications and, in one example embodiment, to a method, apparatus, and system of map based community search and neighborhood contribution.

BACKGROUND

A neighborhood may be a geographically localized community in a larger city, town, and/or suburb. Residents of the neighborhood may refer to each other as neighbors, although this term may also be used across much larger distances in rural areas. In theory, the neighborhood may be small enough that the neighbors may be able to know each other by walking and/or driving a short distance (e.g., 5 miles) around their place of residence and/or their place of work. However, in practice, the neighbors may not know one another very well (e.g., because of busy schedules, fenced communities, lack of effort, a lack of time, etc.).

The neighborhood may be given a designated status through a neighborhood association, a neighborhood watch group, a political group, a homeowners association, and/or a tenant association. These groups may help in matters such as lawn care and fence height, and they may provide such services as block parties, neighborhood parks, children activities, special interest groups, and/or community security. However, getting messages out to residents of the neighborhood may require expensive direct mail, and/or time consuming door to door meetings with residents of the neighborhood.

A neighborhood watch (e.g., a crime watch, a block watch, a neighborhood crime watch, etc.) may be an organization of active residents devoted to crime and/or vandalism prevention in the neighborhood. Members of the neighborhood watch may stay alert of unusual activity, behaviors, and/or crime in the neighborhood. However, most residents may not be active participants of the neighborhood association (e.g., because of a lack of time), and may be unaware of safety, security, and/or prevention issues in their immediate area.

For example, in many American communities, while a few active residents know a lot of their neighbors, there are far more residents who do not even know what professions, interests, and reputations are of their immediate next-door neighbors. As a result, friendships among neighbors don't form as often, neighbors have more difficult time asking other neighbors for help, safety in the neighborhood suffers, quality of life is impacted, and a sense of community is diminishing.

SUMMARY

A method, apparatus and system of map based neighborhood search and community contribution are disclosed. In one aspect, a neighborhood communication system is described. This aspect includes a privacy server to apply an address verification algorithm associated with each user of the online community to verify that each user lives at a residence associated with a claimable residential address of an online community formed through a social community module of the privacy server using a processor and a memory, a network, and a mapping server communicatively coupled with the privacy server through the network to generate a latitudinal data and a longitudinal data associated with each claimable residential address of the online community associated with each user of the online community. The privacy server automatically determines a set of access privileges in the online community associated with each user of the online community by constraining access in the online community based on a neighborhood boundary determined using a Bezier curve algorithm of the privacy server in this aspect.

The privacy server may transform the claimable residential address into a claimed address upon an occurrence of an event. The privacy server may instantiate the event when a particular user is associated with the claimable residential address based on a verification of the particular user as living at a particular residential address associated with the claimable residential address using the privacy server. The privacy server may constrain the particular user to communicate through the online community only with a set of neighbors having verified addresses using the privacy server. The privacy server may define the set of neighbors as other users of the online community that have each verified their addresses in the online community using the privacy server and/or which have each claimed residential addresses that are in a threshold radial distance from the claimed address of the particular user.

The privacy server may constrain the threshold radial distance to be less than a distance of the neighborhood boundary using the Bezier curve algorithm. The privacy server may permit the neighborhood boundary to take on a variety of shapes based on an associated geographic connotation, a historical connotation, a political connotation, and/or a cultural connotation of neighborhood boundaries. The privacy server may apply a database of constraints associated with neighborhood boundaries that are imposed on a map view of the online community when permitting the neighborhood boundary to take on the variety of shapes.

The privacy server may generate a user-generated boundary in a form of a polygon describing geospatial boundaries defining the particular neighborhood when a first user of a particular neighborhood that verifies a first residential address of the particular neighborhood using the privacy server prior to other users in that particular neighborhood verifying their addresses in that particular neighborhood places a set of points defining the particular neighborhood using a set of drawing tools in the map view of the online community. The privacy server may optionally extend the threshold radial distance to an adjacent boundary of an adjacent neighborhood based a request of the particular user. The privacy server may generate a separate login to the online community designed to be usable by a police department, a municipal agency, a neighborhood association, and/or a neighborhood leader associated with the particular neighborhood.

The separate login may permit the police department, the municipal agency, the neighborhood association, and/or the neighborhood leader to: (1) invite residents of the particular neighborhood themselves using the privacy server using a self-authenticating access code that permits new users that enter the self-authenticating access code in the online community to automatically join the particular neighborhood as verified users, (2) generate a virtual neighborhood watch group and/or an emergency preparedness group restricted to users verified in the particular neighborhood using the privacy server, (3) conduct high value crime and/or safety related discussions from local police and/or fire officials that is restricted to users verified in the particular neighborhood using the privacy server, (4) broadcast information across the particular neighborhood, and (5) receive and/or track neighborhood level membership and/or activity to identify leaders from the restricted group of users verified in the particular neighborhood using the privacy server.

The privacy server may permit each of the restricted group of users verified in the particular neighborhood using the privacy server to: (1) share information about a suspicious activity that is likely to affect several neighborhoods, (2) explain about a lost pet that might have wandered into an adjoining neighborhood, (3) rally support from neighbors from multiple neighborhoods to address civic issues, (4) spread information about events comprising a local theater production and/or a neighborhood garage sale, and/or (5) solicit advice and/or recommendations from the restricted group of users verified in the particular neighborhood and/or optionally in the adjacent neighborhood.

The privacy server may flag a neighborhood feed from the particular neighborhood and/or optionally from the adjacent neighborhood as being inappropriate. The privacy server may suspend users that repeatedly communicate self-promotional messages that are inappropriate as voted based on a sensibility of any one of the verified users of the particular neighborhood and/or optionally from the adjacent neighborhood. The privacy server may personalize which nearby neighborhoods that verified users are able to communicate through based on a request of the particular user. The privacy server may permit the neighborhood leader to communicate privately with leaders of an adjoining neighborhood to plan and/or organize on behalf of an entire constituency of verified users of the particular neighborhood associated with the neighborhood leader.

The privacy server may filter feeds to only display messages from the particular neighborhood associated with each verified user. The privacy server may restrict posts only in the particular neighborhood to verified users having verified addresses within the neighborhood boundary. The address verification algorithm of the privacy server utilizes a set of verification methods to perform verification of the particular user through any of a: (1) a postcard verification method through which the privacy server generates a physical postcard that is postal mailed to addresses of requesting users in the particular neighborhood and/or having a unique alphanumeric sequence in a form of an access code printed thereon which authenticates users that enter the access code to view and/or search privileges in the particular neighborhood of the online community, (2) a credit card verification method through which the privacy server verifies the claimable residential address when at least one a credit card billing address and/or a debit card billing address is matched with an inputted address through an authentication services provider, (3) a privately-published access code method through which the privacy server communicates to user profiles of the police department, the municipal agency, the neighborhood association, and/or the neighborhood leader an instant access code that is printable at town hall meetings and/or gatherings sponsored by any one of the police department, the municipal agency, the neighborhood association, and/or the neighborhood leader, (4) a neighbor vouching method through which the privacy server authenticates new users when existing verified users agree to a candidacy of new users in the particular neighborhood, (5) a phone verification method through which the privacy server authenticates new users whose phone number is matched with an inputted phone number through the authentication services provider, and (6) a social security verification method through which the privacy server authenticates new users whose social security number is matched with an inputted social security number through the authentication services provider.

The privacy server may initially set the particular neighborhood to a pilot phase status in which the online community of the particular neighborhood is provisionally defined until a minimum number of users verify their residential addresses in the particular neighborhood through the privacy server. The privacy server may automatically delete profiles of users that remain unverified after a threshold window of time. The neighborhood communication system may be designed to create private websites to facilitate communication among neighbors and/or build stronger neighborhoods.

In another aspect a method of a neighborhood communication system is described. The method includes applying an address verification algorithm associated with each user of the online community using a privacy server, verifying that each user lives at a residence associated with a claimable residential address of an online community formed through a social community module of the privacy server using a processor and a memory, generating a latitudinal data and a longitudinal data associated with each claimable residential address of the online community associated with each user of the online community, and determining a set of access privileges in the online community associated with each user of the online community by constraining access in the online community based on a neighborhood boundary determined using a Bezier curve algorithm of the privacy server.

The method may transform the claimable residential address into a claimed address upon an occurrence of an event. The method may instantiate the event when a particular user is associated with the claimable residential address based on a verification of the particular user as living at a particular residential address associated with the claimable residential address using the privacy server. The method may constrain the particular user to communicate through the online community only with a set of neighbors having verified addresses using the privacy server. The method may define the set of neighbors as other users of the online community that have each verified their addresses in the online community using the privacy server and/or which have each claimed residential addresses that are in a threshold radial distance from the claimed address of the particular user. The method may constrain the threshold radial distance to be less than a distance of the neighborhood boundary using the Bezier curve algorithm.

In addition, the method may define a neighborhood boundary to take on a variety of shapes based on an associated geographic connotation, a historical connotation, a political connotation, and/or a cultural connotation of neighborhood boundaries. The method may apply a database of constraints associated with neighborhood boundaries that are imposed on a map view of the online community when permitting the neighborhood boundary to take on the variety of shapes. The method may generate a user-generated boundary in a form of a polygon describing geospatial boundaries defining the particular neighborhood when a first user of a particular neighborhood that verifies a first residential address of the particular neighborhood using the privacy server prior to other users in that particular neighborhood verifying their addresses in that particular neighborhood places a set of points defining the particular neighborhood using a set of drawing tools in the map view of the online community. The method may optionally extend the threshold radial distance to an adjacent boundary of an adjacent neighborhood based a request of the particular user. The method may generate a separate login to the online community designed to be usable by a police department, a municipal agency, a neighborhood association, and/or a neighborhood leader associated with the particular neighborhood.

The method may permit the police department, the municipal agency, the neighborhood association, and/or the neighborhood leader to: (1) invite residents of the particular neighborhood themselves using the privacy server using a self-authenticating access code that permits new users that enter the self-authenticating access code in the online community to automatically join the particular neighborhood as verified users, (2) generate a virtual neighborhood watch group and/or an emergency preparedness group restricted to users verified in the particular neighborhood using the privacy server, (3) conduct high value crime and/or safety related discussions from local police and/or fire officials that is restricted to users verified in the particular neighborhood using the privacy server, (4) broadcast information across the particular neighborhood, and/or (5) receive and/or track neighborhood level membership and/or activity to identify leaders from the restricted group of users verified in the particular neighborhood using the privacy server.

The method may permit each of the restricted group of users verified in the particular neighborhood using the privacy server to: (1) share information about a suspicious activity that is likely to affect several neighborhoods, (2) explain about a lost pet that might have wandered into an adjoining neighborhood, (3) rally support from neighbors from multiple neighborhoods to address civic issues, (4) spread information about events comprising a local theater production and/or a neighborhood garage sale, and/or (5) solicit advice and/or recommendations from the restricted group of users verified in the particular neighborhood and/or optionally in the adjacent neighborhood.

The method may flag a neighborhood feed from the particular neighborhood and/or optionally from the adjacent neighborhood as being inappropriate. The method may suspend users that repeatedly communicate self-promotional messages that are inappropriate as voted based on a sensibility of any one of the verified users of the particular neighborhood and/or optionally from the adjacent neighborhood. The method may personalize which nearby neighborhoods that verified users are able to communicate through based on a request of the particular user. The method may permit the neighborhood leader to communicate privately with leaders of an adjoining neighborhood to plan and/or organize on behalf of an entire constituency of verified users of the particular neighborhood associated with the neighborhood leader.

The method may filter feeds to only display messages from the particular neighborhood associated with each verified user. The method may restrict posts only in the particular neighborhood to verified users having verified addresses within the neighborhood boundary. The method may utilize a set of verification methods to perform verification of the particular user through: (1) generating a physical postcard that is postal mailed to addresses of requesting users in the particular neighborhood and/or having a unique alphanumeric sequence in a form of an access code printed thereon which authenticates users that enter the access code to view and/or search privileges in the particular neighborhood of the online community. (2) verifying the claimable residential address when at least one a credit card billing address and/or a debit card billing address is matched with an inputted address through an authentication services provider. (3) communicating to user profiles of the police department, the municipal agency, the neighborhood association, and/or the neighborhood leader an instant access code that is printable at town hall meetings and/or gatherings sponsored by any one of the police department, the municipal agency, the neighborhood association, and/or the neighborhood leader. (4) authenticating new users when existing verified users agree to a candidacy of new users in the particular neighborhood. (5) authenticating new users whose phone number is matched with an inputted phone number through the authentication services provider. (6) authenticating new users whose social security number is matched with an inputted social security number through the authentication services provider.

The method may initially set the particular neighborhood to a pilot phase status in which the online community of the particular neighborhood is provisionally defined until a minimum number of users verify their residential addresses in the particular neighborhood through the privacy server. The method may automatically delete profiles of users that remain unverified after a threshold window of time. The neighborhood communication system may be designed to create private websites to facilitate communication among neighbors and/or build stronger neighborhoods.

In yet another aspect, another neighborhood communication system is described. This aspect includes a privacy server to apply an address verification algorithm associated with each user of the online community to verify that each user lives at a residence associated with a claimable residential address of an online community formed through a social community module of the privacy server using a processor and a memory, a network, and a mapping server communicatively coupled with the privacy server through the network to generate a latitudinal data and a longitudinal data associated with each claimable residential address of the online community associated with each user of the online community. The privacy server automatically determines a set of access privileges in the online community associated with each user of the online community by constraining access in the online community based on a neighborhood boundary determined using a Bezier curve algorithm of the privacy server in this aspect.

In addition, in this yet another aspect the privacy server transforms the claimable residential address into a claimed address upon an occurrence of an event. The privacy server instantiates the event when a particular user is associated with the claimable residential address based on a verification of the particular user as living at a particular residential address associated with the claimable residential address using the privacy server in this yet another aspect. The privacy server constrains the particular user to communicate through the online community only with a set of neighbors having verified addresses using the privacy server in this yet another aspect. The privacy server defines the set of neighbors as other users of the online community that have each verified their addresses in the online community using the privacy server and which have each claimed residential addresses that are in a threshold radial distance from the claimed address of the particular user in this yet another aspect.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 7 is a table view of user address details, according to one embodiment.

FIG. 13A is a user interface view of mapping of a claimable profile of the commercial user, according to one embodiment.

FIG. 20 is an exemplary graphical user interface view for data collection, according to one embodiment.

Figure 1:
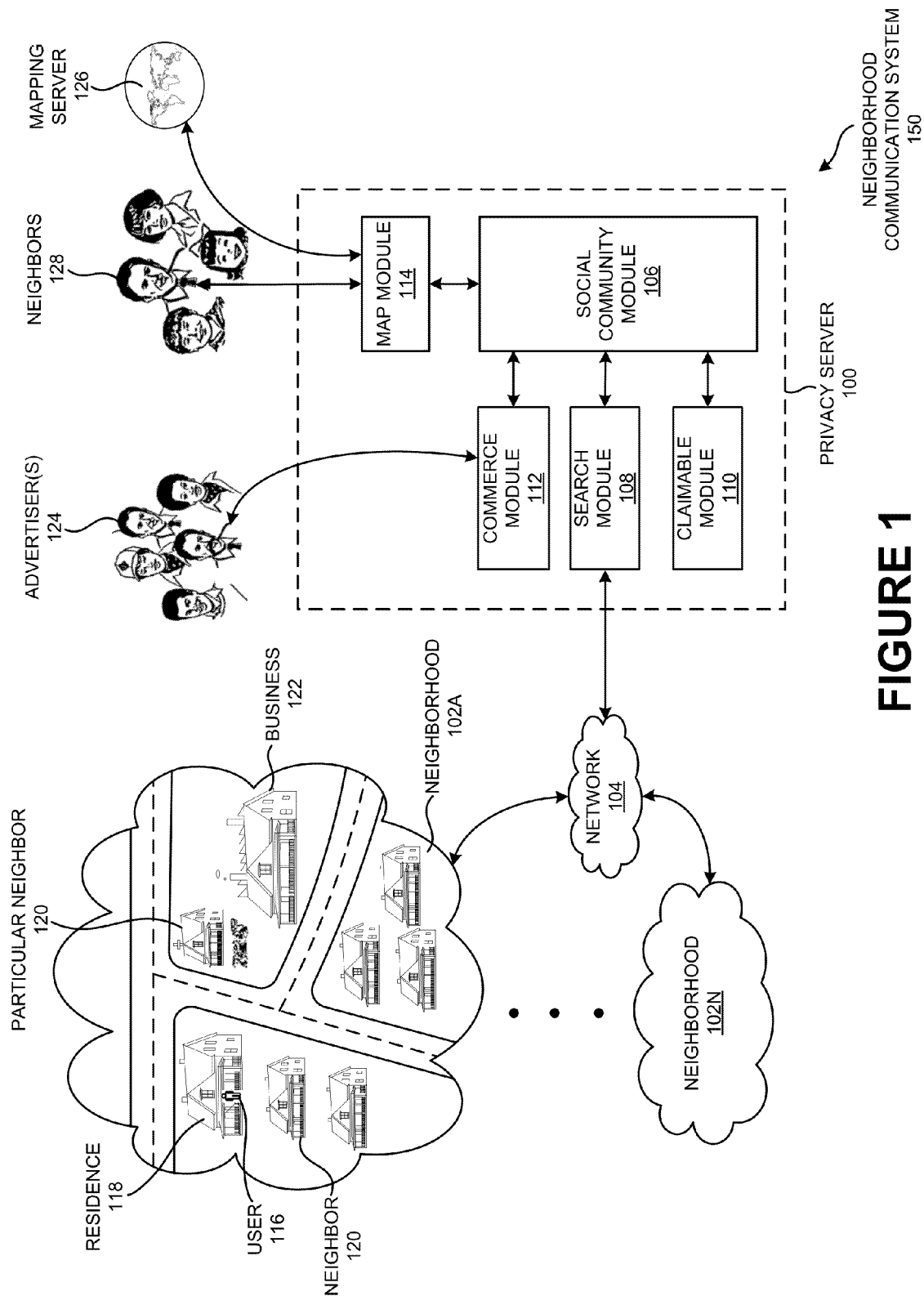
FIG. 1 is a system view of a global neighborhood environment communicating with the neighborhood(s) through a network, an advertiser(s), a global map data and an occupant data according to one embodiment.

Other features of the present embodiments will be apparent from the accompanying drawings and from the detailed description that follows.

DETAILED DESCRIPTION

A method, apparatus and system of map based neighborhood search and community contribution are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a neighborhood communication system 150 is described. This embodiment includes a privacy server 100 to apply an address verification algorithm (e.g., using verify module 206 of FIG. 2) associated with each user of the online community (e.g., as shown in the social community view 850 of FIG. 8 formed through the neighborhood network module as described in FIG. 10) to verify that each user lives at a residence associated with a claimable residential address (e.g., using sub-modules of the claimable module 110 as described in FIG. 3) of an online community (e.g., as shown in the social community view 850 of FIG. 8 formed through the neighborhood network module as described in FIG. 10) formed through a social community module 106 of the privacy server 100 using a processor 1102 and a memory (e.g., as described in FIG. 11).

Figure 3:
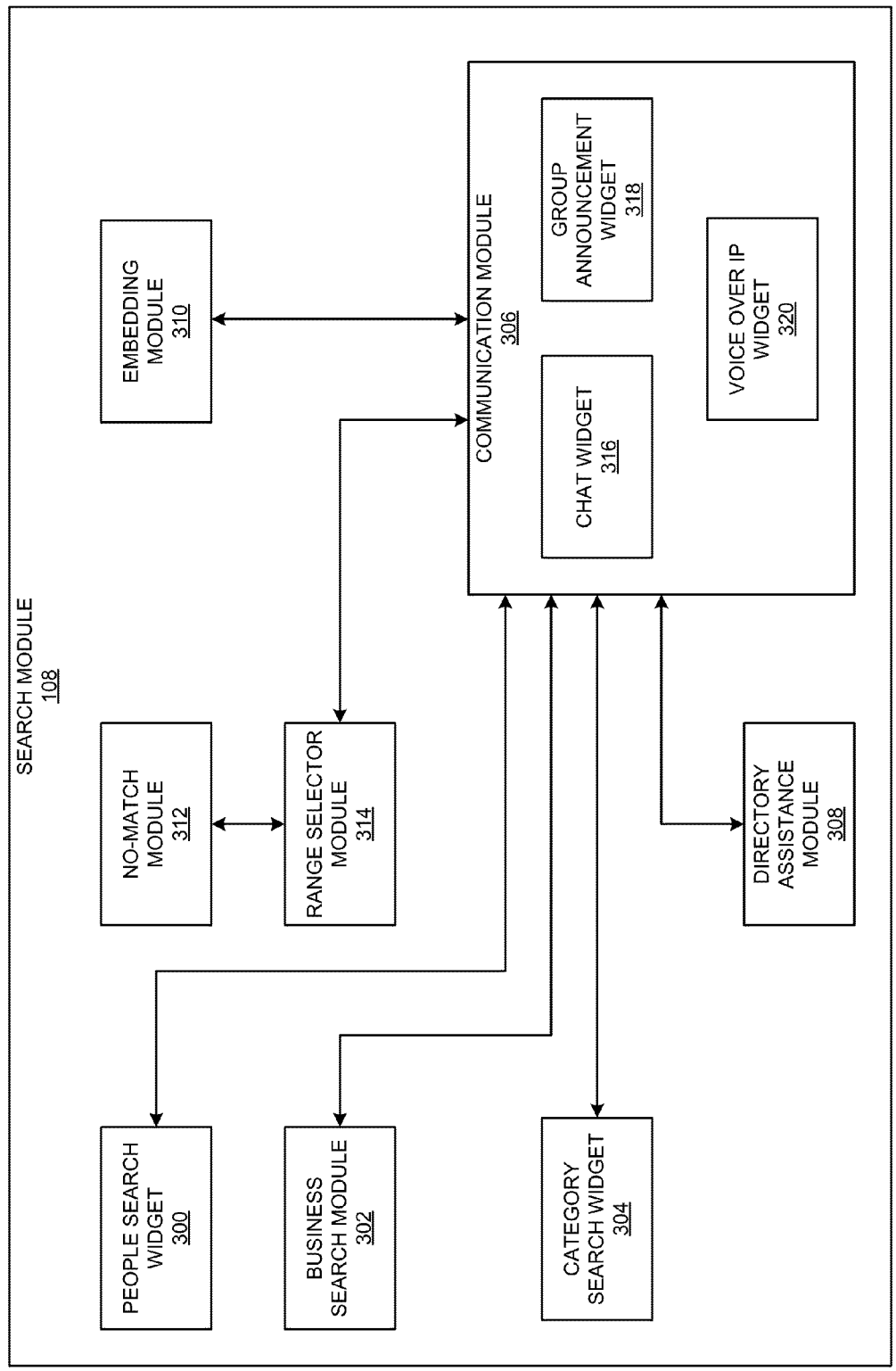
FIG. 3 is an exploded view of a search module of FIG. 1, according to one embodiment.

A network 104, and a mapping server 126 (e.g., providing global map data) communicatively coupled with the privacy server 100 through the network 104 generate a latitudinal data and a longitudinal data associated with each claimable residential address (e.g., using sub-modules of the claimable module 110 as described in FIG. 3) of the online community (e.g., as shown in the social community view 850 of FIG. 8 formed through the neighborhood network module as described in FIG. 10) associated with each user of the online community (e.g., as shown in the social community view 850 of FIG. 8 formed through the neighborhood network module as described in FIG. 10) in this embodiment.

The privacy server 100 automatically determines a set of access privileges in the online community (e.g., as shown in the social community view 850 of FIG. 8 formed through the neighborhood network module as described in FIG. 10) associated with each user of the online community (e.g., as shown in the social community view 850 of FIG. 8 formed through the neighborhood network module as described in FIG. 10) by constraining access in the online community (e.g., as shown in the social community view 850 of FIG. 8 formed through the neighborhood network module as described in FIG. 10) based on a neighborhood boundary determined using a Bezier curve algorithm 240 of the privacy server 100 in this embodiment.

The privacy server 100 (e.g., a hardware device of a global neighborhood environment) may transform the claimable residential address (e.g., using sub-modules of the claimable module 110 as described in FIG. 3) into a claimed address upon an occurrence of an event. The privacy server 100 may instantiate the event when a particular user 116 is associated with the claimable residential address (e.g., using sub-modules of the claimable module 110 as described in FIG. 3) based on a verification of the particular user 116 as living at a particular residential address (e.g., associated with the residence 118 of FIG. 1) associated with the claimable residential address (e.g., using sub-modules of the claimable module 110 as described in FIG. 3) using the privacy server 100. The privacy server 100 may constrain the particular user 116 to communicate through the online community (e.g., as shown in the social community view 850 of FIG. 8 formed through the neighborhood network module as described in FIG. 10) only with a set of neighbors 128 (e.g., such as the particular neighbor 120 of FIG. 1 forming an occupant data) having verified addresses using the privacy server 100. The privacy server 100 may define the set of neighbors 128 (e.g., such as the particular neighbor 120 of FIG. 1) as other users of the online community (e.g., as shown in the social community view 850 of FIG. 8 formed through the neighborhood network module as described in FIG. 10) that have each verified their addresses in the online community (e.g., as shown in the social community view 850 of FIG. 8 formed through the neighborhood network module as described in FIG. 10) using the privacy server 100 and/or which have each claimed residential addresses that are in a threshold radial distance from the claimed address of the particular user 116.

The privacy server 100 may constrain the threshold radial distance to be less than a distance of the neighborhood boundary using the Bezier curve algorithm 240. The privacy server 100 may permit the neighborhood boundary to take on a variety of shapes based on an associated geographic connotation, a historical connotation, a political connotation, and/or a cultural connotation of neighborhood boundaries. The privacy server 100 may apply a database of constraints (e.g., the databases of FIG. 2 including the places database 218) associated with neighborhood boundaries that are imposed on a map view of the online community (e.g., as shown in the social community view 850 of FIG. 8 formed through the neighborhood network module as described in FIG. 10) when permitting the neighborhood boundary to take on the variety of shapes.

Figure 8:
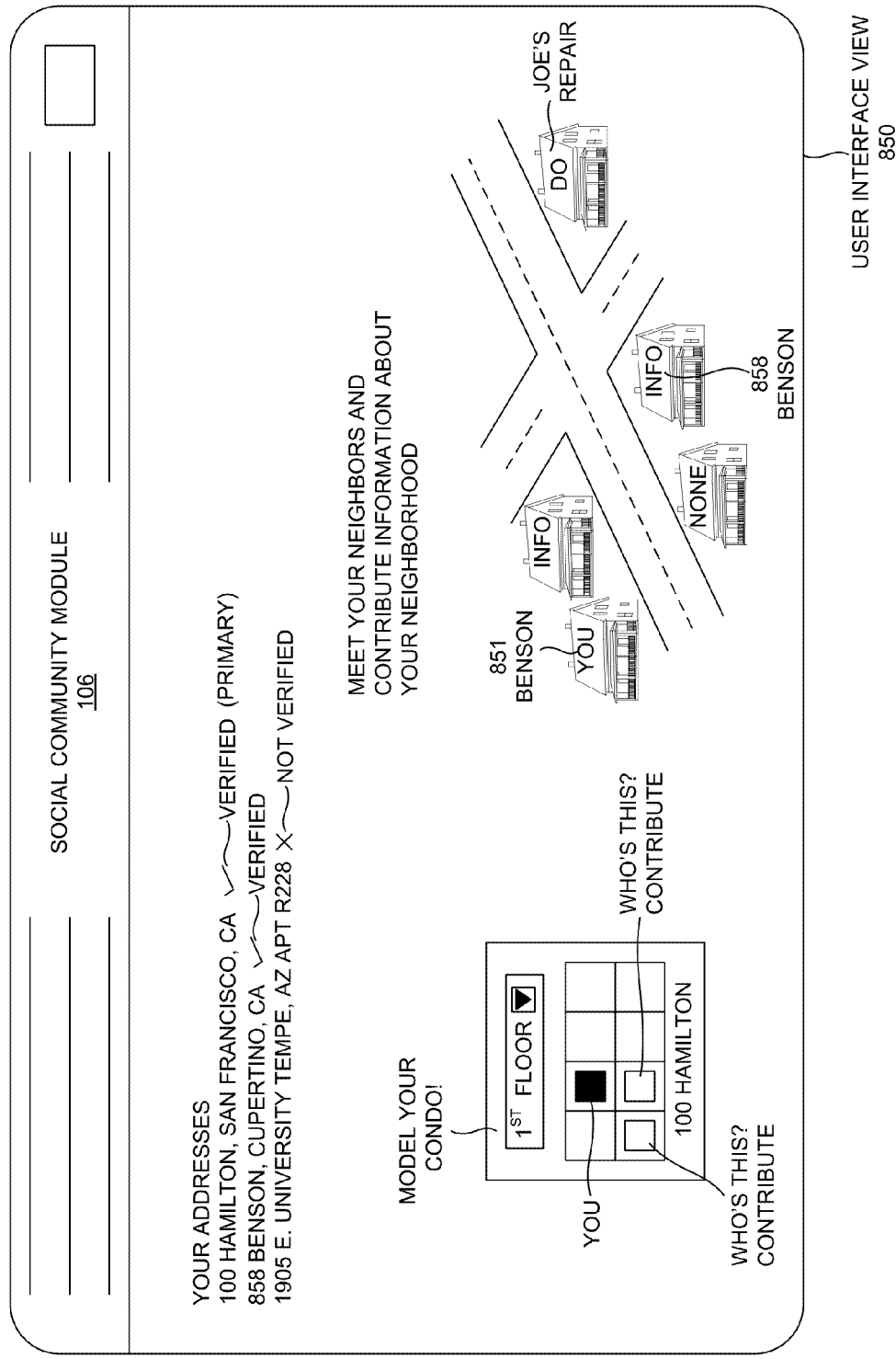
FIG. 8 is a social community view of a social community module, according to one embodiment.
Figure 10:
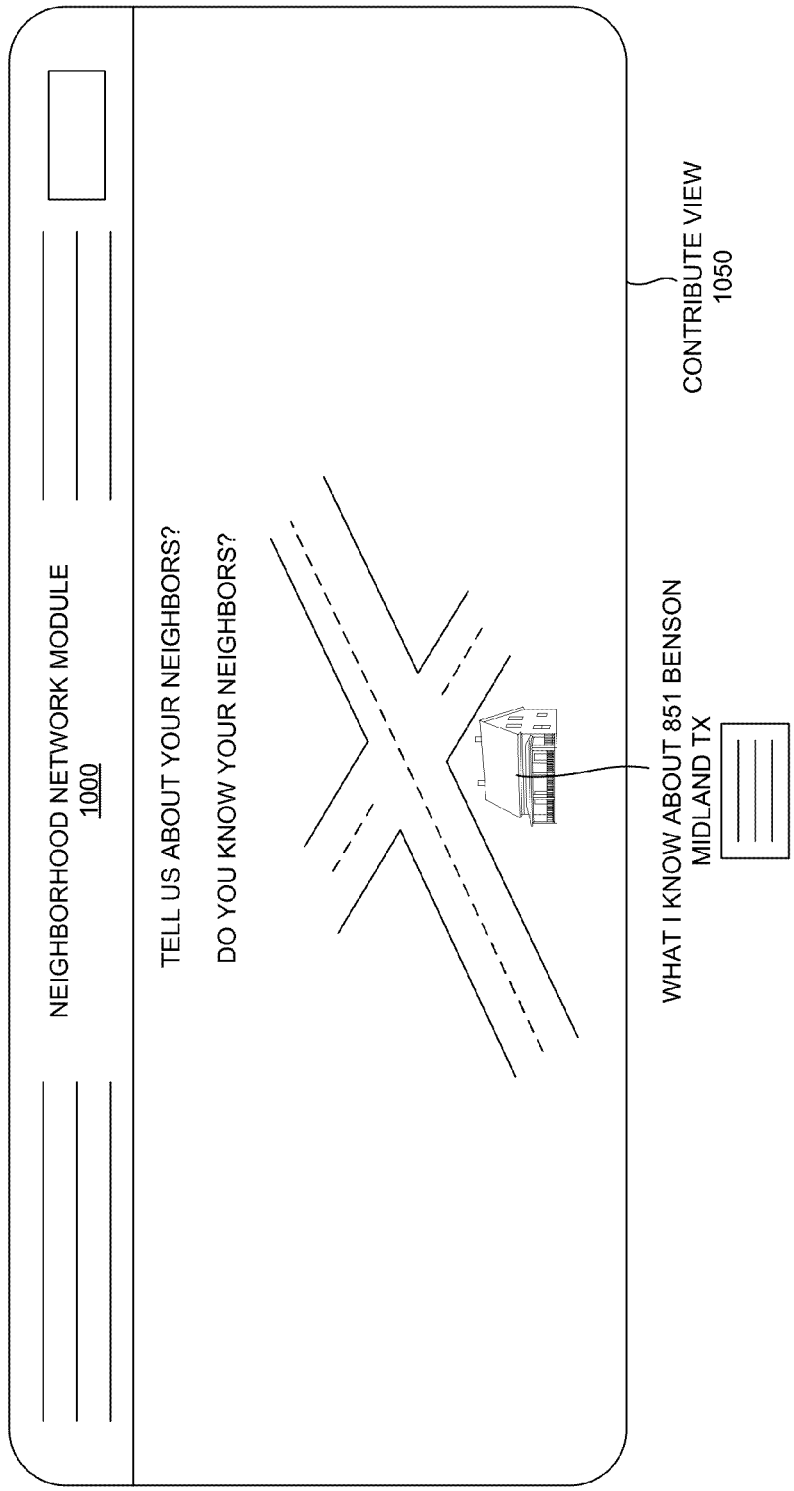
FIG. 10 is a contribute view of a neighborhood network module, according to one embodiment.

The privacy server 100 may generate a user-generated boundary in a form of a polygon describing geospatial boundaries defining the particular neighborhood when a first user of a particular neighborhood that verifies a first residential address of the particular neighborhood using the privacy server 100 prior to other users in that particular neighborhood verifying their addresses in that particular neighborhood places a set of points defining the particular neighborhood using a set of drawing tools in the map view of the online community (e.g., as shown in the social community view 850 of FIG. 8 formed through the neighborhood network module as described in FIG. 10). The privacy server 100 may optionally extend the threshold radial distance to an adjacent boundary of an adjacent neighborhood based a request of the particular user 116. The privacy server 100 may generate a separate login to the online community (e.g., as shown in the social community view 850 of FIG. 8 formed through the neighborhood network module as described in FIG. 10) designed to be usable by a police department, a municipal agency, a neighborhood association, and/or a neighborhood leader associated with the particular neighborhood.

The separate login may permit the police department, the municipal agency, the neighborhood association, and/or the neighborhood leader to: (1) invite residents of the particular neighborhood themselves (e.g., see the user interface view of FIG. 22) using the privacy server 100 using a self-authenticating access code that permits new users that enter the self-authenticating access code in the online community (e.g., as shown in the social community view 850 of FIG. 8 formed through the neighborhood network module as described in FIG. 10) to automatically join the particular neighborhood as verified users (e.g., the verified user 1310 of FIG. 13A), (2) generate a virtual neighborhood watch group and/or an emergency preparedness group restricted to users verified in the particular neighborhood using the privacy server 100, (3) conduct high value crime and/or safety related discussions from local police and/or fire officials that is restricted to users verified in the particular neighborhood using the privacy server 100, (4) broadcast information across the particular neighborhood, and (5) receive and/or track neighborhood level membership and/or activity to identify leaders from the restricted group of users verified in the particular neighborhood using the privacy server 100.

The privacy server 100 may permit each of the restricted group of users verified in the particular neighborhood using the privacy server 100 to: (1) share information about a suspicious activity that is likely to affect several neighborhoods, (2) explain about a lost pet that might have wandered into an adjoining neighborhood, (3) rally support from neighbors 128 (e.g., such as the particular neighbor 120 of FIG. 1) from multiple neighborhoods to address civic issues, (4) spread information about events comprising a local theater production and/or a neighborhood garage sale, and/or (5) solicit advice and/or recommendations from the restricted group of users verified in the particular neighborhood and/or optionally in the adjacent neighborhood.

The privacy server 100 may flag a neighborhood feed from the particular neighborhood and/or optionally from the adjacent neighborhood as being inappropriate. The privacy server 100 may suspend users that repeatedly communicate self-promotional messages that are inappropriate as voted based on a sensibility of any one of the verified users (e.g., the verified user 1310 of FIG. 13A) of the particular neighborhood and/or optionally from the adjacent neighborhood. The privacy server 100 may personalize which nearby neighborhoods that verified users (e.g., the verified user 1310 of FIG. 13A) are able to communicate through based on a request of the particular user 116. The privacy server 100 may permit the neighborhood leader to communicate privately with leaders of an adjoining neighborhood to plan and/or organize on behalf of an entire constituency of verified users (e.g., a plurality of the verified user 1310 of FIG. 13A) of the particular neighborhood associated with the neighborhood leader.

The privacy server 100 may filter feeds to only display messages from the particular neighborhood associated with each verified user. The privacy server 100 may restrict posts only in the particular neighborhood to verified users (e.g., the verified user 1310 of FIG. 13A) having verified addresses within the neighborhood boundary (e.g., the claim view 1550 of FIG. 15 describes a claiming process of an address). The address verification algorithm (e.g., using verify module 206 of FIG. 2) of the privacy server 100 utilizes a set of verification methods to perform verification of the particular user 116 through any of a: (1) a postcard verification method through which the privacy server 100 generates a physical postcard that is postal mailed to addresses of requesting users in the particular neighborhood and/or having a unique alphanumeric sequence in a form of an access code printed thereon which authenticates users that enter the access code to view and/or search privileges in the particular neighborhood of the online community (e.g., as shown in the social community view 850 of FIG. 8 formed through the neighborhood network module as described in FIG. 10), (2) a credit card verification method through which the privacy server 100 verifies the claimable residential address (e.g., using sub-modules of the claimable module 110 as described in FIG. 3) when at least one a credit card billing address and/or a debit card billing address is matched with an inputted address through an authentication services provider, (3) a privately-published access code method through which the privacy server 100 communicates to user profiles of the police department, the municipal agency, the neighborhood association, and/or the neighborhood leader an instant access code that is printable at town hall meetings and/or gatherings sponsored by any one of the police department, the municipal agency, the neighborhood association, and/or the neighborhood leader, (4) a neighbor vouching method through which the privacy server 100 authenticates new users when existing verified users (e.g., the verified user 1310 of FIG. 13A) agree to a candidacy of new users in the particular neighborhood, (5) a phone verification method through which the privacy server 100 authenticates new users whose phone number is matched with an inputted phone number through the authentication services provider, and (6) a social security verification method through which the privacy server 100 authenticates new users whose social security number is matched with an inputted social security number through the authentication services provider.

The privacy server 100 may initially set the particular neighborhood to a pilot phase status in which the online community (e.g., as shown in the social community view 850 of FIG. 8 formed through the neighborhood network module as described in FIG. 10) of the particular neighborhood is provisionally defined until a minimum number of users verify their residential addresses in the particular neighborhood through the privacy server 100. The privacy server 100 may automatically delete profiles of users that remain unverified after a threshold window of time. The neighborhood communication system 150 may be designed to create private websites to facilitate communication among neighbors 128 (e.g., such as the particular neighbor 120 of FIG. 1) and/or build stronger neighborhoods.

In another embodiment a method of a neighborhood communication system 150 is described. The method includes applying an address verification algorithm (e.g., using verify module 206 of FIG. 2) associated with each user of the online community (e.g., as shown in the social community view 850 of FIG. 8 formed through the neighborhood network module as described in FIG. 10) using a privacy server 100, verifying that each user lives at a residence associated with a claimable residential address (e.g., using sub-modules of the claimable module 110 as described in FIG. 3) of an online community (e.g., as shown in the social community view 850 of FIG. 8 formed through the neighborhood network module as described in FIG. 10) formed through a social community module 106 of the privacy server 100 using a processor 1102 and a memory (e.g., as described in FIG. 11), generating a latitudinal data and a longitudinal data associated with each claimable residential address (e.g., using sub-modules of the claimable module 110 as described in FIG. 3) of the online community (e.g., as shown in the social community view 850 of FIG. 8 formed through the neighborhood network module as described in FIG. 10) associated with each user of the online community (e.g., as shown in the social community view 850 of FIG. 8 formed through the neighborhood network module as described in FIG. 10), and determining a set of access privileges in the online community (e.g., as shown in the social community view 850 of FIG. 8 formed through the neighborhood network module as described in FIG. 10) associated with each user of the online community (e.g., as shown in the social community view 850 of FIG. 8 formed through the neighborhood network module as described in FIG. 10) by constraining access in the online community (e.g., as shown in the social community view 850 of FIG. 8 formed through the neighborhood network module as described in FIG. 10) based on a neighborhood boundary determined using a Bezier curve algorithm 240 of the privacy server 100.

The method may transform the claimable residential address (e.g., using sub-modules of the claimable module 110 as described in FIG. 3) into a claimed address upon an occurrence of an event. The method may instantiate the event when a particular user 116 is associated with the claimable residential address (e.g., using sub-modules of the claimable module 110 as described in FIG. 3) based on a verification of the particular user 116 as living at a particular residential address (e.g., associated with the residence 118 of FIG. 1) associated with the claimable residential address (e.g., using sub-modules of the claimable module 110 as described in FIG. 3) using the privacy server 100.

The method may constrain the particular user 116 to communicate through the online community (e.g., as shown in the social community view 850 of FIG. 8 formed through the neighborhood network module as described in FIG. 10) only with a set of neighbors 128 (e.g., such as the particular neighbor 120 of FIG. 1) having verified addresses using the privacy server 100. The method may define the set of neighbors 128 (e.g., such as the particular neighbor 120 of FIG. 1) as other users of the online community (e.g., as shown in the social community view 850 of FIG. 8 formed through the neighborhood network module as described in FIG. 10) that have each verified their addresses in the online community (e.g., as shown in the social community view 850 of FIG. 8 formed through the neighborhood network module as described in FIG. 10) using the privacy server 100 and/or which have each claimed residential addresses that are in a threshold radial distance from the claimed address of the particular user 116.

The method may constrain the threshold radial distance to be less than a distance of the neighborhood boundary using the Bezier curve algorithm 240.

In addition, the method may define a neighborhood boundary to take on a variety of shapes based on an associated geographic connotation, a historical connotation, a political connotation, and/or a cultural connotation of neighborhood boundaries. The method may apply a database of constraints (e.g., the databases of FIG. 2 including the places database 218) associated with neighborhood boundaries that are imposed on a map view of the online community (e.g., as shown in the social community view 850 of FIG. 8 formed through the neighborhood network module as described in FIG. 10) when permitting the neighborhood boundary to take on the variety of shapes.

The method may generate a user-generated boundary in a form of a polygon describing geospatial boundaries defining the particular neighborhood when a first user of a particular neighborhood that verifies a first residential address of the particular neighborhood using the privacy server 100 prior to other users in that particular neighborhood verifying their addresses in that particular neighborhood places a set of points defining the particular neighborhood using a set of drawing tools in the map view of the online community (e.g., as shown in the social community view 850 of FIG. 8 formed through the neighborhood network module as described in FIG. 10). The method may optionally extend the threshold radial distance to an adjacent boundary of an adjacent neighborhood based a request of the particular user 116.

The method may generate a separate login to the online community (e.g., as shown in the social community view 850 of FIG. 8 formed through the neighborhood network module as described in FIG. 10) designed to be usable by a police department, a municipal agency, a neighborhood association, and/or a neighborhood leader associated with the particular neighborhood.

The method may permit the police department, the municipal agency, the neighborhood association, and/or the neighborhood leader to: (1) invite residents of the particular neighborhood themselves (e.g., see the user interface view of FIG. 22) using the privacy server 100 using a self-authenticating access code that permits new users that enter the self-authenticating access code in the online community (e.g., as shown in the social community view 850 of FIG. 8 formed through the neighborhood network module as described in FIG. 10) to automatically join the particular neighborhood as verified users (e.g., the verified user 1310 of FIG. 13A), (2) generate a virtual neighborhood watch group and/or an emergency preparedness group restricted to users verified in the particular neighborhood using the privacy server 100, (3) conduct high value crime and/or safety related discussions from local police and/or fire officials that is restricted to users verified in the particular neighborhood using the privacy server 100, (4) broadcast information across the particular neighborhood, and/or (5) receive and/or track neighborhood level membership and/or activity to identify leaders from the restricted group of users verified in the particular neighborhood using the privacy server 100.

The method may permit each of the restricted group of users verified in the particular neighborhood using the privacy server 100 to: (1) share information about a suspicious activity that is likely to affect several neighborhoods, (2) explain about a lost pet that might have wandered into an adjoining neighborhood, (3) rally support from neighbors 128 (e.g., such as the particular neighbor 120 of FIG. 1) from multiple neighborhoods to address civic issues, (4) spread information about events comprising a local theater production and/or a neighborhood garage sale, and/or (5) solicit advice and/or recommendations from the restricted group of users verified in the particular neighborhood and/or optionally in the adjacent neighborhood.

The method may flag a neighborhood feed from the particular neighborhood and/or optionally from the adjacent neighborhood as being inappropriate. The method may suspend users that repeatedly communicate self-promotional messages that are inappropriate as voted based on a sensibility of any one of the verified users (e.g., the verified user 1310 of FIG. 13A) of the particular neighborhood and/or optionally from the adjacent neighborhood. The method may personalize which nearby neighborhoods that verified users (e.g., the verified user 1310 of FIG. 13A) are able to communicate through based on a request of the particular user 116. The method may permit the neighborhood leader to communicate privately with leaders of an adjoining neighborhood to plan and/or organize on behalf of an entire constituency of verified users of the particular neighborhood associated with the neighborhood leader.

The method may filter feeds to only display messages from the particular neighborhood associated with each verified user. The method may restrict posts only in the particular neighborhood to verified users (e.g., the verified user 1310 of FIG. 13A) having verified addresses within the neighborhood boundary (e.g., the claim view 1550 of FIG. 15 describes a claiming process of an address). The method may utilize a set of verification methods to perform verification of the particular user 116 through: (1) generating a physical postcard that is postal mailed to addresses of requesting users in the particular neighborhood and/or having a unique alphanumeric sequence in a form of an access code printed thereon which authenticates users that enter the access code to view and/or search privileges in the particular neighborhood of the online community (e.g., as shown in the social community view 850 of FIG. 8 formed through the neighborhood network module as described in FIG. 10). (2) verifying the claimable residential address (e.g., using sub-modules of the claimable module 110 as described in FIG. 3) when at least one a credit card billing address and/or a debit card billing address is matched with an inputted address through an authentication services provider. (3) communicating to user profiles of the police department, the municipal agency, the neighborhood association, and/or the neighborhood leader an instant access code that is printable at town hall meetings and/or gatherings sponsored by any one of the police department, the municipal agency, the neighborhood association, and/or the neighborhood leader. (4) authenticating new users when existing verified users (e.g., the verified user 1310 of FIG. 13A) agree to a candidacy of new users in the particular neighborhood. (5) authenticating new users whose phone number is matched with an inputted phone number through the authentication services provider. (6) authenticating new users whose social security number is matched with an inputted social security number through the authentication services provider.

The method may initially set the particular neighborhood to a pilot phase status in which the online community (e.g., as shown in the social community view 850 of FIG. 8 formed through the neighborhood network module as described in FIG. 10) of the particular neighborhood is provisionally defined until a minimum number of users verify their residential addresses in the particular neighborhood through the privacy server 100. The method may automatically delete profiles of users that remain unverified after a threshold window of time. The neighborhood communication system 150 may be designed to create private websites to facilitate communication among neighbors 128 (e.g., such as the particular neighbor 120 of FIG. 1) and/or build stronger neighborhoods.

In yet another embodiment, another neighborhood communication system 150 is described. This embodiment includes a privacy server 100 to apply an address verification algorithm (e.g., using verify module 206 of FIG. 2) associated with each user of the online community (e.g., as shown in the social community view 850 of FIG. 8 formed through the neighborhood network module as described in FIG. 10) to verify that each user lives at a residence associated with a claimable residential address (e.g., using sub-modules of the claimable module 110 as described in FIG. 3) of an online community (e.g., as shown in the social community view 850 of FIG. 8 formed through the neighborhood network module as described in FIG. 10) formed through a social community module 106 of the privacy server 100 using a processor 1102 and a memory (e.g., as described in FIG. 11), a network 104, and a mapping server 126 (e.g., providing global map data) communicatively coupled with the privacy server 100 through the network 104 to generate a latitudinal data and a longitudinal data associated with each claimable residential address (e.g., using sub-modules of the claimable module 110 as described in FIG. 3) of the online community (e.g., as shown in the social community view 850 of FIG. 8 formed through the neighborhood network module as described in FIG. 10) associated with each user of the online community (e.g., as shown in the social community view 850 of FIG. 8 formed through the neighborhood network module as described in FIG. 10). The privacy server 100 automatically determines a set of access privileges in the online community (e.g., as shown in the social community view 850 of FIG. 8 formed through the neighborhood network module as described in FIG. 10) associated with each user of the online community (e.g., as shown in the social community view 850 of FIG. 8 formed through the neighborhood network module as described in FIG. 10) by constraining access in the online community (e.g., as shown in the social community view 850 of FIG. 8 formed through the neighborhood network module as described in FIG. 10) based on a neighborhood boundary determined using a Bezier curve algorithm 240 of the privacy server 100 in this embodiment.

In addition, in this yet another embodiment the privacy server 100 transforms the claimable residential address (e.g., using sub-modules of the claimable module 110 as described in FIG. 3) into a claimed address upon an occurrence of an event. The privacy server 100 instantiates the event when a particular user 116 is associated with the claimable residential address (e.g., using sub-modules of the claimable module 110 as described in FIG. 3) based on a verification of the particular user 116 as living at a particular residential address (e.g., associated with the residence 118 of FIG. 1) associated with the claimable residential address (e.g., using sub-modules of the claimable module 110 as described in FIG. 3) using the privacy server 100 in this yet another embodiment. The privacy server 100 constrains the particular user 116 to communicate through the online community (e.g., as shown in the social community view 850 of FIG. 8 formed through the neighborhood network module as described in FIG. 10) only with a set of neighbors 128 (e.g., such as the particular neighbor 120 of FIG. 1) having verified addresses using the privacy server 100 in this yet another embodiment. The privacy server 100 defines the set of neighbors 128 (e.g., such as the particular neighbor 120 of FIG. 1) as other users of the online community (e.g., as shown in the social community view 850 of FIG. 8 formed through the neighborhood network module as described in FIG. 10) that have each verified their addresses in the online community (e.g., as shown in the social community view 850 of FIG. 8 formed through the neighborhood network module as described in FIG. 10) using the privacy server 100 and which have each claimed residential addresses that are in a threshold radial distance from the claimed address of the particular user 116 in this yet another embodiment.

FIG. 1 is a system view of a privacy server 100 communicating with neighborhood(s) 102A-N through a network 104, an advertiser(s) 124, a mapping server 126, an database of neighbors 128 (e.g., occupant data), according to one embodiment. Particularly FIG. 1 illustrates the privacy server 100, the neighborhood 102A-N, the network 104, advertiser(s) 124, mapping server 126, and the a database of neighbors 128 (e.g., occupant data), according to one embodiment. The privacy server 100 may contain a social community module 106, a search module 108, a claimable module 110, a commerce module 112 and a map module 114. The neighborhood may include a user 116, a community center 120, a residence 118, a neighbor 120 and a business 122, according to one embodiment.

The privacy server 100 may include any number of neighborhoods having registered users and/or unregistered users. The neighborhood(s) 102 may be a geographically localized community in a larger city, town, and/or suburb. The network 104 may be search engines, blogs, social networks, professional networks and static website that may unite individuals, groups and/or community. The social community module 106 may generate a building creator in which the registered users may create and/or modify empty claimable profiles (e.g., a claimable profile 1206 of FIG. 12A-12B, a claimable profile 1302 of FIG. 13A, a claimable profile 1704 of FIG. 17). The search module 108 may include searching of information of an individual, group and/or community.

The social community module 106 (e.g., that applies the Bezier curve algorithm 240 of FIG. 2 using a series of modules working in concert as described in FIG. 2), as a function/module of the emergency response server, may determine the location of the user 116, the distance between the user 116 and other verified users (e.g., the verified user 1310 of FIG. 13A), and the distance between the user 116 and locations of interest. With that information, the social community module 106 (e.g., that applies the Bezier curve algorithm 240 of FIG. 2 using a series of modules working in concert as described in FIG. 2) may further determine which verified users (e.g., the verified user 1310 of FIG. 13A) are within a predetermined vicinity of a user 116. This set of verified users within the vicinity of another verified user may then be determined to be receptive to broadcasts transmitted by the user 116 and to be available as transmitters of broadcasts to the user 116.

The social community module 106 (e.g., that applies the Bezier curve algorithm 240 of FIG. 2 using a series of modules working in concert as described in FIG. 2) in effect may create a link between verified users of the network 104 that allows the users to communicate with each other, and this link may be based on the physical distance between the users as measured relative to a current geospatial location of the device (e.g., the device 1806, the device 1808 of FIG. 18) with a claimed and verified (e.g., through a verification mechanism such as a postcard verification, a utility bill verification, and/or a vouching of the user with other users) non-transitory location (e.g., a home location, a work location) of the user and/or other users. In an alternate embodiment, the transitory location of the user (e.g., their current location, a current location of their vehicle and/or mobile phone) and/or the other users may also be used by the radial algorithm (e.g., the Bezier curve algorithm 240 of FIG. 2) to determine an appropriate threshold distance for broadcasting a message.

Furthermore, the social community module 106 (e.g., that applies the Bezier curve algorithm 240 of FIG. 2 using a series of modules working in concert as described in FIG. 2) may automatically update a set of pages associated with profiles of individuals and/or businesses that have not yet joined the network based on preseeded address information. In effect, the social community module 106 (e.g., that applies the Bezier curve algorithm 240 of FIG. 2 using a series of modules working in concert as described in FIG. 2) may update preseeded pages in a geo-constrained radial distance from where a broadcast originates (e.g., using an epicenter calculated from the current location of the device (e.g., the device 1806, the device 1808 of FIG. 18) (e.g., a mobile version of the device 1806 of FIG. 18 (e.g., a mobile phone, a tablet computer) with information about the neighborhood broadcast data. In effect, through this methodology, the social community module 106 (e.g., that applies the Bezier curve algorithm 240 of FIG. 2 using a series of modules working in concert as described in FIG. 2) may leave 'inboxes' and/or post 'alerts' on pages created for users that have not yet signed up based on a confirmed address of the users through a public and/or a private data source (e.g., from Infogroup®, from a white page directory, etc.).

The social community module 106 (e.g., that applies the Bezier curve algorithm 240 of FIG. 2 using a series of modules working in concert as described in FIG. 2) of the privacy server 100 may be different from previous implementations because it is the first implementation to simulate the experience of local radio transmission between individuals using the internet and non-radio network technology by basing their network broadcast range on the proximity of verified users to one another, according to one embodiment.

The Bezier curve algorithm 240 may operate as follows, according to one embodiment. The radial algorithm (e.g., the Bezier curve algorithm 240 of FIG. 2) may utilize a radial distribution function (e.g., a pair correlation function)

$$g(r)$$

In the neighborhood communication system 150. The radial distribution function may describe how density varies as a function of distance from a user 116, according to one embodiment.

If a given user 116 is taken to be at the origin O (e.g., the epicenter), and if $$\rho = N/V$$

is the average number density of recipients (e.g., other users of the neighborhood communication system 150 such as neighbors 128 of FIG. 1) in the neighborhood communication system 150, then the local time-averaged density at a distance r from O is $$\rho g(r)$$

according to one embodiment. This simplified definition may hold for a homogeneous and isotropic type of recipients (e.g., other users of the neighborhood communication system 150 such as neighbors 128 of FIG. 1), according to one embodiment of the Bezier curve algorithm 240.

A more anisotropic distribution (e.g., exhibiting properties with different values when measured in different directions) of the recipients (e.g., other users of the neighborhood communication system 150 such as neighbors 128 of FIG. 1) will be described below, according to one embodiment of the Bezier curve algorithm 240. In simplest terms it may be a measure of the probability of finding a recipient at a distance of r away from a given user 116, relative to that for an ideal distribution scenario, according to one embodiment. The anisotropic algorithm involves determining how many recipients (e.g., other users of the neighborhood communication system 150 such as neighbors 128 of FIG. 1) are within a distance of r and r+dr away from the user 116, according to one embodiment. The Bezier curve algorithm 240 may be determined by calculating the distance between all user pairs and binning them into a user histogram, according to one embodiment.

The histogram may then be normalized with respect to an ideal user at the origin o, where user histograms are completely uncorrelated, according to one embodiment. For three dimensions (e.g., such as a building representation in the privacy server 100 in which there are multiple residents in each floor), this normalization may be the number density of the system multiplied by the volume of the spherical shell, which mathematically can be expressed as $$g(r)_f = 4\pi r^2 \rho dr,$$

where ρ may be the user density, according to one embodiment of the Bezier curve algorithm 240.

The radial distribution function of the Bezier curve algorithm 240 can be computed either via computer simulation methods like the Monte Carlo method, or via the Ornstein-Zernike equation, using approximative closure relations like the Percus-Yevick approximation or the Hypernetted Chain Theory, according to one embodiment.

This may be important because by confining the broadcast reach of a verified user in the neighborhood communication system 150 to a specified range, the social community module 106 (e.g., that applies the Bezier curve algorithm 240 of FIG. 2 using a series of modules working in concert as described in FIG. 2) may replicate the experience of local radio broadcasting and enable verified users to communicate information to their immediate neighbors as well as receive information from their immediate neighbors in areas that they care about, according to one embodiment. Such methodologies can be complemented with hyperlocal advertising targeted to potential users of the privacy server 100 on preseeded profile pages and/or active user pages of the privacy server 100. Advertisement communications thus may become highly specialized and localized resulting in an increase in their value and interest to the local verified users of the network through the privacy server 100. For example, advertisers may wish to communicate helpful home security devices to a set of users located in a geospatial area with a high concentration of home break-in broadcasts.

The social community module 106 (e.g., that applies the Bezier curve algorithm 240 of FIG. 2 using a series of modules working in concert as described in FIG. 2) may also have wide application as it may solve the problem of trying to locate a receptive audience to a verified user's broadcasts, whether that broadcast may a personal emergency, an one's personal music, an advertisement for a car for sale, a solicitation for a new employee, and/or a recommendation for a good restaurant in the area. This social community module 106 (e.g., that applies the Bezier curve algorithm 240 of FIG. 2 using a series of modules working in concert as described in FIG. 2) may eliminate unnecessarily broadcasting that information to those who are not receptive to it, both as a transmitter and as a recipient of the broadcast. The radial algorithm (e.g., the Bezier curve algorithm 240 of FIG. 2) saves both time (which may be critical and limited in an emergency context) and effort of every user involved by transmitting information only to areas that a user cares about, according to one embodiment.

In effect, the radial algorithm (e.g., the Bezier curve algorithm 240 of FIG. 2) of the emergency response server enables users to notify people around locations that are cared about (e.g., around where they live, work, and/or where they are physically located). In one embodiment, the user 116 can be provided 'feedback' and/or a communication that the neighbor 128 may be responding to the emergency after the neighborhood broadcast data may be delivered to the recipients (e.g., other users of the neighborhood communication system 150 such as neighbors 128 of FIG. 1) and/or to the neighborhood services using the social community module 106 (e.g., that applies the Bezier curve algorithm 240 of FIG. 2 using a series of modules working in concert as described in FIG. 2) of the privacy server 100. For example, after the neighborhood broadcast data may be delivered, the device (e.g., the device 1806, the device 1808 of FIG. 18) (e.g., a mobile version of the device 1806 of FIG. 18 (e.g., a mobile phone, a tablet computer)) may display a message saying: "3256 neighbors around a 1 radius from you have been notified on their profile pages of your crime broadcast in Menlo Park and 4 people are responding" and/or "8356 neighbors and two hospitals around a 2.7 radius from you have been notified of your medical emergency."

The various embodiments described herein of the privacy server 100 using the social community module 106 (e.g., that applies the Bezier curve algorithm 240 of FIG. 2 using a series of modules working in concert as described in FIG. 2) may solve a central problem of internet radio service providers (e.g., Pandora) by retaining cultural significance related to a person's locations of association. For example, the social community module 106 (e.g., that applies the Bezier curve algorithm 240 of FIG. 2 using a series of modules working in concert as described in FIG. 2) may be used to 'create' new radio stations, television stations, and/or mini alert broadcasts to a geospatially constrained area on one end, and provide a means for those 'tuning in' to consume information posted in a geospatial area that the listener cares about and/or associates themselves with. The information provided can be actionable in that the user 116 may be able to secure new opportunities through face to face human interaction and physical meeting not otherwise possible in internet radio scenarios.

The radial algorithm (e.g., the Bezier curve algorithm 240 of FIG. 2) may be a set of instructions that may enable users (e.g., verified users, non-verified users) of the Nextdoor.com and Fatdoor.com websites and applications to broadcast their activities (e.g., garage sale, t-shirt sale, crime alert) to surrounding neighbors within a claimed neighborhood and to guests of a claimed neighborhood, according to one embodiment. The radial algorithm (e.g., the Bezier curve algorithm 240 of FIG. 2) may be new because current technology does not allow for users of a network (e.g., Nextdoor.com, Fatdoor.com) to locally broadcast their activity to a locally defined geospatial area. With the radial algorithm (e.g., the Bezier curve algorithm 240 of FIG. 2), users of the network may communicate with one another in a locally defined manner, which may present more relevant information and activities, according to one embodiment. For example, if a verified user of the network broadcasts an emergency, locally defined neighbors of the verified user may be much more interested in responding than if they observed an emergency on a general news broadcast on traditional radio, according to one embodiment. The social community module 106 may solve the problem of neighbors living in the locally defined geospatial area who don't typically interact, and allows them to connect within a virtual space that did not exist before, according to one embodiment. Community boards (e.g., stolen or missing item boards) may have been a primary method of distributing content in a surrounding neighborhood effectively prior to the disclosures described herein. However, there was no way to easily distribute content related to exigent circumstances and/or with urgency in a broadcast-like manner to those listening around a neighborhood through mobile devices until the various embodiments applying the social community module 106 as described herein.

A Bezier curve algorithm 240 may be a method of calculating a sequence of operations, and in this case a sequence of radio operations, according to one embodiment. Starting from an initial state and initial input, the Bezier curve algorithm 240 describes a computation that, when executed, proceeds through a finite number of well-defined successive states, eventually producing radial patterned distribution (e.g., simulating a local radio station), according to one embodiment.

The privacy server 100 may solve technical challenges through the social community module 106 (e.g., that applies the Bezier curve algorithm 240 of FIG. 2 using a series of modules working in concert as described in FIG. 2) by implementing a vigorous screening process to screen out any lewd or vulgar content in one embodiment. For example, what may be considered lewd content sometimes could be subjective, and verified users could argue that the operator of the privacy server 100 is restricting their constitutional right to freedom of speech (e.g., if the emergency response server is operated by a government entity) through a crowd-moderation capability enabled by the social community module 106 (e.g., that applies the Bezier curve algorithm 240 of FIG. 2 using a series of modules working in concert as described in FIG. 2), according to one embodiment. In one embodiment, verified users may sign an electronic agreement to screen their content and agree that the neighborhood communication system 150 may delete any content that it deems inappropriate for broadcasting, through the social community module 106 (e.g., that applies the Bezier curve algorithm 240 of FIG. 2 using a series of modules working in concert as described in FIG. 2) according to one embodiment. For example, it may be determined that a lost item such as a misplaced set of car keys does not qualify as an "emergency" that should be broadcast.

The social community module 106 (e.g., that applies the Bezier curve algorithm 240 of FIG. 2 using a series of modules working in concert as described in FIG. 2), in addition to neighborhood broadcasts (e.g., such as emergency broadcasts), may allow verified users to create and broadcast their own radio show, e.g., music, talk show, commercial, instructional contents, etc., and to choose their neighborhood(s) for broadcasting based on a claimed location, according to one embodiment. The social community module 106 (e.g., that applies the Bezier curve algorithm 240 of FIG. 2 using a series of modules working in concert as described in FIG. 2) may allow users to choose the neighborhoods that they would want to receive the broadcasts, live and recorded broadcasts, and/or the types and topics (e.g., minor crimes, property crimes, medical emergencies) of broadcasts that interest them.

The social community module 106 (e.g., that applies the Bezier curve algorithm 240 of FIG. 2 using a series of modules working in concert as described in FIG. 2) based approach of the privacy server 100 may be a completely different concept from the currently existing neighborhood (e.g., geospatial) social networking options. The social community module 106 (e.g., that applies the Bezier curve algorithm 240 of FIG. 2 using a series of modules working in concert as described in FIG. 2) may also allow the user to create his/her own radio station, television station and/or other content such as the neighborhood broadcast data and distribute this content around locations to users and pre-seeded profiles around them. For example, the user may wish to broadcast their live reporting of a structure fire or interview eye-witnesses to a robbery. The social community module 106 (e.g., that applies the Bezier curve algorithm 240 of FIG. 2 using a series of modules working in concert as described in FIG. 2) can allow verified users to create their content and broadcast in the selected geospatial area. It also allows verified listeners to listen to only the relevant local broadcasts of their choice.

The social community module 106 (e.g., that applies the Bezier curve algorithm 240 of FIG. 2 using a series of modules working in concert as described in FIG. 2) may be important because it may provide any verified user the opportunity to create his/her own radial broadcast message (e.g., can be audio, video, pictorial and/or textual content) and distribute this content to a broad group. Social community module 106 (e.g., that applies the Bezier curve algorithm 240 of FIG. 2 using a series of modules working in concert as described in FIG. 2) may also allow verified listeners to listen to any missed live broadcasts through the prerecorded features, according to one embodiment. Through this, the social community module 106 (e.g., that applies the Bezier curve algorithm 240 of FIG. 2 using a series of modules working in concert as described in FIG. 2) changes the way social networks (e.g., Nextdoor®, Fatdoor®, Facebook®, Path®, etc.) operate by enabling location centric broadcasting to regions that a user cares about, according to one embodiment. Social community module 106 (e.g., that applies the Bezier curve algorithm 240 of FIG. 2 using a series of modules working in concert as described in FIG. 2) may solve a technical challenge by defining ranges based on a type of an emergency type, a type of neighborhood, and/or boundary condition of a neighborhood by analyzing whether the neighborhood broadcast data may be associated with a particular kind of recipient, a particular neighborhood, a temporal limitation, and/or through another criteria.

By using the social community module 106 (e.g., that applies the Bezier curve algorithm 240 of FIG. 2 using a series of modules working in concert as described in FIG. 2) of the privacy server 100 the user 116 may be able to filter irrelevant offers and information provided by broadcasts. In one embodiment, only the broadcasting user (e.g., the user 116) may be a verified user to create accountability for a particular broadcast and/or credibility of the broadcaster. In this embodiment, recipients (e.g., other users of the neighborhood communication system 150 such as neighbors 128 of FIG. 1) of the broadcast may not need to be verified users of the emergency response network. By directing traffic and organizing the onslaught of broadcasts, the social community module 106 (e.g., that applies the Bezier curve algorithm 240 of FIG. 2 using a series of modules working in concert as described in FIG. 2) of the privacy server 100 may be able to identify the origins and nature of each group of incoming information and locate recipients (e.g., other users of the neighborhood communication system 150 such as neighbors 128 of FIG. 1) that are relevant/interested in the neighborhood broadcast data, maximizing the effective use of each broadcast. For example, the neighbor 128 may be able to specify that they own a firearm so that they would be a relevant neighbor 128 for broadcast data to respond to a school shooting. In another example, a neighbor 128 may specify that they are a medical professional (e.g., paramedic, physician) such that they may receive medical emergency broadcasts, according to one embodiment.

Figure 18:
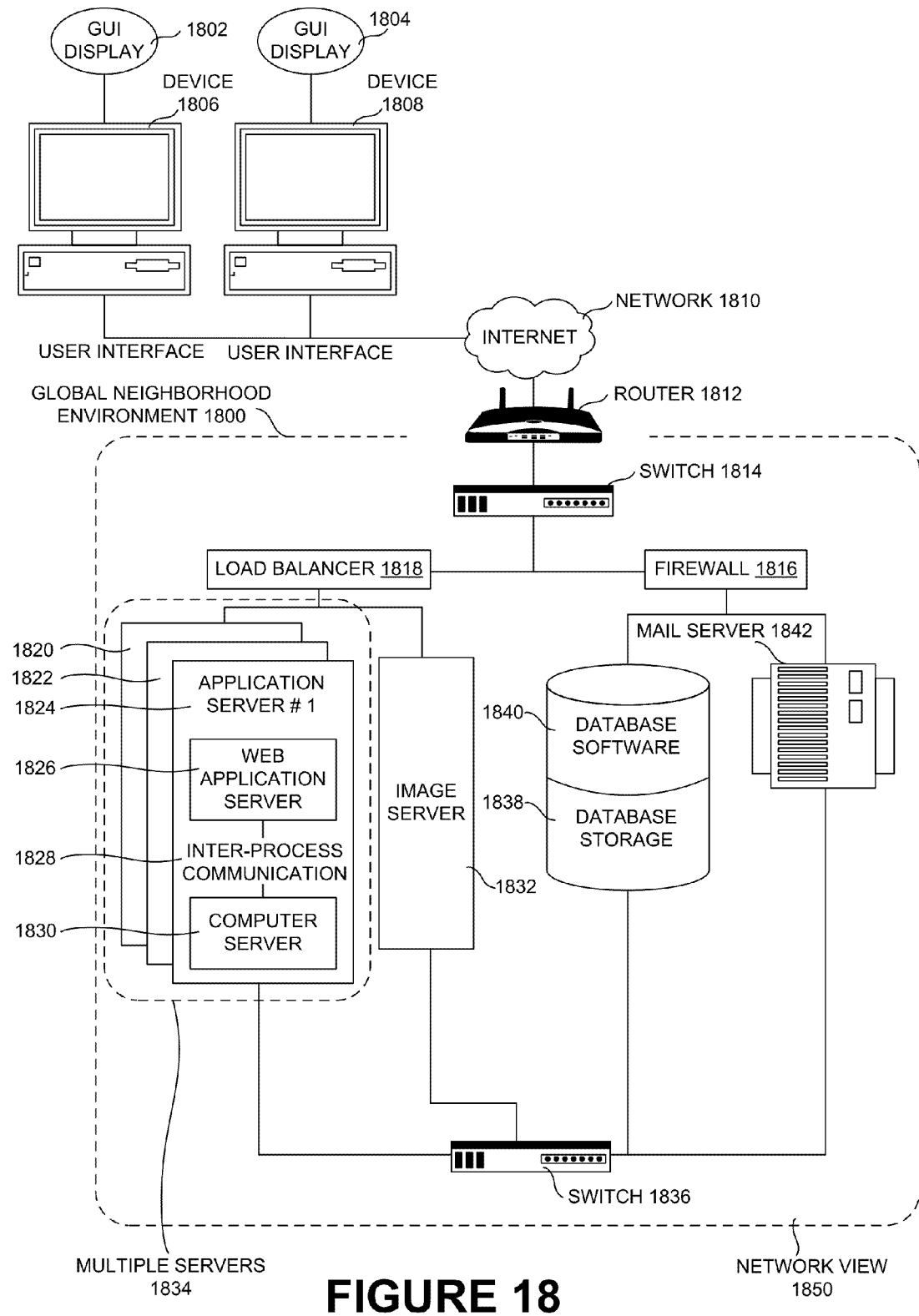
FIG. 18 is a systematic view of a network view, according to one embodiment.

The social community module 106 (e.g., that applies the Bezier curve algorithm 240 of FIG. 2 using a series of modules working in concert as described in FIG. 2) of the privacy server 100 may process the input data from the device (e.g., the device 1806, the device 1808 of FIG. 18) (e.g., a mobile version of the device 1806 of FIG. 18 (e.g., a mobile phone, a tablet computer)) in order to identify which notification(s) to broadcast to which individual(s). This may be separate from a traditional radio broadcast as it not only geographically constrains broadcasters and recipients (e.g., other users of the neighborhood communication system 150 such as neighbors 128 of FIG. 1) but also makes use of user preferences in order to allow broadcasters to target an optimal audience and allow recipients (e.g., other users of the neighborhood communication system 150 such as neighbors 128 of FIG. 1) to alter and customize what they consume. The user 116 may associate him/herself with a non-transitory address in order to remain constantly connected to their neighborhood and/or neighbors even when they themselves or their neighbors are away. The Bezier curve algorithm 240 may be also unique from a neighborhood social network (e.g., the privacy server 100) as it permits users to broadcast emergencies, information, audio, video etc. to other users, allowing users to create their own stations.

In order to implement the social community module 106 (e.g., that applies the Bezier curve algorithm 240 of FIG. 2 using a series of modules working in concert as described in FIG. 2), geospatial data may need to be collected and amassed in order to create a foundation on which users may sign up and verify themselves by claiming a specific address, associating themselves with that geospatial location. The social community module 106 (e.g., that applies the Bezier curve algorithm 240 of FIG. 2 using a series of modules working in concert as described in FIG. 2) may then be able to utilize the geospatial database 122 to filter out surrounding noise and deliver only relevant data to recipients (e.g., other users of the neighborhood communication system 150 such as neighbors 128 of FIG. 1). In order to accomplish this, the social community module 106 (e.g., that applies the Bezier curve algorithm 240 of FIG. 2 using a series of modules working in concert as described in FIG. 2) may be able to verify the reliability of geospatial coordinates, time stamps, and user information associated with the device (e.g., the device 1806, the device 1808 of FIG. 18) (e.g., a mobile version of the device 1806 of FIG. 18 (e.g., a mobile phone, a tablet computer)). In addition, threshold geospatial radii, private neighborhood boundaries, and personal preferences may be established in the privacy server 100 and accommodated using the social community module 106 (e.g., that applies the Bezier curve algorithm 240 of FIG. 2 using a series of modules working in concert as described in FIG. 2). The geospatial database 122 may work in concert with the social community module 106 (e.g., that applies the Bezier curve algorithm 240 of FIG. 2 using a series of modules working in concert as described in FIG. 2) to store, organize, and manage broadcasts, pushpins, user profiles, preseeded user profiles, metadata, and epicenter locations associated with the privacy server 100 (e.g., a neighborhood social network such as Fatdoor.com, Nextdoor.com).

The Bezier curve algorithm 240 may be used to calculate relative distances between each one of millions of records as associated with each placed geo-spatial coordinate in the privacy server 100 (e.g., a neighborhood social network such as Fatdoor.com, Nextdoor.com). Calculations of relative distance between each geospatial coordinate can be a large computational challenge because of the high number of reads, writes, modify, and creates associated with each geospatial coordinate added to the privacy server 100 and subsequent recalculations of surrounding geospatial coordinates associated with other users and/or other profile pages based a relative distance away from a newly added set of geospatial coordinates (e.g., associated with the neighborhood broadcast data and/or with other pushpin types). To overcome this computational challenge, the radial algorithm (e.g., the Bezier curve algorithm 240 of FIG. 2) may leverage a massively parallel computing architecture 146 through which processing functions are distributed across a large set of processors accessed in a distributed computing system 148 through the network 104.

In order to achieve the utilization of the massively parallel computing architecture 146 in a context of a radial distribution function of a privacy server 100, a number of technical challenges have been overcome in at least one embodiment. Particularly, the social community module 106 constructs a series of tables based on an ordered geospatial ranking based on frequency of interaction through a set of 'n' number of users simultaneously interacting with the privacy server 100, in one preferred embodiment. In this manner, sessions of access between the privacy server 100 and users of the privacy server 100 (e.g., the user 116) may be monitored based on geospatial claimed areas of the user (e.g., a claimed work and/or home location of the user), and/or a present geospatial location of the user. In this manner, tables associated with data related to claimed geospatial areas of the user and/or the present geospatial location of the user may be anticipatorily cached in the memory 124 to ensure that a response time of the privacy server 100 may be not constrained by delays caused by extraction, retrieval, and transformation of tables that are not likely to be required for a current and/or anticipated set of sessions between users and the privacy server 100.

In a preferred embodiment, an elastic computing environment may be used by the social community module 106 to provide for increase/decreases of capacity within minutes of a database function requirement. In this manner, the social community module 106 can adapt to workload changes based on number of requests of processing simultaneous and/or concurrent requests associated with neighborhood broadcast data by provisioning and de-provisioning resources in an autonomic manner, such that at each point in time the available resources match the current demand as closely as possible.

The social community module 106 (e.g., that applies the Bezier curve algorithm 240 of FIG. 2 using a series of modules working in concert as described in FIG. 2) may be a concept whereby a server communicating data to a dispersed group of recipients (e.g., other users of the neighborhood communication system 150 such as neighbors 128 of FIG. 1) over a network 104, which may be an internet protocol based wide area network (as opposed to a network communicating by radio frequency communications) communicates that data only to a geospatially-constrained group of recipients (e.g., other users of the neighborhood communication system 150 such as neighbors 128 of FIG. 1). The social community module 106 (e.g., that applies the Bezier curve algorithm 240 of FIG. 2 using a series of modules working in concert as described in FIG. 2) may apply a geospatial constraint related to a radial distance away from an origin point, or a constraint related to regional, state, territory, county, municipal, neighborhood, building, community, district, locality, and/or other geospatial boundaries.

The social community module 106 (e.g., that applies the Bezier curve algorithm 240 of FIG. 2 using a series of modules working in concert as described in FIG. 2) may be new as applied to data traveling over wide area networks using internet protocol topology in a geospatial social networking and commerce context, according to one embodiment. While radio broadcasts, by their nature, are transmitted in a radial pattern surrounding the origin point, there may be no known mechanism for restricting access to the data only to verified users of a service subscribing to the broadcast. As applied to wired computer networks, while techniques for applying geospatial constraints have been applied to search results, and to other limited uses, there has as yet been no application of geospatial constraint as applied to the various embodiments described herein using the social community module 106 (e.g., that applies the Bezier curve algorithm 240 of FIG. 2 using a series of modules working in concert as described in FIG. 2).

The social community module 106 (e.g., that applies the Bezier curve algorithm 240 of FIG. 2 using a series of modules working in concert as described in FIG. 2) may be roughly analogous to broadcast radio communications such as a) in broadcast radio, b) in wireless computer networking, and c) in mobile telephony. However, all of these systems broadcast their information promiscuously, making the data transmitted available to anyone within range of the transmitter who may be equipped with the appropriate receiving device. In contrast, the social community module 106 (e.g., that applies the Bezier curve algorithm 240 of FIG. 2 using a series of modules working in concert as described in FIG. 2) herein describes a system in which networks are used to transmit data in a selective manner in that information may be distributed around a physical location of homes or businesses in areas of interest/relevancy.

The social community module 106 (e.g., that applies the Bezier curve algorithm 240 of FIG. 2 using a series of modules working in concert as described in FIG. 2) may solve a problem of restricting data transmitted over networks to specific users who are within a specified distance from the individual who originates the data. In a broad sense, by enabling commerce and communications that are strictly limited within defined neighborhood boundaries, the social community module 106 (e.g., that applies the Bezier curve algorithm 240 of FIG. 2 using a series of modules working in concert as described in FIG. 2) may enable the privacy server 100 (e.g., a neighborhood social network such as Fatdoor.com, Nextdoor.com) communications, attacking the serious social conditions of anonymity and disengagement in community that afflict the nation and, increasingly, the world.

The social community module 106 (e.g., that applies the Bezier curve algorithm 240 of FIG. 2 using a series of modules working in concert as described in FIG. 2) may comprise one or more modules that instruct the privacy server 100 to restrict the broadcasting of the neighborhood broadcast data to one or more parts of the geospatial area 117. For example, in the embodiment of FIG. 1, the social community module 106 (e.g., that applies the Bezier curve algorithm 240 of FIG. 2 using a series of modules working in concert as described in FIG. 2) may instruct the privacy server 100 to broadcast the neighborhood broadcast data to the recipients (e.g., other users of the neighborhood communication system 150 such as neighbors 128 of FIG. 1) but not to the area outside the threshold radial distance 115.

In one or more embodiments, the social community module 106 (e.g., that applies the Bezier curve algorithm 240 of FIG. 2 using a series of modules working in concert as described in FIG. 2) may allow the privacy server 100 to function in manner that simulates a traditional radio broadcast (e.g., using a radio tower to transmit a radio frequency signal) in that both the privacy server 100 and the radio broadcast are restricted in the geospatial scope of the broadcast transmission. In one or more embodiments, the social community module 106 (e.g., that applies the Bezier curve algorithm 240 of FIG. 2 using a series of modules working in concert as described in FIG. 2) may prevent the broadcast of the neighborhood broadcast data to any geospatial area to which the user 116 does not wish to transmit the neighborhood broadcast data, and/or to users that have either muted and/or selectively subscribed to a set of broadcast feeds.

The social community module 106 (e.g., that applies the Bezier curve algorithm 240 of FIG. 2 using a series of modules working in concert as described in FIG. 2) may analyze the neighborhood broadcast data to determine which recipients (e.g., other users of the neighborhood communication system 150 such as neighbors 128 of FIG. 1) may receive notification data 112 within the threshold radial distance (e.g., set by the user 116 and/or auto calculated based on a type of emergency posting). The social community module 106 (e.g., that applies the Bezier curve algorithm 240 of FIG. 2 using a series of modules working in concert as described in FIG. 2) may use a variety of parameters, including information associated with the neighborhood broadcast data (e.g., location of the broadcast, type of broadcast, etc.) to determine the threshold radial distance.

The social community module 106 (e.g., that applies the Bezier curve algorithm 240 of FIG. 2 using a series of modules working in concert as described in FIG. 2) may also determine which verified addresses associated with recipients (e.g., other users of the neighborhood communication system 150 such as neighbors 128 of FIG. 1) having verified user profiles are located within the threshold radial distance. The social community module 106 (e.g., that applies the Bezier curve algorithm 240 of FIG. 2 using a series of modules working in concert as described in FIG. 2) may then broadcast the notification data 112 to the profiles and/or mobile devices of the verified users having verified addresses within the threshold radial distance.

The social community module 106 (e.g., that applies the Bezier curve algorithm 240 of FIG. 2 using a series of modules working in concert as described in FIG. 2) may therefore simulate traditional radio broadcasting (e.g., from a radio station transmission tower) over the IP network. Thus, the social community module 106 (e.g., that applies the Bezier curve algorithm 240 of FIG. 2 using a series of modules working in concert as described in FIG. 2) may allow the broadcast to include information and data that traditional radio broadcasts may not be able to convey, for example geospatial coordinates and/or real-time bi-directional communications. Additionally, the social community module 106 (e.g., that applies the Bezier curve algorithm 240 of FIG. 2 using a series of modules working in concert as described in FIG. 2) may allow individual users low-entry broadcast capability without resort to expensive equipment and/or licensing by the Federal Communications Commission (FCC).

Another advantage of this broadcast via the social community module 106 (e.g., that applies the Bezier curve algorithm 240 of FIG. 2 using a series of modules working in concert as described in FIG. 2) may be that it may bypass obstructions that traditionally disrupt radio waves such as mountains and/or atmospheric disturbances. Yet another advantage of the social community module 106 (e.g., that applies the Bezier curve algorithm 240 of FIG. 2 using a series of modules working in concert as described in FIG. 2) may be that it may expand the physical distance of broadcast capability without resort to the expense ordinarily associated with generating powerful carrier signals. In yet another advantage, the social community module 106 (e.g., that applies the Bezier curve algorithm 240 of FIG. 2 using a series of modules working in concert as described in FIG. 2) may allow for almost unlimited channels and/or stations as compared to traditional radio where only a narrow band of electromagnetic radiation has been appropriated for use among a small number of entities by government regulators (e.g., the FCC).

The claimable module 110 may enable the registered users to create and/or update their information. A 'claimable' (e.g., may be enabled through the claimable module 110) can be defined as a perpetual collective work of many authors. Similar to a blog in structure and logic, a claimable allows anyone to edit, delete or modify content that has been placed on the Web site using a browser interface, including the work of previous authors. In contrast, a blog (e.g., or a social network page), typically authored by an individual, may not allow visitors to change the original posted material, only add comments to the original content. The term claimable refers to either the web site or the software used to create the site. The term 'claimable' also implies fast creation, ease of creation, and community approval in many software contexts (e.g., claimable means "quick" in Hawaiian).

The commerce module 112 may provide an advertisement system to a business that may enable the users to purchase location in the neighborhood(s) 102. The map module 114 may be indulged in study, practice, representing and/or generating maps, or globes. The user 116 may be an individuals and/or households that may purchase and/or use goods and services and/or be an active member of any group or community and/or resident and/or a part of any neighborhood(s) 102. The residence 118 may be a house, a place to live and/or like a nursing home in a neighborhood(s) 102.

The community center 120 may be public locations where members of a community may gather for group activities, social support, public information, and other purposes. The business 122 may be a customer service, finance, sales, production, communications/public relations and/or marketing organization that may be located in the neighborhood(s) 102. The advertiser(s) 124 may be an individual and/or a firm drawing public who may be responsible in encouraging the people attention to goods and/or services by promoting businesses, and/or may perform through a variety of media. The mapping server 126 may contain the details/maps of any area, region and/or neighborhood. The social community module 106 of the privacy server 100 may communicate with the neighborhood(s) 102 through the network 104 and/or the search module 108. The social community module 106 of the privacy server 100 may communicate with the advertiser(s) 124 through the commerce module, the database of neighbors 128 (e.g., occupant data) and/or mapping server 126 through the map module 114.

For example, the neighborhoods 102A-N may have registered users and/or unregistered users of a privacy server 100. Also, the social community module 106 of the privacy server 100 may generate a building creator (e.g., building builder 1602 of FIG. 16) in which the registered users may create and/or modify empty claimable profiles, building layouts, social network pages, and/or floor levels structures housing residents and/or businesses in the neighborhood.

In addition, the claimable module 110 of the privacy server 100 may enable the registered users to create a social network page of themselves, and/or may edit information associated with the unregistered users identifiable through a viewing of physical properties in which, the unregistered users reside when the registered users have knowledge of characteristics associated with the unregistered users.

Furthermore, the search module 108 of the privacy server 100 may enable a people search (e.g., the people search widget 300 of FIG. 3), a business search (e.g., the business search module 302 of FIG. 3), and/or a category search (e.g., the category search widget 304 of FIG. 3) of any data in the social community module 106 and/or may enable embedding of any content in the privacy server 100 in other search engines, blogs, social networks, professional networks and/or static websites.

The commerce module 112 of the privacy server 100 may provide an advertisement system to a business who purchase their location in the privacy server 100 in which the advertisement may be viewable concurrently with a map indicating a location of the business, and/or in which revenue may be attributed to the privacy server 100 when the registered users and/or the unregistered users click-in on a simultaneously displayed data of the advertisement along with the map indicating a location of the business.

Moreover, a map module 114 of the privacy server 100 may include a map data associated with a satellite data (e.g., generated by the satellite data module 600 of FIG. 6) which may serve as a basis of rendering the map in the privacy server 100 and/or which includes a simplified map generator which may transform the map to a fewer color and/or location complex form using a parcel data which identifies some residence, civic, and/or business locations in the satellite data.

In addition, a first instruction set may enable a social network to reside above a map data, in which the social network may be associated with specific geographical locations identifiable in the map data. Also, a second instruction set integrated with the first instruction set may enable users of the social network to create profiles of other people through a forum which provides a free form of expression of the users sharing information about any entities and/or people residing in any geographical location identifiable in the satellite map data, and/or to provide a technique of each of the users to claim a geographic location (e.g., a geographic location 1024 of FIG. 12A) to control content in their respective claimed geographic locations (e.g., a geographic location 1024 of FIG. 12A).

Figure 12A:
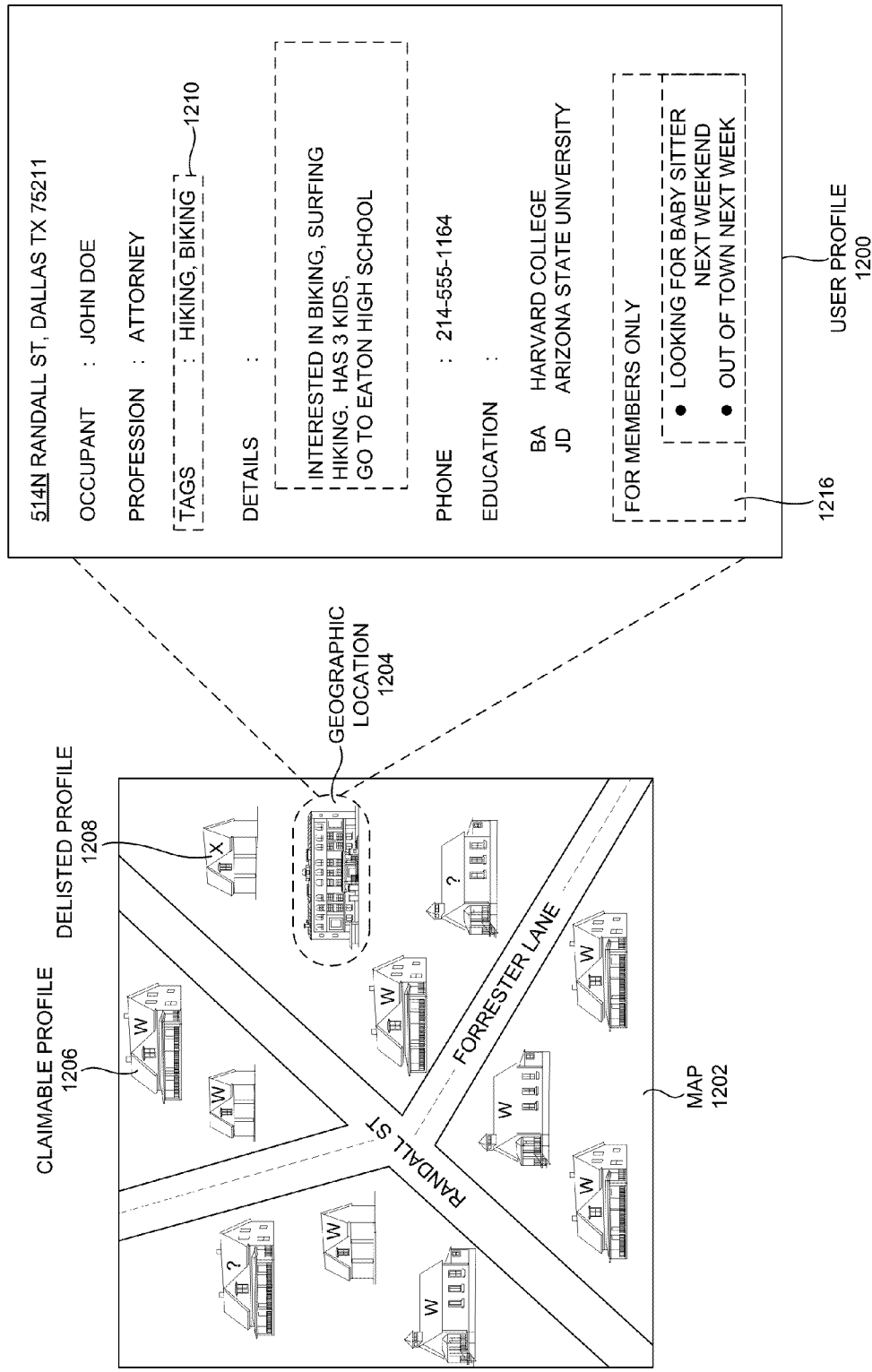
FIG. 12A is a user interface view of mapping user profile of the geographical location, according to one embodiment.

Furthermore, a third instruction set integrated with the first instruction set and the second instruction set may enable searching of people in the privacy server 100 by indexing each of the data shared by the user 116 of any of the people and/or the entities residing in any geographic location (e.g., a geographic location 1024 of FIG. 12A). A fourth instruction set may provide a moderation of content about each other posted of the users 116 through trusted users of the privacy server 100 who have an ability to ban specific users and/or delete any offensive and libelous content in the privacy server 100.

Also, a fifth instruction set may enable an insertion of any content generated in the privacy server 100 in other search engines through a syndication and/or advertising relationship between the privacy server 100 and/or other internet commerce and search portals.

Moreover, a sixth instruction set may grow the social network through neighborhood groups, local politicians, block watch communities, issue activism groups, and neighbor(s) 120 who invite other known parties and/or members to share profiles of themselves and/or learn characteristics and information about other supporters and/or residents in a geographic area of interest through the privacy server 100.

Also, a seventh instruction set may determine quantify an effect on at least one of a desirability of a location, a popularity of a location, and a market value of a location based on an algorithm that considers a number of demographic and social characteristics of a region surrounding the location through a reviews module.

Figure 2:
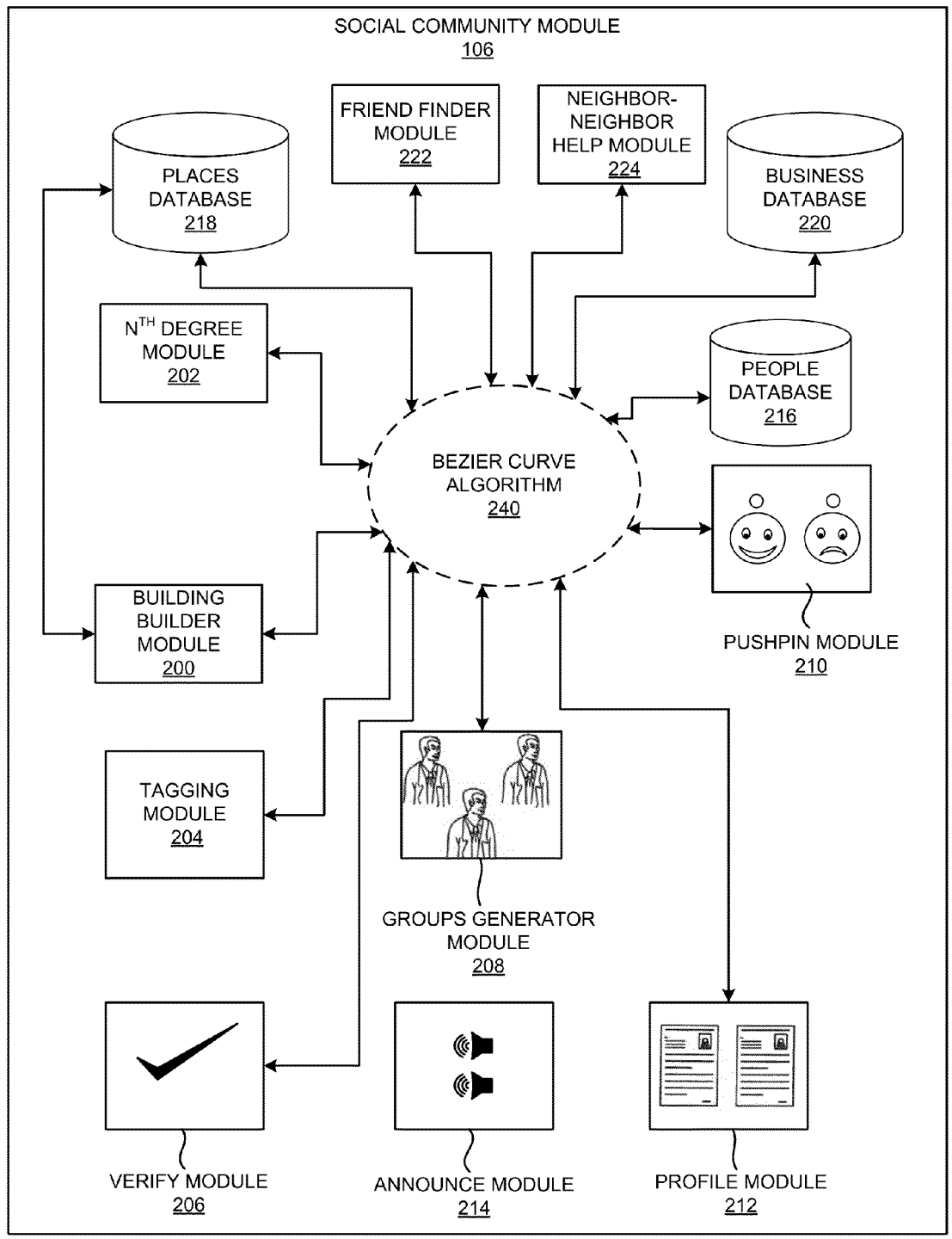
FIG. 2 is an exploded view of a social community module of FIG. 1, according to one embodiment.

FIG. 2 is an exploded view of the social community module 106 of FIG. 1, according to one embodiment. Particularly FIG. 2 illustrates a building builder module 200, an $N^{th}$ degree module 202, a tagging module 204, a verify module 206, a groups generator module 208, a pushpin module 210, a profile module 212, an announce module 214, a people database 216, a places database 218, a business database 220, a friend finder module 222 and a neighbor-neighbor help module 224, according to one embodiment.

The $N^{th}$ degree module 202 may enable the particular registered user to communicate with an unknown registered user through a common registered user who may be a friend and/or a member of a common community. The tagging module 204 may enable the user 116 to leave brief comments on each of the claimable profiles (e.g., the claimable profile 1206 of FIG. 12A-12B, the claimable profile 1302 of FIG. 13A, the claimable profile 1704 of FIG. 17) and social network pages in the global neighborhood environment (e.g., the privacy server 100 of FIG. 1).

The verify module 206 may validate the data, profiles and/or email addresses received from various registered user(s) before any changes may be included. The groups generator module 208 may enable the registered users to form groups may be depending on common interest, culture, style, hobbies and/or caste. The pushpin module 210 may generate customized indicators of different types of users, locations, and interests directly in the map. The profile module 212 may enable the user to create a set of profiles of the registered users and to submit media content of themselves, identifiable through a map.

The announce module 214 may distribute a message in a specified range of distance away from the registered users when a registered user purchases a message to communicate to certain ones of the registered users surrounding a geographic vicinity adjacent to the particular registered user originating the message. The people database 216 may keep records of the visitor/users (e.g., a user 116 of FIG. 1). The places database module 218 may manage the data related to the location of the user (e.g., address of the registered user). The business database 220 may manage an extensive list of leading information related to business. The friend finder module 222 may match the profile of the registered user with common interest and/or help the registered user to get in touch with new friends or acquaintances.

For example, the verify module 206 of the social community module 106 of FIG. 1 may authenticate an email address of a registered user prior to enabling the registered user to edit information associated with the unregistered users through an email response and/or a digital signature technique. The groups generator module 208 of the social community module (e.g., the social community module 106 of FIG. 1) may enable the registered users to form groups with each other surrounding at least one of a common neighborhood (e.g., a neighborhood 102A-N of FIG. 1), political, cultural, educational, professional and/or social interest.

In addition, the tagging module 204 of the social community module (e.g., the social community module 106 of FIG. 1) may enable the registered users and/or the unregistered users to leave brief comments on each of the claimable profiles (e.g., the claimable profile 1206 of FIG. 12A-12B, the claimable profile 1302 of FIG. 13A, the claimable profile 1704 of FIG. 17) and/or social network pages in the global neighborhood environment (e.g., the privacy server 100 of FIG. 1), in which the brief comments may be simultaneously displayed when a pointing device rolls over a pushpin indicating a physical property associated with any of the registered users and/or the unregistered users. Also, the pushpin module 210 of the social community module 106 of FIG. 1 may be generating customized indicators of different types of users, locations, and/or interests directly in the map.

Further, the announce module 214 of the social community module 106 of FIG. 1 may distribute a message in a specified range of distance away from the registered users when a registered user purchases a message to communicate to certain ones of the registered users surrounding a geographic vicinity adjacent to the particular registered user originating the message, wherein the particular registered user purchases the message through a governmental currency and/or a number of tokens collected by the particular user (e.g. the user 116 of FIG. 1) through a creation of content in the global neighborhood environment (e.g., the privacy server 100 of FIG. 1).

In addition, the $N^{th}$ degree module 202 of the social community module 106 of FIG. 1 may enable the particular registered user to communicate with an unknown registered user through a common registered user known by the particular registered user and/or the unknown registered user that is an $N^{th}$ degree of separation away from the particular registered user and/or the unknown registered user.

Moreover, the profile module 212 of the social community module 106 of FIG. 1 may create a set of profiles of each one of the registered users and to enable each one of the registered users to submit media content of themselves, other registered users, and unregistered users identifiable through the map.

FIG. 3 is an exploded view of the search module 108 of FIG. 1, according to one embodiment. Particularly FIG. 3 illustrates a people search widget 300, a business search module 302, a category search widget 304, a communication module 306, a directory assistance module 308, an embedding module 310, a no-match module 312, a range selector module 314, a chat widget 316, a group announcement widget 318, a Voice Over IP widget 320, according to one embodiment.

The people search widget 300 may help in getting the information like the address, phone number and/or e-mail id of the people of particular interest from a group and/or community. The business search module 302 may help the users (e.g., the user 116 of FIG. 1) to find the companies, products, services, and/or business related information they need to know about.

The category search widget 304 may narrow down searches from a broader scope (e.g., if one is interested in information from a particular center, one can go to the category under the center and enter one's query there and it will return results from that particular category only). The communication module 306 may provide/facilitate multiple by which one can communicate, people to communicate with, and subjects to communicate about among different members of the global neighborhood environment (e.g., the privacy server 100 of FIG. 1).

The directory assistance module 308 may provide voice response assistance to users (e.g., the user 116 of FIG. 1) assessable through a web and telephony interface of any category, business and search queries of user's of any search engine contents. The embedding module 310 may automatically extract address and/or contact info from other social networks, search engines, and content providers.

Figure 13B:
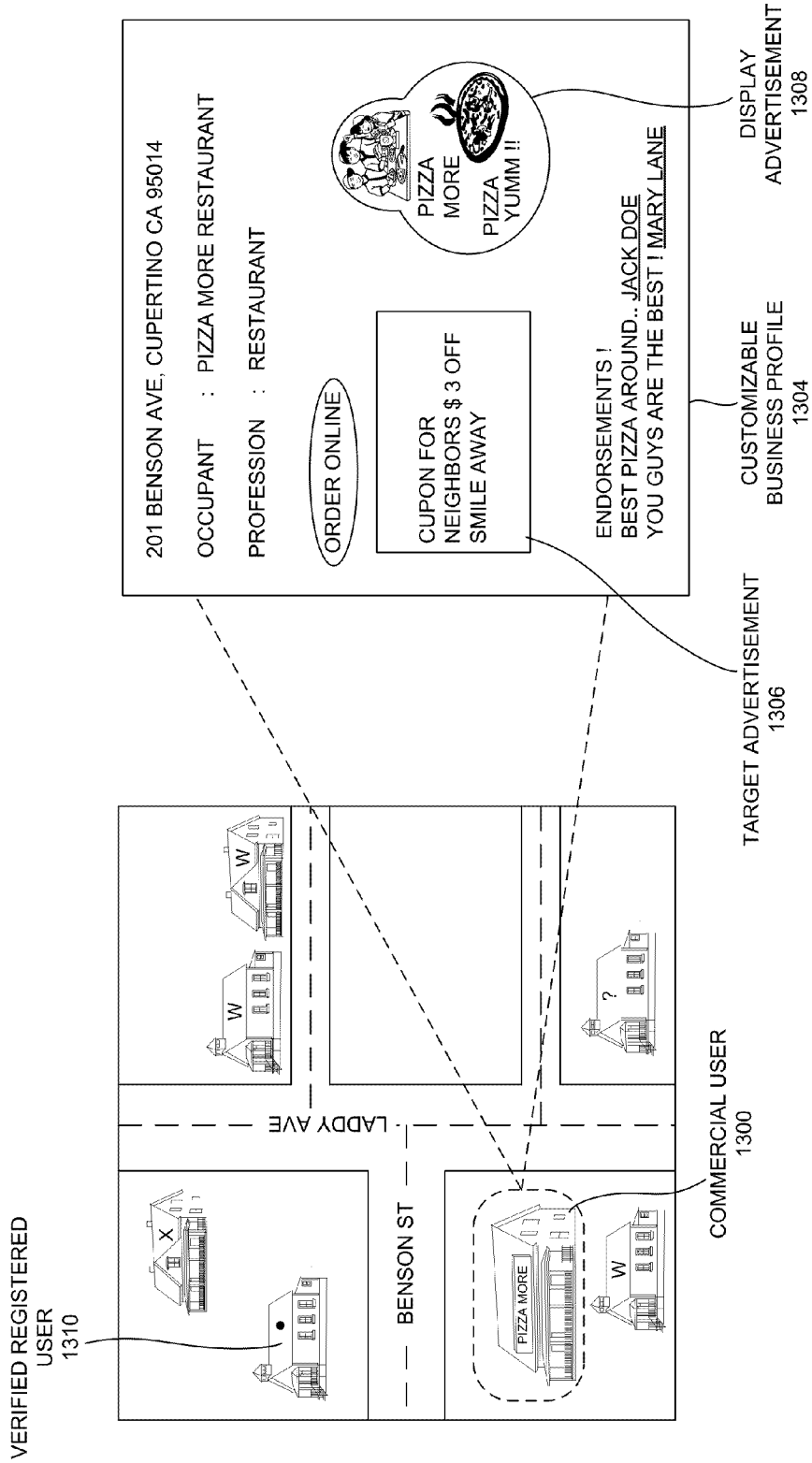
FIG. 13B is a user interface view of mapping of customizable business profile of the commercial user, according to one embodiment.
Figure 16:
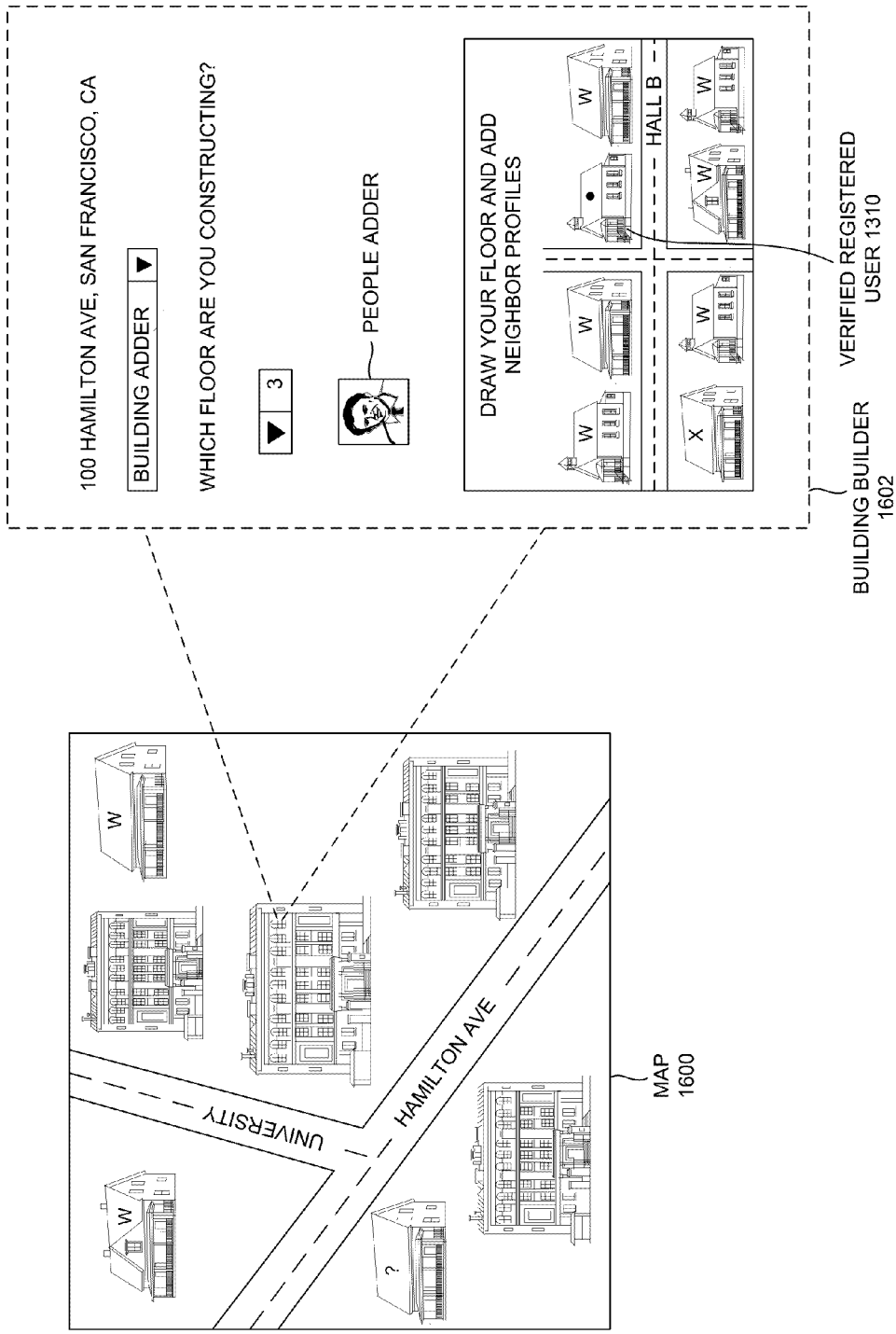
FIG. 16 is a user interface view of a building builder, according to one embodiment.

The no-match module 312 may request additional information from a verified registered user (e.g., a verified registered user 1310 of FIG. 13A-B, a verified registered user 1310 of FIG. 16) about a person, place, and business having no listing in the global neighborhood environment (e.g., the privacy server 100 of FIG. 1) when no matches are found in a search query of the verified registered user (e.g., a verified registered user 1310 of FIG. 13A-B, a verified registered user 1310 of FIG. 16).

The chat widget 316 may provide people to chat online, which is a way of communicating by broadcasting messages to people on the same site in real time. The group announcement widget 318 may communicate with a group and/or community in may be by Usenet, Mailing list, calling and/or E-mail message sent to notify subscribers. The Voice over IP widget 320 may help in routing of voice conversations over the Internet and/or through any other IP-based network. The communication module 306 may communicate directly with the people search widget 300, the business search module 302, the category search widget 304, the directory assistance module 308, the embedding module 310 may communicate with the no-match module 312 through the range selector module 314.

For example, a search module 108 of the global neighborhood environment (e.g., the privacy server 100 of FIG. 1) may enable the people search, the business search, and the category search of any data in the social community module (e.g., the social community module 106 of FIG. 1) and/or may enable embedding of any content in the global neighborhood environment (e.g., the privacy server 100 of FIG. 1) in other search engines, blogs, social networks, professional networks and/or static websites.

In addition, the communicate module 306 of the search module 106 may enable voice over internet, live chat, and/or group announcement functionality in the global neighborhood environment (e.g., the privacy server 100 of FIG. 1) among different members of the global neighborhood environment (e.g., the privacy server 100 of FIG. 1).

Also, the directory assistance module 308 of the search module 108 may provide voice response assistance to users (e.g., the user 116 of FIG. 1) assessable through a web and/or telephony interface of any category, business, community, and residence search queries of users (e.g., the user 116 of FIG. 1) of any search engine embedding content of the global neighborhood environment (e.g., the privacy server 100 of FIG. 1).

The embedding module 310 of the search module 108 may automatically extract address and/or contact info from other social networks, search engines, and content providers, and/or to enable automatic extraction of group lists from contact databases of instant messaging platforms.

Furthermore, the no-match module 312 of the search module 108 to request additional information from the verified registered user (e.g., the verified registered user 1310 of FIG. 13A-B) about a person, place, and/or business having no listing in the global neighborhood environment (e.g., the privacy server 100 of FIG. 1) when no matches are found in a search query of the verified registered user (e.g., the verified registered user 1310 of FIG. 13A-B, the verified registered user 1310 of FIG. 16) and to create a new claimable page based on a response of the verified registered user (e.g., the verified registered user 1310 of FIG. 13A-B, the verified registered user 1310 of FIG. 16) about the at least one person, place, and/or business not previously indexed in the global neighborhood environment (e.g., the privacy server 100 of FIG. 1).

Figure 4:
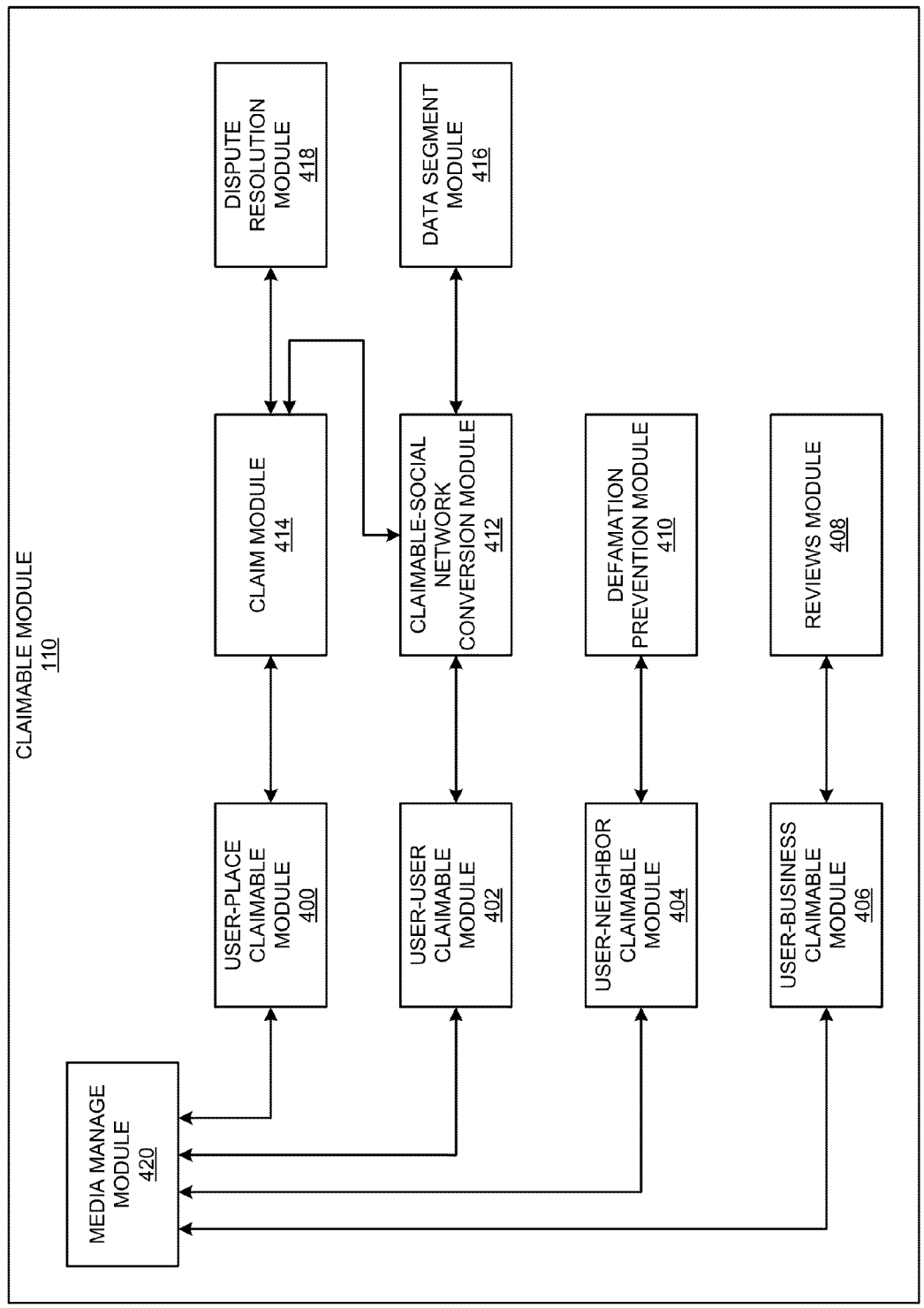
FIG. 4 is an exploded view of a claimable module of FIG. 1, according to one embodiment.

FIG. 4 is an exploded view of the claimable module 110 of FIG. 1, according to one embodiment. Particularly FIG. 4 illustrates a user-place claimable module 400, a user-user claimable module 402, a user-neighbor claimable module 404, a user-business claimable module 406, a reviews module 408, a defamation prevention module 410, a claimable-social network conversion module 412, a claim module 414, a data segment module 416, a dispute resolution module 418 and a media manage module 420, according to one embodiment.

The user-place claimable module 400 may manage the information of the user (e.g., the user 116 of FIG. 1) location in the global neighborhood environment (e.g., the privacy server 100 of FIG. 1). The user-user claimable module 402 may manage the user (e.g., the user 116 of FIG. 1) to view a profile of another user and geographical location in the neighborhood. The user-neighbor claimable module 404 may manage the user (e.g., the users 116 of FIG. 1) to view the profile of the registered neighbor and/or may trace the geographical location of the user in the global neighborhood environment (e.g., the privacy server 100 of FIG. 1). The user-business claimable module 406 may manage the profile of the user (e.g., the user 116 of FIG. 1) managing a commercial business in the neighborhood environment. The reviews module 408 may provide remarks, local reviews and/or ratings of various businesses as contributed by the users (e.g., the user 116 of FIG. 1) of the global neighborhood environment (e.g., the privacy server 100 of FIG. 1). The defamation prevention module 410 may enable the registered users to modify the information associated with the unregistered users identifiable through the viewing of the physical properties.

Figure 12B:
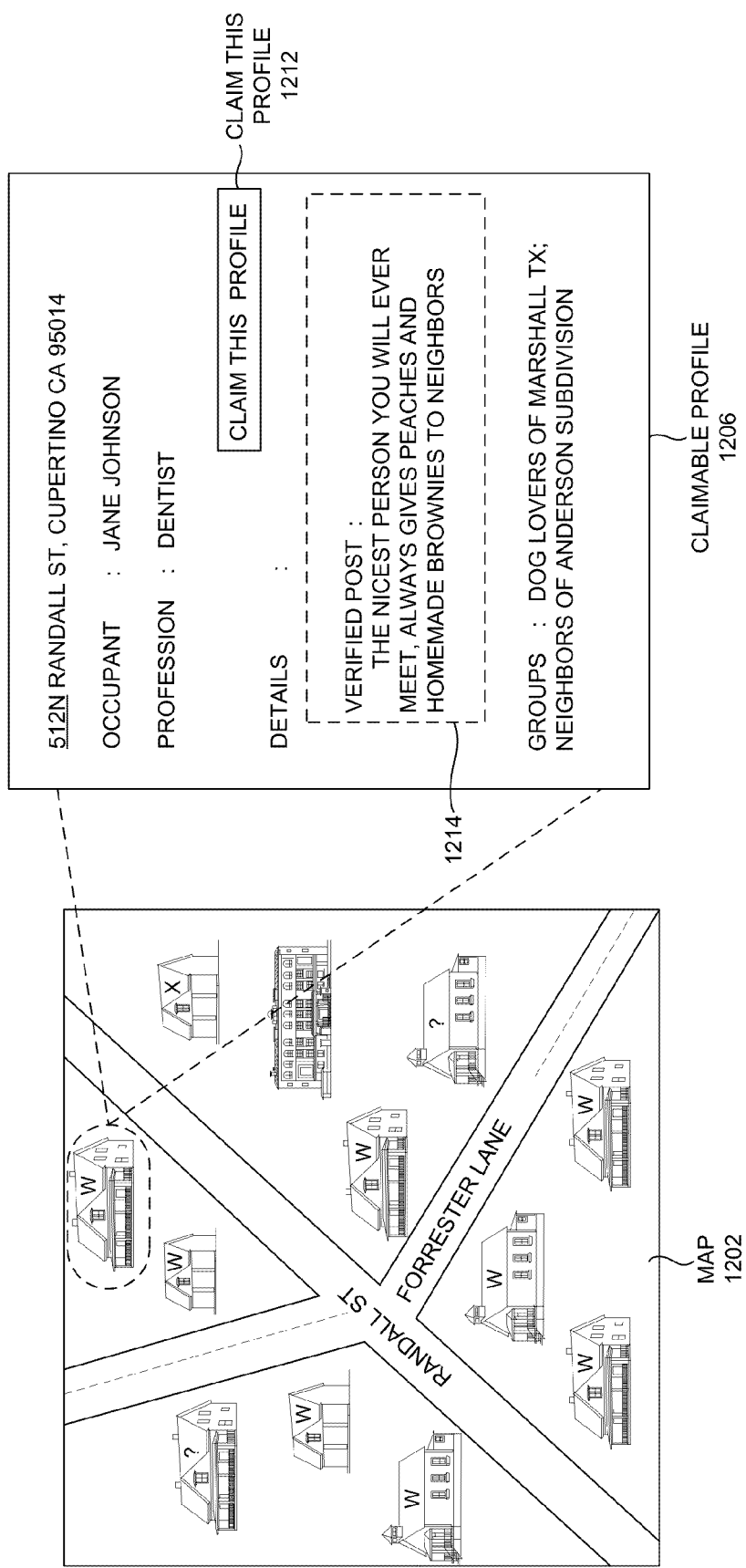
FIG. 12B is a user interface view of mapping of the claimable profile, according to one embodiment.
Figure 17:
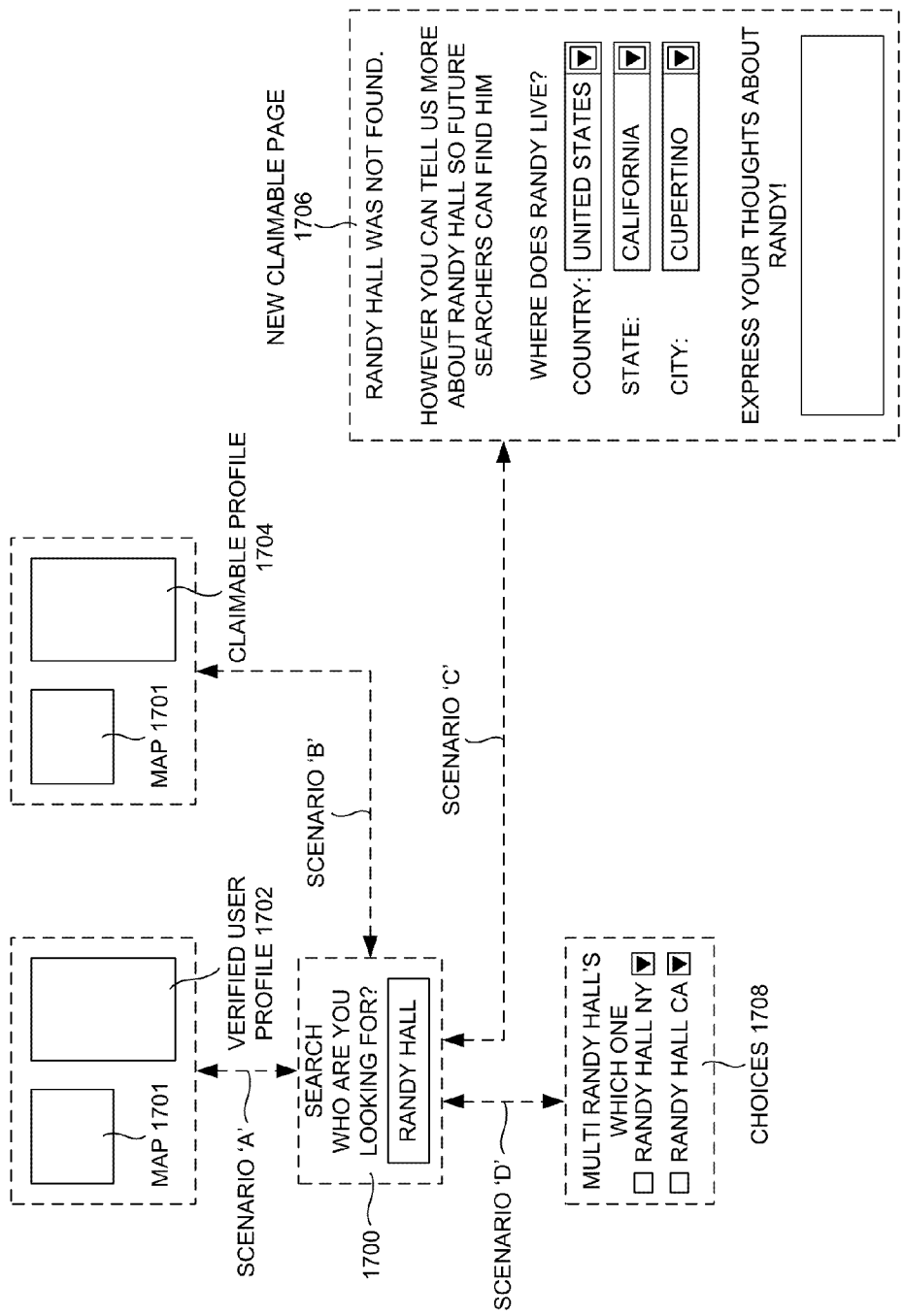
FIG. 17 is a systematic view of communication of claimable data, according to one embodiment.

The claimable-social network conversion module 412 of the claimable module 110 of FIG. 1 may transform the claimable profiles (e.g., the claimable profile 1206 of FIG. 12A-12B, the claimable profile 1302 of FIG. 13A, the claimable profile 1704 of FIG. 17) to social network profiles when the registered users claim the claimable profiles (e.g., the claimable profile 1206 of FIG. 12A-12B, the claimable profile 1302 of FIG. 13A, the claimable profile 1704 of FIG. 17).

The claim module 414 may enable the unregistered users to claim the physical properties associated with their residence (e.g., the residence 118 of FIG. 1). The dispute resolution module 418 may determine a legitimate user among different unregistered users who claim a same physical property. The media manage module 420 may allow users (e.g., the user 116 of FIG. 1) to manage and/or review a list any product from product catalog using a fully integrated, simple to use interface.

The media manage module 420 may communicate with the user-place claimable module 400, user-place claimable module 400, user-user claimable module 402, the user-neighbor claimable module 404 and the reviews module 408 through user-business claimable module 406. The user-place claimable module 400 may communicate with the dispute resolution module 418 through the claim module 414. The user-user claimable module 402 may communicate with the data segment module 416 through the claimable-social network conversion module 412. The user-neighbor claimable module 404 may communicate with the defamation prevention module 410. The user-business claimable module 406 may communicate with the reviews module 408. The claimable-social network conversion module 412 may communicate with the claim module 414.

For example, the claimable module 110 of the global neighborhood environment (e.g., the privacy server 100 of FIG. 1) may enable the registered users to create the social network page of themselves, and may edit information associated with the unregistered users identifiable through a viewing of physical properties in which the unregistered users reside when the registered users have knowledge of characteristics associated with the unregistered users. Also, the claim module 414 of claimable module 110 may enable the unregistered users to claim the physical properties associated with their residence.

Furthermore, the dispute resolution module 418 of the claimable module 110 may determine a legitimate user of different unregistered users who claim a same physical property. The defamation prevention module 410 of the claimable module 110 may enable the registered users to modify the information associated with the unregistered users identifiable through the viewing of the physical properties, and/or to enable registered user voting of an accuracy of the information associated with the unregistered users.

Moreover, the reviews module of the claimable module 110 may provide comments, local reviews and/or ratings of various businesses as contributed by the registered users and/or unregistered users of the global network environment (e.g., the privacy server 100 of FIG. 1). The claimable-social network conversion module 412 of the claimable module 110 of FIG. 1 may transform the claimable profiles (e.g., the claimable profile 1206 of FIG. 12A-12B, the claimable profile 1302 of FIG. 13A, the claimable profile 1704 of FIG. 17) to social network profiles when the registered users claim the claimable profiles (e.g., the claimable profile 1206 of FIG. 12A-12B, the claimable profile 1302 of FIG. 13A, the claimable profile 1704 of FIG. 17).

Figure 5:
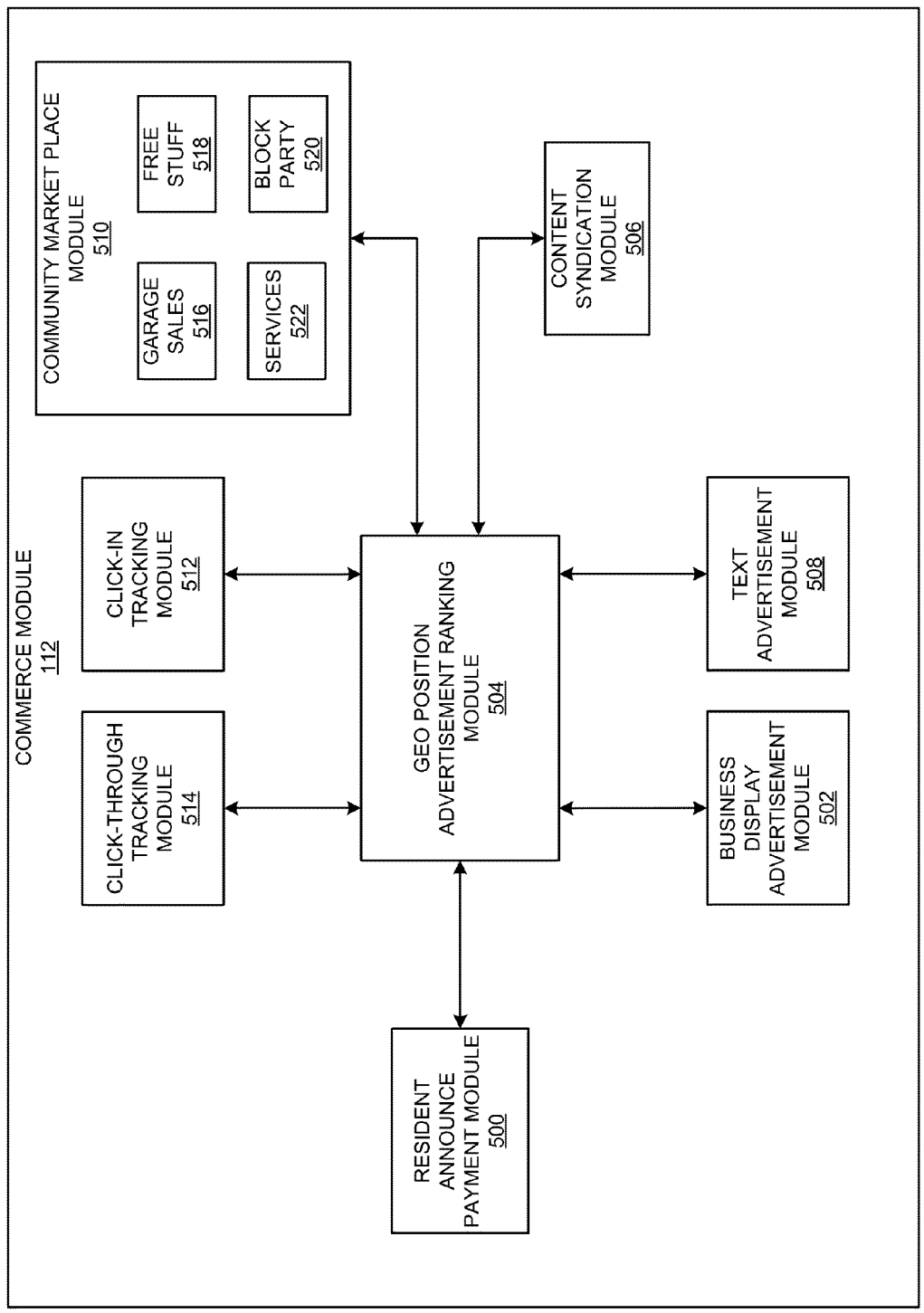
FIG. 5 is an exploded view of a commerce module of FIG. 1, according to one embodiment.

FIG. 5 is an exploded view of the commerce module 112 of FIG. 1, according to one embodiment. Particularly FIG. 5 illustrates a resident announce payment module 500, a business display advertisement module 502, a geo position advertisement ranking module 504, a content syndication module 506, a text advertisement module 508, a community marketplace module 510, a click-in tracking module 512, a click-through tracking module 514, according to one embodiment.

The community marketplace module 510 may contain garage sales 516, a free stuff 518, a block party 520 and a services 522, according to one embodiment. The geo-position advertisement ranking module 504 may determine an order of the advertisement in a series of other advertisements provided in the global neighborhood environment (e.g., the privacy server 100 of FIG. 1) by other advertisers. The click-through tracking module 514 may determine a number of clicks-through from the advertisement to a primary website of the business.

A click-in tracking module 512 may determine a number of user (e.g., the user 116 of FIG. 1) who clicked in to the advertisement simultaneously. The community marketplace module 510 may provide a forum in which the registered users can trade and/or announce messages of trading events with at least each other. The content syndication module 506 may enable any data in the commerce module (e.g., the commerce module 112 of FIGS. 1, 5) to be syndicated to other network based trading platforms.

The business display advertisement module 502 may impart advertisements related to business (e.g., the business 122 of FIG. 1), public relations, personal selling, and/or sales promotion to promote commercial goods and services. The text advertisement module 508 may enable visibility of showing advertisements in the form of text in all dynamically created pages in the directory. The resident announce payment module 500 may take part as component in a broader and complex process, like a purchase, a contract, etc.

The block party 520 may be a large public celebration in which many members of a single neighborhood (e.g., the neighborhood 102A-N of FIG. 1) congregate to observe a positive event of some importance. The free stuff 518 may be the free services (e.g., advertisement, links, etc.) available on the net. The garage sales 516 may be services that may be designed to make the process of advertising and/or may find a garage sale more efficient and effective. The services 522 may be non-material equivalent of a good designed to provide a list of services that may be available for the user (e.g., the user 116 of FIG. 1).

The geo position advertisement ranking module 504 may communicate with the resident announce payment module 500, the business display advertisement module 502, the content syndication module 506, the text advertisement module 508, the community marketplace module 510, the click-in tracking module 512 and the click-through tracking module 514.

For example, the commerce module 108 of the global neighborhood environment (e.g., the privacy server 100 of FIG. 1) may provide an advertisement system to a business which may purchase their location in the global neighborhood environment (e.g., the privacy server 100 of FIG. 1) in which the advertisement may be viewable concurrently with a map indicating a location of the business, and/or in which revenue may be attributed to the global neighborhood environment (e.g., the privacy server 100 of FIG. 1) when the registered users and/or the unregistered users click-in on a simultaneously displayed data of the advertisement along with the map indicating a location of the business.

Also, the geo-position advertisement ranking module 504 of the commerce module 112 to determine an order of the advertisement in a series of other advertisements provided in the global neighborhood environment (e.g., the privacy server 100 of FIG. 1) by other advertisers, wherein the advertisement may be a display advertisement, a text advertisement, and/or an employment recruiting portal associated with the business that may be simultaneously displayed with the map indicating the location of the business.

Moreover, the click-through tracking module 514 of the commerce module 112 of FIG. 1 may determine a number of click-through from the advertisement to a primary website of the business. In addition, the click in tracking module 512 of the commerce module 112 may determine the number of users (e.g., the user 116 of FIG. 1) who clicked in to the advertisement simultaneously displayed with the map indicating the location of the business.

The community marketplace module 510 of the commerce module 112 of FIG. 1 may provide a forum in which the registered users may trade and/or announce messages of trading events with certain registered users in geographic proximity from each other.

Also, the content syndication module 506 of the commerce module 112 of the FIG. 1 may enable any data in the commerce module 112 to be syndicated to other network based trading platforms.

Figure 6:
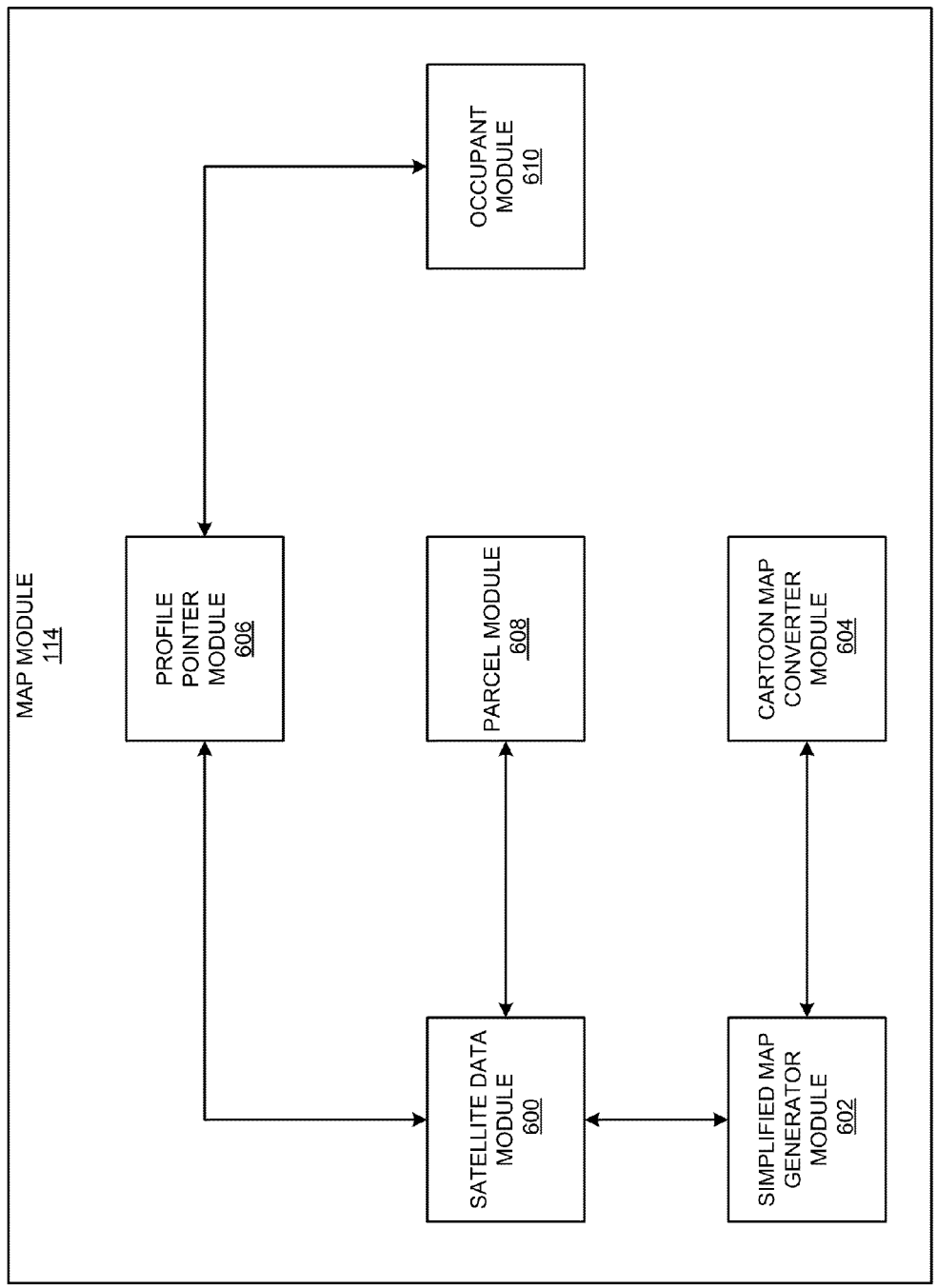
FIG. 6 is an exploded view of a map module of FIG. 1, according to one embodiment.

FIG. 6 is an exploded view of a map module 114 of FIG. 1, according to one embodiment. Particularly FIG. 6 may include a satellite data module 600, a simplified map generator module 602, a cartoon map converter module 604, a profile pointer module 606, a parcel module 608 and occupant module 610, according to one embodiment. The satellite data module 600 may help in mass broadcasting (e.g., maps) and/or as telecommunications relays in the map module 114 of FIG. 1.

The simplified map generator module 602 may receive the data (e.g., maps) from the satellite data module 600 and/or may convert this complex map into a simplified map with fewer colors. The cartoon map converter module 604 may apply a filter to the satellite data (e.g., data generated by the satellite data module 600 of FIG. 6) into a simplified polygon based representation.

The parcel module 608 may identify some residence, civic, and business locations in the satellite data (e.g., the satellite data module 600 of FIG. 6). The occupant module 610 may detect the geographical location of the registered user in the global neighborhood environment (e.g., the privacy server 100 of FIG. 1). The profile pointer module 606 may detect the profiles of the registered user via the data received from the satellite. The cartoon map converter module 604 may communicate with, the satellite data module 600, the simplified map generator module 602, the profile pointer module 606 and the occupant module 610. The parcel module 608 may communicate with the satellite data module 600.

For example, a map module 114 of the global neighborhood environment (e.g., the privacy server 100 of FIG. 1) may include a map data associated with a satellite data (e.g., data generated by the satellite data module 600 of FIG. 6) which serves as a basis of rendering the map in the global neighborhood environment (e.g., the privacy server 100 of FIG. 1) and/or which includes a simplified map generator (e.g., the simplified map generator module 602 of FIG. 6) which may transform the map to a fewer color and location complex form using a parcel data which identifies residence, civic, and business locations in the satellite data.

Also, the cartoon map converter module 604 in the map module 114 may apply a filter to the satellite data (e.g., data generated by the satellite data module 600 of FIG. 6) to transform the satellite data into a simplified polygon based representation using a Bezier curve algorithm that converts point data of the satellite data to a simplified form.

FIG. 7 is a table view of user address details, according to one embodiment. Particularly the table 750 of FIG. 7 illustrates a user field 700, a verified? field 702, a range field 704, a principle address field 706, a links field 708, a contributed? field 710 and an others field 712, according to one embodiment. The table 750 may include the information related to the address verification of the user (e.g., the user 116 of FIG. 1). The user field 700 may include information such as the names of the registered users in a global neighborhood environment (e.g., a privacy server 100 of FIG. 1).

The verified? field 702 may indicate the status whether the data, profiles and/or email address received from various registered user are validated or not. The range field 704 may correspond to the distance of a particular registered user geographical location in the global neighborhood environment (e.g., the privacy server 100 of FIG. 1).

The principal address field 706 may display primary address of the registered user in the global neighborhood environment (e.g., the privacy server 100 of FIG. 1). The links field 708 may further give more accurate details and/or links of the address of the user (e.g., the user 116 of FIG. 1). The contributed? field 710 may provide the user with the details of another individual and/or users contribution towards the neighborhood environment (e.g., the privacy server 100 of FIG. 1). The other(s) field 712 may display the details like the state, city, zip and/or others of the user's location in the global neighborhood environment (e.g., the privacy server 100 of FIG. 1).

The user field 700 displays "Joe" in the first row and "Jane" in the second row of the user field 700 column of the table 750 illustrated in FIG. 7. The verified field? 702 displays "Yes" in the first row and "No" in the second row of the verified? field 702 column of the table 750 illustrated in FIG. 7. The range field 704 displays "5 miles" in the first row and "Not enabled" in the second row of the range field 704 column of the table 750 illustrated in FIG. 7. The principal address field 706 displays "500 Clifford Cupertino, Calif." in the first row and "500 Johnson Cupertino, Calif." in the second row of the principle address field 706 column of the table 750 illustrated in FIG. 7. The links field 708 displays "859 Bette, 854 Bette" in the first row and "851 Bette 100 Steven's Road" in the second row of the links field 708 column of the table 750 illustrated in FIG. 7.

The contributed? field 710 displays "858 Bette Cupertino, Calif., Farallone, Calif." in the first row and "500 Hamilton, Palo Alto, Calif., 1905E. University" in the second row of the contributed field 710 column of the table 750 illustrated in FIG. 7. The other(s) field 712 displays "City, State, Zip, other" in the first row of the other(s) field 712 column of the table 750 illustrated in FIG. 7.

FIG. 8 is a user interface view of the social community module 106, according to one embodiment. The user interface view 850 may display the information associated with the social community module (e.g., the social community module 106 of FIG. 1). The user interface 850 may display map of the specific geographic location associated with the user profile of the social community module (e.g., the social community module 106 of FIG. 1). The user interface view 850 may display the map based geographic location associated with the user profile (e.g., the user profile 1200 of FIG. 12A) only after verifying the address of the registered user of the global neighborhood environment (e.g., the privacy server 100 of FIG. 1).

In addition, the user interface 850 may provide a building creator (e.g., the building builder 1602 of FIG. 16), in which the registered users of the global neighborhood environment (e.g., the privacy server 100 of FIG. 1) may create and/or modify empty claimable profiles (e.g., a claimable profile 1206 of FIG. 12A-12B, a claimable profile 1302 of FIG. 13A, a claimable profile 1704 of FIG. 17), building layouts, social network pages, etc. The user interface view 850 of the social community module 106 may enable access to the user (e.g., the user 116 of FIG. 1) to model a condo on any floor (e.g., basement, ground floor, first floor, etc.) selected through the drop down box by the registered user of the global neighborhood environment (e.g., the privacy server 100 of FIG. 1). The user interface 850 of the social community module (e.g., the social community module 106 of FIG. 1) may enable the registered user of the global neighborhood environment (e.g., the privacy server 100 of FIG. 1) to contribute information about their neighbors (e.g., the neighbor 120 of FIG. 1).

Figure 9:
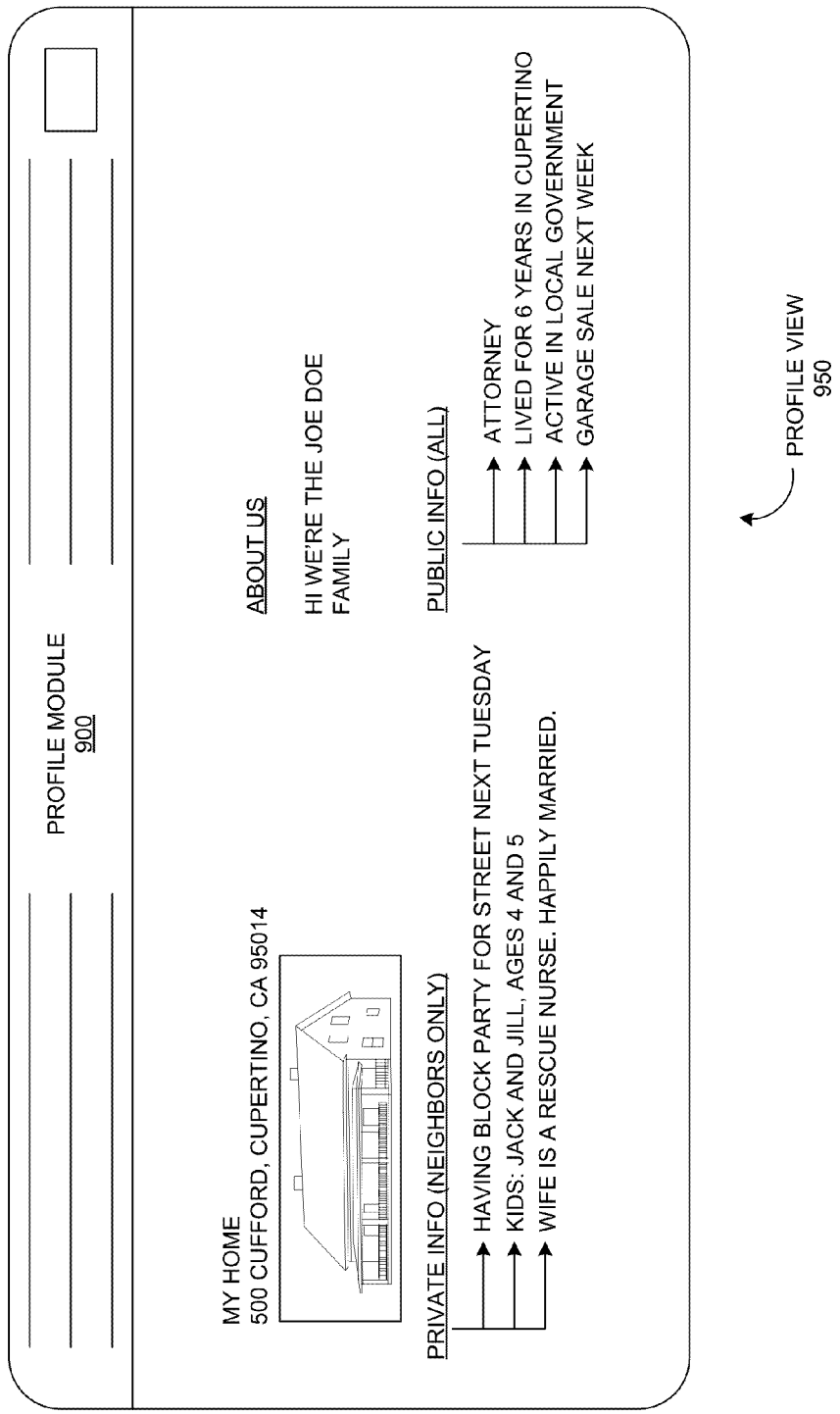
FIG. 9 is a profile view of a profile module, according to one embodiment.

FIG. 9 is a profile view 950 of a profile module 900, according to one embodiment. The profile view 950 of profile module 900 may offer the registered user to access the profile about the neighbors (e.g., the neighbor 120 of FIG. 1). The profile view 950 of profile module 900 may indicate the information associated with the profile of the registered user of the global neighborhood environment (e.g., the privacy server 100 of FIG. 1). The profile view 950 may display the address of the registered user. The profile view 950 may also display events organized by the neighbors (e.g., the neighbor 120 of FIG. 1), history of the neighbors (e.g., the neighbor 120 of FIG. 1), and/or may also offer the information (e.g., public, private, etc.) associated with the family of the neighbors (e.g., the neighbor 120 of FIG. 1) located in the locality of the user (e.g., the user(s) 116 of FIG. 1) of the global neighborhood environment (e.g., the privacy server 100 of FIG. 1).

FIG. 10 is a contribute view 1050 of a neighborhood network module 1000, according to one embodiment. The contribute view 1050 of the neighborhood network module 1000 may enable the registered user of the global neighborhood environment (e.g., the privacy server 100 of FIG. 1) to add information about their neighbors in the neighborhood network. The contribute view 1050 of the neighborhood network module 1000 may offer registered user of the global neighborhood environment (e.g., the privacy server 100 of FIG. 1) to add valuable notes associated with the family, events, private information, etc.

Figure 11:
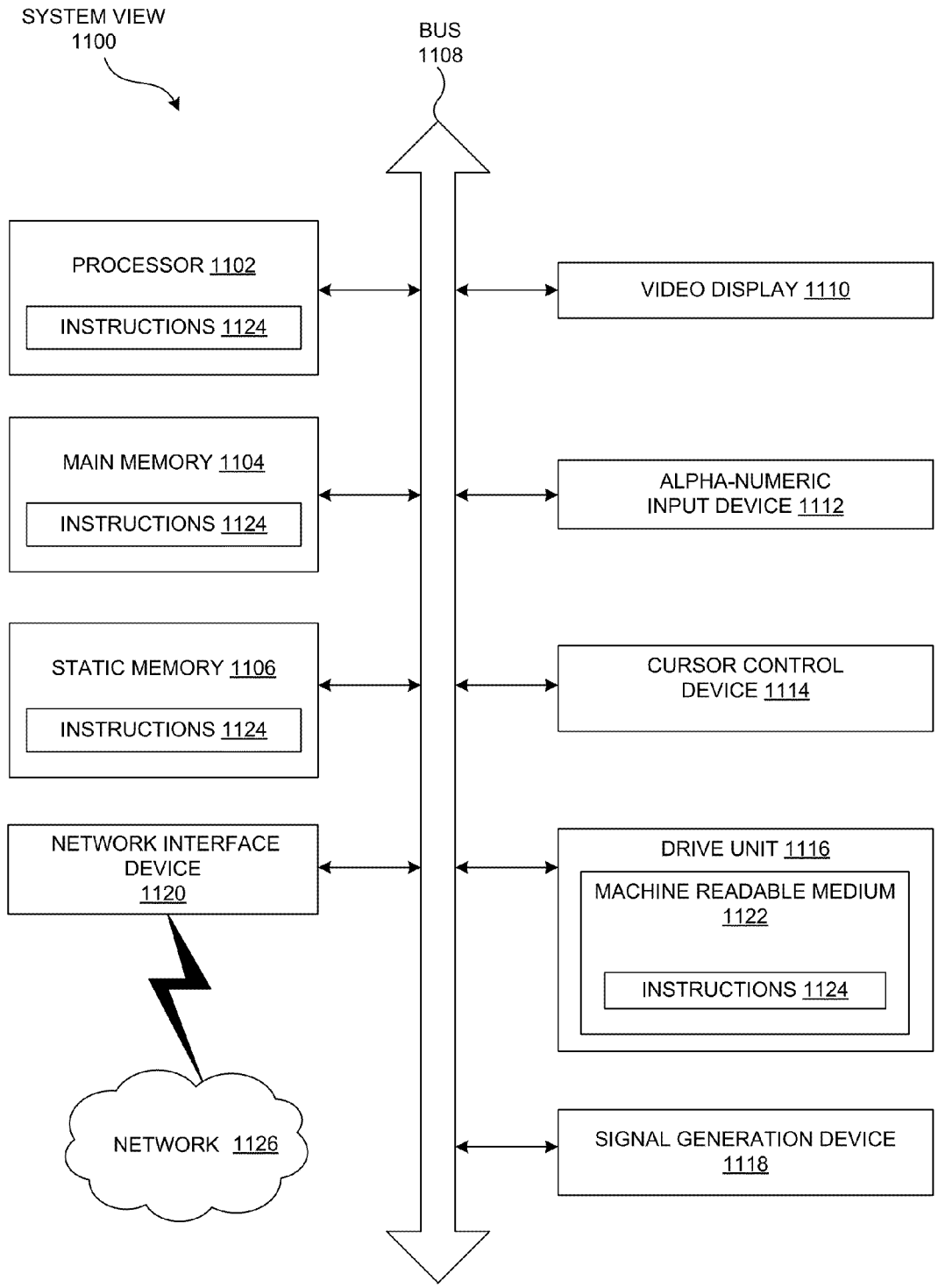
FIG. 11 is a diagrammatic system view of a data processing system in which any of the embodiments disclosed herein may be performed, according to one embodiment.

FIG. 11 is a diagrammatic system view, according to one embodiment. FIG. 11 is a diagrammatic system view 1100 of a data processing system in which any of the embodiments disclosed herein may be performed, according to one embodiment. Particularly, the system view 1100 of FIG. 11 illustrates a processor 1102, a main memory 1104, a static memory 1106, a bus 1108, a video display 1110, an alpha-numeric input device 1112, a cursor control device 1114, a drive unit 1116, a signal generation device 1118, a network interface device 1120, a machine readable medium 1122, instructions 1124, and a network 1126, according to one embodiment.

The diagrammatic system view 1100 may indicate a personal computer and/or a data processing system in which one or more operations disclosed herein are performed. The processor 1102 may be microprocessor, a state machine, an application specific integrated circuit, a field programmable gate array, etc. (e.g., Intel® Pentium® processor). The main memory 1104 may be a dynamic random access memory and/or a primary memory of a computer system.

The static memory 1106 may be a hard drive, a flash drive, and/or other memory information associated with the data processing system. The bus 1108 may be an interconnection between various circuits and/or structures of the data processing system. The video display 1110 may provide graphical representation of information on the data processing system. The alpha-numeric input device 1112 may be a keypad, keyboard and/or any other input device of text (e.g., a special device to aid the physically handicapped). The cursor control device 1114 may be a pointing device such as a mouse.

The drive unit 1116 may be a hard drive, a storage system, and/or other longer term storage subsystem. The signal generation device 1118 may be a bios and/or a functional operating system of the data processing system. The machine readable medium 1122 may provide instructions on which any of the methods disclosed herein may be performed. The instructions 1124 may provide source code and/or data code to the processor 1102 to enable any one/or more operations disclosed herein.

FIG. 12A is a user interface view of mapping a user profile 1200 of the geographic location 1204, according to one embodiment. In the example embodiment illustrated in FIG. 12A, the user profile 1200 may contain the information associated with the geographic location 1204. The user profile 1200 may contain the information associated with the registered user. The user profile 1200 may contain information such as address user of the specific geographic location, name of the occupant, profession of the occupant, details, phone number, educational qualification, etc.

The map 1202 may indicate the global neighborhood environment (e.g., the privacy server 100 of FIG. 1) of the geographical location 1204, a claimable profile 1206 (e.g., the claimable profile 1302 of FIG. 13A, the claimable profile 1704 of FIG. 17), and a delisted profile 1208. The geographical location 1204 may be associated with the user profile 1200. The claimable profile 1206 may be the claimable profile 1206 associated with the neighboring property surrounding the geographic location 1204. The delisted profile 1208 illustrated in example embodiment of FIG. 12A, may be the claimable profile 1206 that may be delisted when the registered user claims the physical property. The block 1210 illustrated in the example embodiment of FIG. 12A may be associated with hobbies, personal likes, etc. The block 1216 may be associated with events, requirements, etc. that may be displayed by the members of the global neighborhood environment (e.g., the privacy server 100 of FIG. 1).

For example, a verified registered user (e.g., a verified registered user 1310 of FIG. 13A-B, a verified registered user 1310 of FIG. 16) may be associated with a user profile 1200. The user profile 1200 may be associated with a specific geographic location. A map concurrently displaying the user profile 1200 and the specific geographic location 1204 may be generated. Also, the claimable profiles 1206 associated with different geographic locations surrounding the specific geographic location associated with the user profile 1200 may be simultaneously generated in the map. In addition, a query of the user profile 1200 and/or the specific geographic location may be processed.

Similarly, a tag data (e.g., the tags 1210 of FIG. 12A) associated with the specific geographic locations, a particular geographic location, and the delisted geographic location may be processed. A frequent one of the tag data (e.g., the tags 1210 of FIG. 12A) may be displayed when the specific geographic location and/or the particular geographic location is made active, but not when a geographic location is delisted.

FIG. 12B is a user interface view of mapping of the claimable profile 1206, according to one embodiment. In the example embodiment illustrated in FIG. 12B, the map 1202 may indicate the geographic locations in the global neighborhood environment (e.g., the privacy server 100 of FIG. 1) and/or may also indicate the geographic location of the claimable profile 1206. The claimable profile 1206 may display the information associated with the registered user of the global neighborhood environment (e.g., the privacy server 100 of FIG. 1). The link claim this profile 1212 may enable the registered user to claim the claimable profile 1206 and/or may also allow the verified registered user (e.g., the verified registered user 1310 of FIG. 13A-B) to edit any information in the claimable profiles 1206. The block 1214 may display the information posted by any of the verified registered users (e.g., the verified registered user 1310 of FIG. 13A-B, the verified registered user 1310 of FIG. 16) of the global neighborhood environment (e.g., the privacy server 100 of FIG. 1).

For example, a particular claimable profile (e.g., the particular claimable profile may be associated with a neighboring property to the specific property in the neighborhood) of the claimable profiles (e.g., the claimable profile 1302 of FIG. 13A, the claimable profile 1704 of FIG. 17) may be converted to another user profile (e.g., the user profile may be tied to a specific property in a neighborhood) when a different registered user (e.g., the user 116 of FIG. 1) claims a particular geographic location to the specific geographic location associated with the particular claimable profile.

In addition, a certain claimable profile of the claimable profiles may be delisted when a private registered user claims a certain geographic location (e.g., the geographical location 1204 of FIG. 12A) adjacent to the specific geographic location and/or the particular geographic location. Also, the certain claimable profile in the map 1202 may be masked when the certain claimable profile is delisted through the request of the private registered user.

Furthermore, a tag data (e.g., the tags 1210 of FIG. 12A) associated with the specific geographic location, the particular geographic location, and the delisted geographic location may be processed. A frequent one of the tag data may be displayed when the specific geographic location and/or the particular geographic location are made active, but not when a geographic location is delisted.

Moreover, the verified registered user (e.g., the verified registered user 1310 of FIG. 13A-B, the verified registered user 1310 of FIG. 16) may be permitted to edit any information in the claimable profiles 1206 including the particular claimable profile 1206 and/or the certain claimable profile until the certain claimable profile may be claimed by the different registered user and/or the private registered user. In addition, a claimant of any claimable profile 1206 may be enabled to control what information is displayed on their user profile. Also, the claimant may be allowed to segregate certain information on their user profile 1200 such that only other registered users directly connected to the claimant are able to view data on their user profile 1200.

FIG. 13A is a user interface view of mapping of a claimable profile 1302 of the commercial user 1300, according to one embodiment. In the example embodiment illustrated in FIG. 13A, the commercial user 1300 may be associated with the customizable business profile 1304 located in the commercial geographical location. The claimable profile 1302 may contain the information associated with the commercial user 1300. The claimable profile 1302 may contain the information such as address, name, profession, tag, details (e.g., ratings), and educational qualification etc. of the commercial user 1300. The verified registered user 1310 may be user associated with the global neighborhood environment (e.g., the privacy server 100 of FIG. 1) and may communicate a message to the neighborhood commercial user 1300. For example, a payment of the commercial user 1300 and the verified registered user 1310 may be processed.

FIG. 13B is a user interface view of mapping of customizable business profile 1304 of the commercial user 1300, according to one embodiment. In the example embodiment illustrated in FIG. 13B, the commercial user 1300 may be associated with the customizable business profile 1304. The customizable business profile 1304 may be profile of any business firm (e.g., restaurant, hotels, supermarket, etc.) that may contain information such as address, occupant name, profession of the customizable business. The customizable business profile 1304 may also enable the verified registered user 1310 to place online order for the products.

For example, the commercial user 1300 may be permitted to purchase a customizable business profile 1304 associated with a commercial geographic location. Also, the verified registered user 1310 may be enabled to communicate a message to the global neighborhood environment (e.g., the privacy server 100 of FIG. 1) based on a selectable distance range away from the specific geographic location. In addition, a payment of the commercial user 1300 and/or the verified registered user 1310 may be processed.

A target advertisement 1306 may display the information associated with the offers and/or events of the customizable business. The display advertisement 1308 may display ads of the products of the customizable business that may be displayed to urge the verified registered user 1310 to buy the products of the customizable business. The verified registered user 1310 may be user associated with the global neighborhood environment (e.g., the privacy server 100 of FIG. 1) that may communicate a message to the commercial user 1300 and/or may be interested in buying the products of the customizable business.

Figure 14:
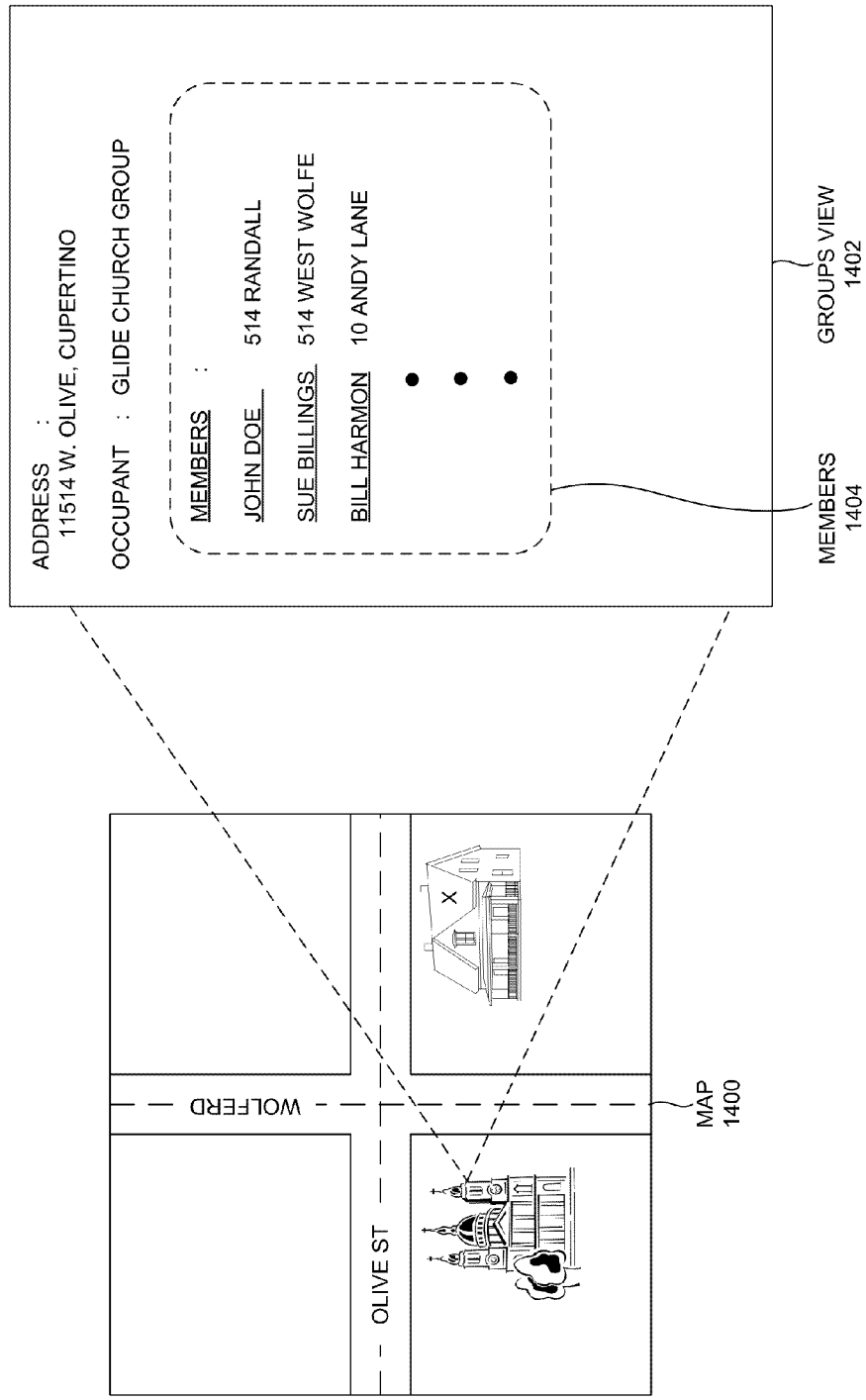
FIG. 14 is a user interface view of a group view associated with particular geographical location, according to one embodiment.

FIG. 14 is a user interface view of a group view 1402 associated with particular geographical location, according to one embodiment. Particularly FIG. 14 illustrates, a map 1400, a groups view 1402, according to one embodiment. In the example embodiment illustrated in FIG. 14, the map view 1400 may display map view of the geographical location of the specific group of the global neighborhood environment (e.g., the privacy server 100 of FIG. 1). The groups view 1402 may contain the information (e.g., address, occupant, etc.) associated with the particular group of the specific geographical location (e.g., the geographical location displayed in the map 1400) of the global neighborhood environment (e.g., the privacy server 100 of FIG. 1). The members 1404 may contain the information about the members associated with the group (e.g., the group associated with geographical location displayed in the map) of the global neighborhood environment (e.g., the privacy server 100 of FIG. 1).

Figure 15:
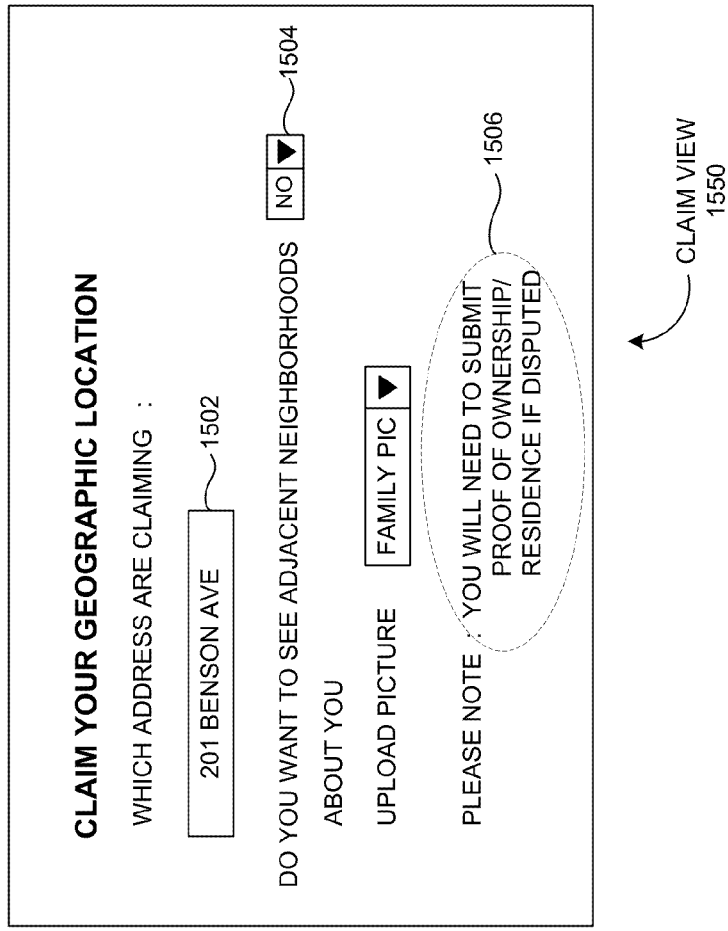
FIG. 15 is a user interface view of claim view, according to one embodiment.

FIG. 15 is a user interface view of claim view 1550, according to one embodiment. The claim view 1550 may enable the user to claim the geographical location of the registered user. Also, the claim view 1550 may facilitate the user of the global neighborhood environment (e.g., the privacy server 100 of FIG. 1) to claim the geographical location of property under dispute.

In the example embodiment illustrated in FIG. 15, the operation 1502 may allow the registered user of the global neighborhood environment (e.g., the privacy server 100 of FIG. 1) to claim the address of the geographic location claimed by the registered user. The operation 1504 illustrated in example embodiment of FIG. 15, may enable the user to delist the claim of the geographical location. The operation 1506 may offer information associated with the document to be submitted by the registered users of the global neighborhood environment (e.g., the privacy server 100 of FIG. 1) to claim the geographical location.

FIG. 16 is a user interface view of a building builder 1602, according to one embodiment. Particularly the FIG. 16 illustrates, a map 1600, a building builder 1602, according to one embodiment. The map 1600 may display the geographical location in which the verified registered user (e.g., the verified registered user 1310 of FIG. 13A-B) may create and/or modify empty claimable profiles (e.g., the claimable profile 1206 of FIG. 12A-12B, the claimable profile 1302 of FIG. 13A, the claimable profile 1704 of FIG. 17), building layouts, social network pages, and floor levels structures housing residents and businesses in the neighborhood (e.g., the neighborhood 102A-N of FIG. 1). The building builder 1602 may enable the verified registered users (e.g., the verified registered user 1310 of FIG. 13A-B) of the global neighborhood environment (e.g., the privacy server 100 of FIG. 1) to draw floor level structures, add neighbor's profiles and/or may also enable to select the floor number, claimable type, etc. as illustrated in example embodiment of FIG. 16.

The verified registered user 1310 may be verified registered user of the global neighborhood environment (e.g., the privacy server 100 of FIG. 1) interested in creating and/or modifying claimable profiles (e.g., the claimable profile 1206 of FIG. 12A-12B, the claimable profile 1302 of FIG. 13A, the claimable profile 1704 of FIG. 17), building layouts, social network pages, and floor level structure housing residents and businesses in the neighborhood (e.g., the neighborhood 102A-N of FIG. 1) in the building builder 1602.

For example, a social community module (e.g., a social community module 106 of FIG. 1) of the global neighborhood environment (e.g., the privacy server 100 of FIG. 1) may generate a building creator (e.g., the building builder 1602 of FIG. 16) in which the registered users may create and/or modify empty claimable profiles (e.g., the claimable profile 1206 of FIG. 12A-12B, the claimable profile 1302 of FIG. 13A, the claimable profile 1704 of FIG. 17), building layouts, social network pages, and floor levels structures housing residents and/or businesses in the neighborhood (e.g., the neighborhood 102A-N of FIG. 1).

FIG. 17 is a systematic view of communication of claimable data, according to one embodiment. Particularly FIG. 17 illustrates a map 1701, verified user profile 1702, choices 1708 and a new claimable page 1706, according to one embodiment. The map 1701 may locate the details of the address of the registered user of the global neighborhood environment (e.g., the privacy server 100 of FIG. 1). The verified user profile 1702 may store the profiles of the verified user of the global neighborhood environment (e.g., the privacy server 100 of FIG. 1. The claimable profile 1704 may be the profiles of the registered user who may claim them in the global neighborhood environment (e.g., the privacy server 100 of FIG. 1).

In operation 1700 the search for the user profile (e.g., the user profile 1200 of FIG. 12A) is been carried whom the registered user may be searching. The new claimable page 1706 may solicit for the details of a user whom the registered user is searching for in the global neighborhood environment (e.g., the privacy server 100 of FIG. 1). The choices 1708 may ask whether the requested search is any among the displayed names. The new claimable page 1706 may request for the details of location such as country, state and/or city. The operation 1700 may communicate with the choices 1708, and the new claimable page 1706.

For example, a no-match module (e.g., a no-match module 312 of FIG. 3) of the search module (e.g., the search module 108 of FIG. 1) to request additional information from the verified registered user about a person, place, and business having no listing in the global neighborhood environment (e.g., the privacy server 100 of FIG. 1) when no matches are found in a search query of the verified registered user (e.g., the verified registered user 1310 of FIG. 13A-B), and to create a new claimable page 1706 based on a response of the verified registered user 1702 about the at least one person, place, and business not previously indexed in the global neighborhood environment (e.g., the privacy server 100 of FIG. 1).

FIG. 18 is a systematic view of a network view 1850, according to one embodiment. Particularly it may include a GUI display 1802, a GUI display 1804, device 1806, a device 1808, a network 1810, a router 1812, a switch 1814, a firewall 1816, a load balancer 1818, an application server#1 1824, a web application server 1826, an inter-process communication 1828, a computer server 1830, an image server 1832, a multiple servers 1834, a switch 1836, a database storage 1838, database software 1840 and a mail server 1842, according to one embodiment.

The GUI display 1802 and GUI display 1804 may display particular case of user interface for interacting with a device capable of representing data (e.g., computer, cellular telephones, television sets etc.) which employs graphical images and widgets in addition to text to represent the information and actions available to the user (e.g., the user 116 of FIG. 1). The device 1806 and device 1808 may be any device capable of presenting data (e.g., computer, cellular telephones, television sets etc.). The network 1810 may be any collection of networks (e.g., internet, private networks, university social system, private network of a company etc.) that may transfer any data to the user (e.g., the user 116 of FIG. 1) and the global neighborhood environment (e.g., the privacy server 100 of FIG. 1).

The router 1812 may forward packets between networks and/or information packets between the global neighborhood environment (e.g., the privacy server 100 of FIG. 1) and registered user over the network (e.g., internet). The switch 1814 may act as a gatekeeper to and from the network (e.g., internet) and the device. The firewall 1816 may provides protection (e.g., permit, deny or proxy data connections) from unauthorized access to the global neighborhood environment (e.g., the privacy server 100 of FIG. 1. The load balancer 1818 may balance the traffic load across multiple mirrored servers in the global neighborhood environment (e.g., the privacy server 100 of FIG. 1) and may be used to increase the capacity of a server farm beyond that of a single server and/or may allow the service to continue even in the face of server down time due to server failure and/or server maintenance.

The application server 1822 may be server computer on a computer network dedicated to running certain software applications of the global neighborhood environment (e.g., the privacy server 100 of FIG. 1). The web application server 1826 may be server holding all the web pages associated with the global neighborhood environment (e.g., the privacy server 100 of FIG. 1). The inter-process communication 1828 may be set of rules for organizing and un-organizing factors and results regarding the global neighborhood environment (e.g., the privacy server 100 of FIG. 1). The computer server 1830 may serve as the application layer in the multiple servers of the global neighborhood environment (e.g., the privacy server 100 of FIG. 1) and/or may include a central processing unit (CPU), a random access memory (RAM) temporary storage of information, and/or a read only memory (ROM) for permanent storage of information regarding the global neighborhood environment (e.g., the privacy server 100 of FIG. 1).

The image server 1832 may store and provide digital images of the registered user of the global neighborhood environment (e.g., the privacy server 100 of FIG. 1). The multiple servers 1834 may be multiple computers or devices on a network that may manages network resources connecting the registered user and the global neighborhood environment (e.g., the privacy server 100 of FIG. 1). The database storage 1838 may store software, descriptive data, digital images, system data and any other data item that may be related to the user (e.g., the user 116 of FIG. 1) of the global neighborhood environment (e.g., the privacy server 100 of FIG. 1). The database software 1840 may be provided a database management system that may support the global neighborhood environment (e.g., the neighborhood environment 100 of FIG. 1. The mail server 1842 may be provided for sending, receiving and storing mails. The device 1806 and 1808 may communicate with the GUI display(s) 1802 and 1804, the router 1812 through the network 1810 and the global neighborhood environment (e.g., the privacy server 100 of FIG. 1).

Figure 19:
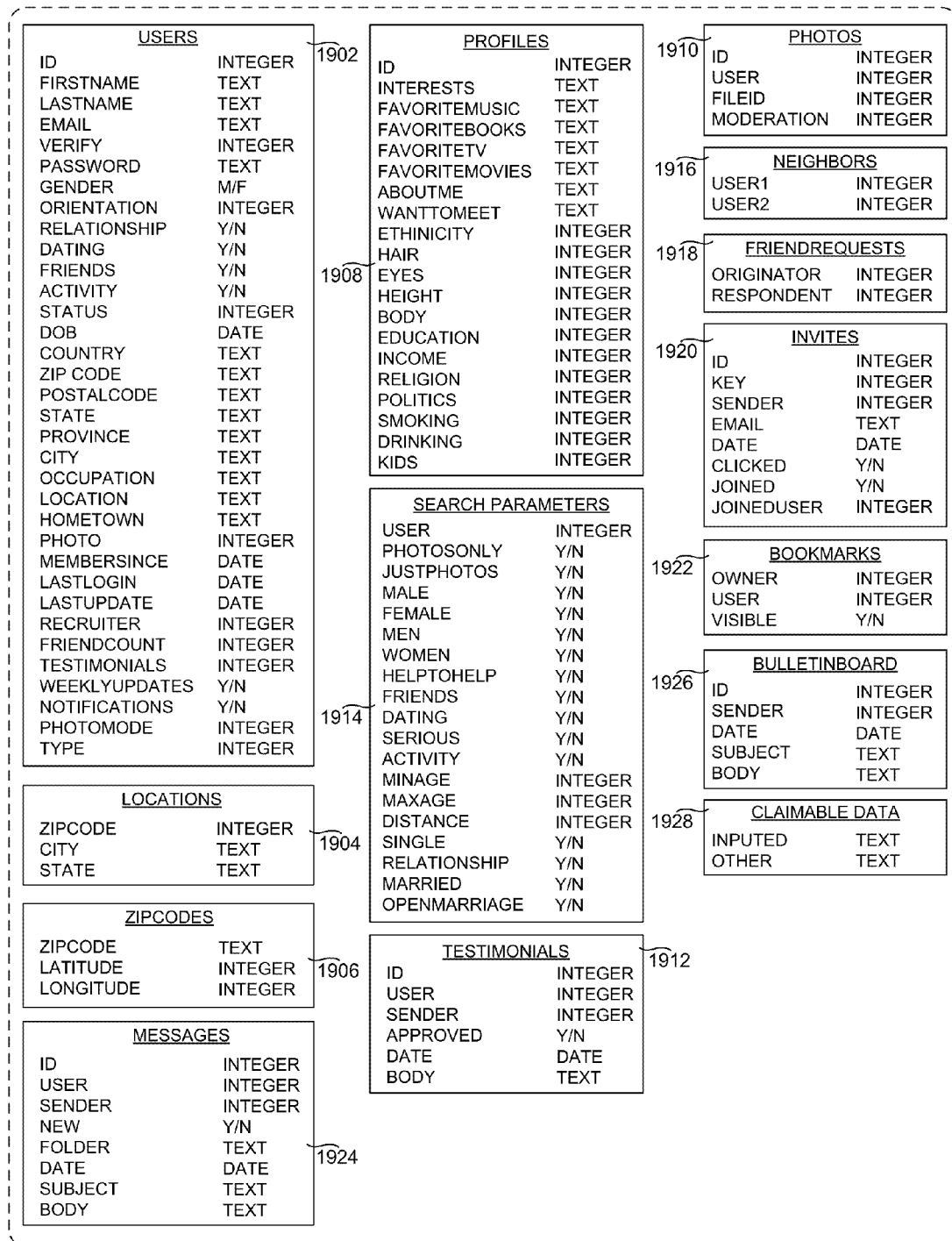
FIG. 19 is a block diagram of a database, according to one embodiment.

FIG. 19 is a block diagram of a database, according to one embodiment. Particularly the block diagram of the database 1900 of FIG. 19 illustrates a user data 1902, a location data, a zip codes data 1906, a profiles data 1908, a photos data 1910, a testimonials data 1912, a search parameters data 1914, a neighbor data 1916, a friends requests data 1918, a invites data 1920, a bookmarks data 1922, a messages data 1924 and a bulletin board data 1926, according to one embodiment.

The database 1900 be may include descriptive data, preference data, relationship data, and/or other data items regarding the registered user of the global neighborhood environment (e.g., the privacy server 100 of FIG. 1.

The user data 1902 may be a descriptive data referring to information that may describe a user (e.g., the user 116 of FIG. 1). It may include elements in a certain format for example Id may be formatted as integer, Firstname may be in text, Lastname may be in text, Email may be in text, Verify may be in integer, Password may be in text, Gender may be in m/f, Orientation may be in integer, Relationship may be in y/n, Dating may be in y/n, Friends may be in y/n, Activity may be in y/n, Status may be in integer, Dob may be in date, Country may be in text, Zip code may be in text, Postalcode may be in text, State may be in text, Province may be in text, City may be in text, Occupation may be in text, Location may be in text, Hometown may be in text, Photo may be in integer, Membersince may be in date, Lastlogin may be in date, Lastupdate may be in date, Recruiter may be in integer, Friendcount may be in integer, Testimonials may be in integer, Weeklypdates may be in y/n, Notifications may be in y/n, Photomode may be in integer and/or Type may be in integer.

The locations data 1904 may clarify the location details in formatted approach. For example Zip code may be formatted as integer, City may be in text and/or State may be in text. The zip codes data 1906 may provide information of a user location in formatted manner. For example Zip code may be formatted as text, Latitude may be in integer and/or Longitude may be in integer. The profile data 1908 may clutch personnel descriptive data that may be formatted.

For examples ID may be formatted as integer, Interests may be in text, Favoritemusic may be in text, Favaoritebooks may be in text, Favoritetv may be in text, Favoritemovies may be in text, Aboutme may be in text, Wanttommet may be in text, Ethnicity may be in integer, Hair may be in integer, Eyes may be in integer, Height may be in integer, Body may be in integer, Education may be in integer, Income may be in integer, Religion may be in integer, Politics may be in integer Smoking may be in integer, Drinking may be in integer and/or Kids may be in integer.

The photos data 1910 may represent a digital image and/or a photograph of the user formatted in certain approach. For example Id may be formatted as integer, User may be in integer, Fileid may be in integer and/or Moderation may be in integer. The testimonials data 1912 may allow users to write "testimonials" 1912, or comments, about each other and in these testimonials, users may describe their relationship to an individual and their comments about that individual. For example the user might write a testimonial that states "Rohan has been a friend of mine since graduation days. He is smart, intelligent, and a talented person." The elements of testimonials data 1912 may be formatted as Id may be in integer, User may be in integer, Sender may be integer, Approved may be in y/n, Date may be in date and/or Body may be formatted in text.

The search parameters data 1914 may be preference data referring to the data that may describe preferences one user has with respect to another (For example, the user may indicate that he is looking for a female who is seeking a male for a serious relationship). The elements of the search parameters data 1914 may be formatted as User 1902 may be in integer, Photosonly may be in y/n, Justphotos may be in y/n, Male may be in y/n, Female may be in y/n, Men may be in y/n, Women may be in y/n, Helptohelp may be in y/n, Friends may be in y/n, Dating may be in y/n, Serious may be in y/n, Activity may be in y/n, Minage may be in integer, Maxage may be in integer, Distance may be in integer, Single may be in y/n, Relationship may be in y/n, Married may be in y/n and/or Openmarriage may be in y/n.

The neighbor's data 1916 may generally refer to relationships among registered users of the global neighborhood environment (e.g., the privacy server 100 of FIG. 1) that have been verified and the user has requested another individual to join the system as neighbor 1916, and the request may be accepted. The elements of the neighbors data 1916 may be formatted as user1 may be in integer and/or user2 may be in integer. The friend requests data 1918 may tracks requests by users within the neighborhood (e.g., the neighborhood 102A-N of FIG. 1) to other individuals, which requests have not yet been accepted and may contain elements originator and/or respondent formatted in integer. The invites data 1920 may describe the status of a request by the user to invite an individual outside the neighborhood (e.g., the neighborhood 102A-N of FIG. 1) to join the neighborhood (e.g., the neighborhood 102A-N of FIG. 1) and clarify either the request has been accepted, ignored and/or pending.

The elements of the invites data 1920 may be formatted as Id may be in integer, Key may be in integer, Sender may be in integer, Email may be in text, Date may be in date format, Clicked may be in y/n, Joined may be in y/n and/or Joineduser may be in integer. The bookmarks data 1922 may be provide the data for a process allowed wherein a registered user of the global neighborhood environment (e.g., the privacy server 100 of FIG. 1) may indicate an interest in the profile of another registered user. The bookmark data 1922 elements may be formatted as Owner may be in integer, User may be in integer and/or Visible may be in y/n. The message data 1924 may allow the users to send one another private messages.

The message data 1924 may be formatted as Id may be in integer, User may be in integer, Sender may be in integer, New may be in y/n, Folder may be in text, Date may be in date format, Subject may be in text and/or Body may be in text format. The bulletin board data 1926 may supports the function of a bulletin board that users may use to conduct online discussions, conversation and/or debate. The claimable data 1928 may share the user profiles (e.g., the user profile 1200 of FIG. 12A) in the neighborhood (e.g., the neighborhood 102A-N of FIG. 1) and its elements may be formatted as claimables inputed and/or others may be in text format.

FIG. 20 is an exemplary graphical user interface view for data collection, according to one embodiment. Particularly FIG. 20 illustrates exemplary screens 2002, 2004 that may be provided to the user (e.g., the user 116 of FIG. 1) through an interface may be through the network (e.g., Internet), to obtain user descriptive data. The screen 2002 may collect data allowing the user (e.g., the user 116 of FIG. 1) to login securely and be identified by the neighborhood (e.g., the neighborhood 102A-N of FIG. 1). This screen 2002 may allow the user to identify the reason he/she is joining the neighborhood. For example, a user may be joining the neighborhood for "neighborhood watch". The screen 2004 may show example of how further groups may be joined. For example, the user (e.g., the user 116 of FIG. 1) may be willing to join a group "Raj for city council". It may also enclose the data concerning Dob, country, zip/postal code, hometown, occupation and/or interest.

Figure 21:
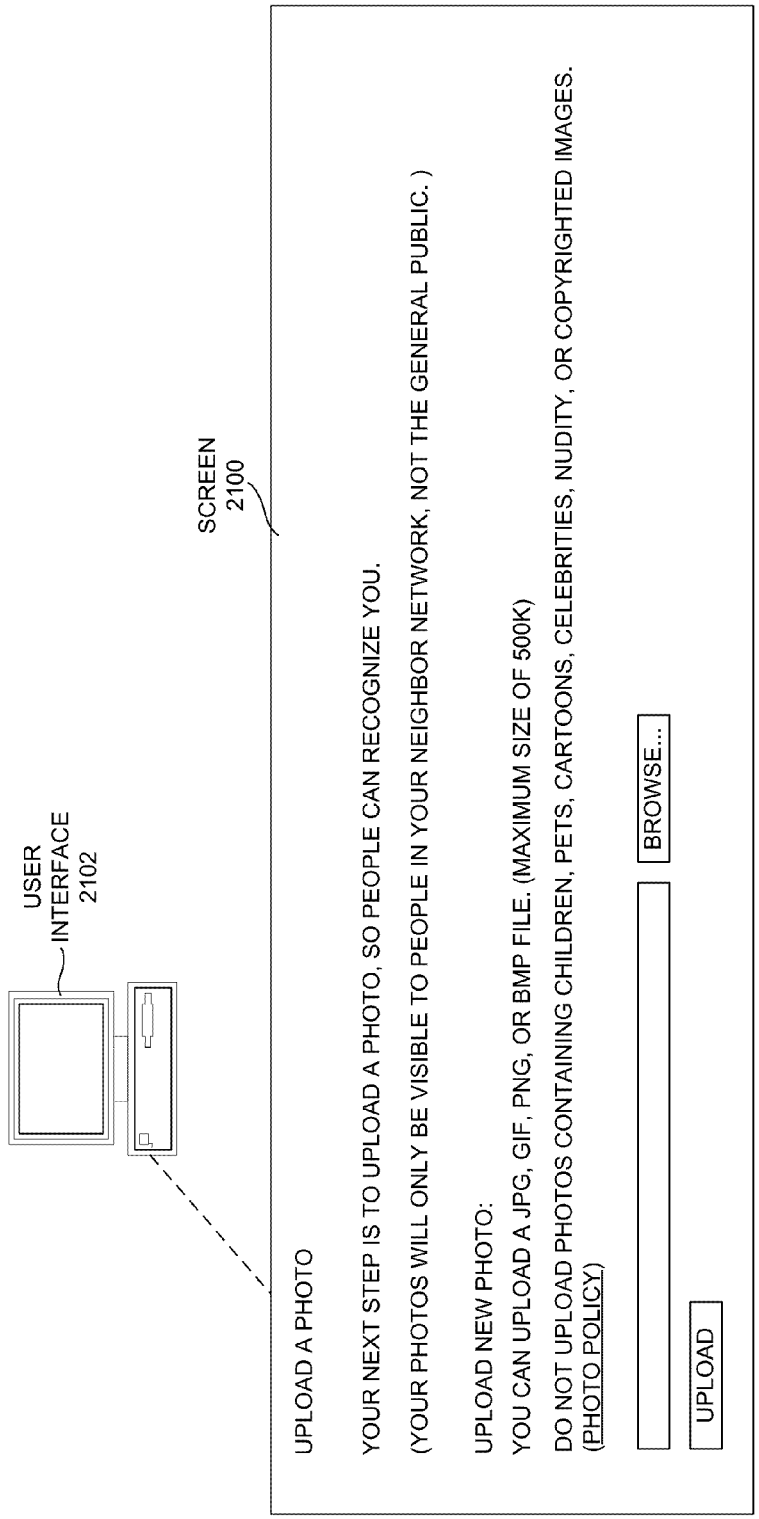
FIG. 21 is an exemplary graphical user interface view of image collection, according to one embodiment.

FIG. 21 is an exemplary graphical user interface view of image collection, according to one embodiment. A screen 2100 may be interface provided to the user (e.g., the user 116 of FIG. 1) over the network (e.g., internet) may be to obtain digital images from system user. The interface 2102 may allow the user (e.g., the user 116 of FIG. 1) to browse files on his/her computer, select them, and then upload them to the neighborhood (e.g., the neighborhood 102A-N of FIG. 1). The user (e.g., the user 116 of FIG. 1) may upload the digital images and/or photo that may be visible to people in the neighbor (e.g., the neighbor 120 of FIG. 1) network and not the general public. The user may be able to upload a JPG, GIF, PNG and/or BMP file in the screen 2100.

Figure 22:
FIG. 22 is an exemplary graphical user interface view of an invitation, according to one embodiment.

FIG. 22 is an exemplary graphical user interface view of an invitation, according to one embodiment. An exemplary screen 2200 may be provided to a user through a user interface 2202 may be over the network (e.g., internet) to allow users to invite neighbor or acquaintances to join the neighborhood (e.g., the neighborhood 102A-N of FIG. 1). The user interface 2202 may allow the user (e.g., the user 116 of FIG. 1) to enter one or a plurality of e-mail addresses for friends they may like to invite to the neighborhood (e.g., the neighborhood 102A-N of FIG. 1). The exemplary screen 2200 may include the "subject", "From", "To", "Optional personnel message", and/or "Message body" sections. In the "Subject" section a standard language text may be included for joining the neighborhood (e.g., Invitation to join Fatdoor from John Doe, a neighborhood.).

The "From" section may include the senders email id (e.g., user@domain.com). The "To" section may be provided to add the email id of the person to whom the sender may want to join the neighborhood (e.g., the neighborhood 102A-N of FIG. 1). The message that may be sent to the friends and/or acquaintances may include standard language describing the present neighborhood, the benefits of joining and the steps required to join the neighborhood (e.g., the neighborhood 102A-N of FIG. 1). The user (e.g., the user 116 of FIG. 1) may choose to include a personal message, along with the standard invitation in the "Optional personal message" section. In the "Message body" section the invited friend or acquaintance may initiate the process to join the system by clicking directly on an HTML link included in the e-mail message (e.g., http://www.fatdoor.com/joinjsp? Invite=140807). In one embodiment, the user (e.g., the user 116 of FIG. 1) may import e-mail addresses from a standard computerized address book. The system may further notify the inviting user when her invitee accepts or declines the invitation to join the neighborhood (e.g., the neighborhood 102A-N of FIG. 1).

Figure 23:
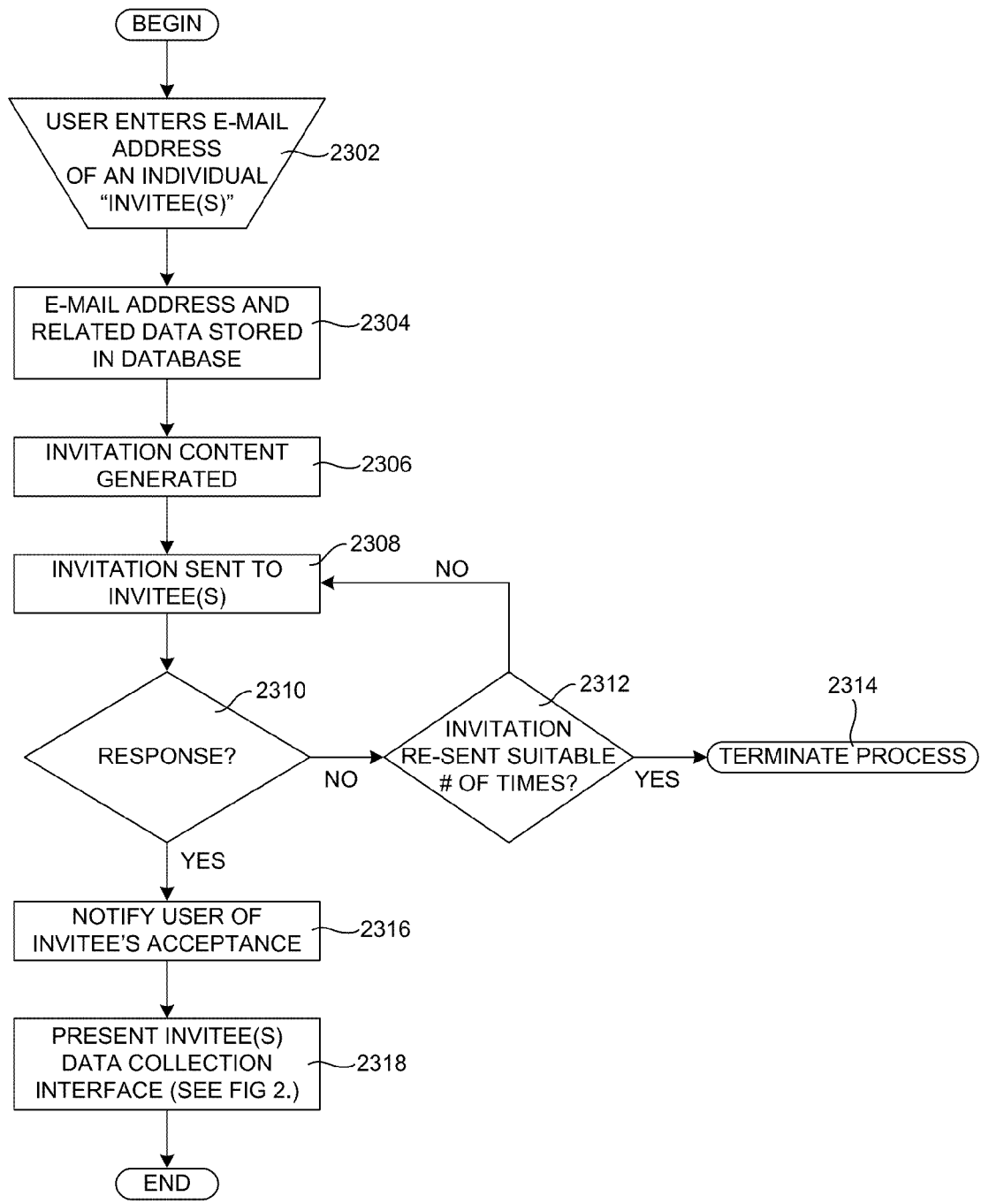
FIG. 23 is a flowchart of inviting the invitee(s) by the registered user, notifying the registered user upon the acceptance of the invitation by the invitee(s) and, processing and storing the input data associated with the user in the database, according to one embodiment.

FIG. 23 is a flowchart of inviting the invitee(s) by the registered user, notifying the registered user upon the acceptance of the invitation by the invitee(s) and, processing and storing the input data associated with the user (e.g., the user 116 of FIG. 1) in the database, according to one embodiment. In operation 2302, the verified registered user (e.g., the verified registered user 1310 of FIG. 13A-B, the verified registered user 1310 of FIG. 16) willing to invite the individual enters the email addresses of an individual "invitee". In operation 2304, the email address and the related data of the invitee may be stored in the database. In operation 2306, the invitation content for inviting the invitee may be generated from the data stored in the database. In operation 2308, the registered user sends invitation to the invitee(s).

In operation 2310, response from the user (e.g., the user 116 of FIG. 1) may be determined. The operation 2312, if the invitee doesn't respond to invitation sent by the registered user then registered user may resend the invitation for a pre-defined number of times. In operation 2314, if the registered user resends the invitation to the same invitee for predefined number of times and if the invitee still doesn't respond to the invitation the process may be terminated automatically.

In operation 2316, if the invitee accepts the invitation sent by the registered user then system may notify the registered user that the invitee has accepted the invitation. In operation 2318, the input from the present invitee(s) that may contain the descriptive data about the friend (e.g., registered user) may be processed and stored in the database.

For example, each registered user associated e-mail addresses of individuals who are not registered users may be stored and identified by each registered user as neighbors. An invitation to become a new user (e.g., the user 116 of FIG. 1) may be communicated out to neighbor (e.g., the neighbors neighbor of FIG. 1) of the particular user. An acceptance of the neighbor (e.g., the neighbor 120 of FIG. 1) to whom the invitation was sent may be processed.

The neighbor (e.g., the neighbor 120 of FIG. 1) may be added to a database and/or storing of the neighbor (e.g., the neighbor 120 of FIG. 1), a user ID and a set of user IDs of registered users who are directly connected to the neighbor (e.g., the neighbor 120 of FIG. 1), the set of user IDs stored of the neighbor (e.g., the neighbor 120 of FIG. 1) including at least the user ID of the verified registered user (e.g., the verified registered user 1310 of FIG. 13A-B, the verified registered user 1310 of FIG. 16). Furthermore, the verified registered user may be notified that the invitation to the neighbor (e.g., the neighbor 120 of FIG. 1) has been accepted when an acceptance is processed. Also, inputs from the neighbor (e.g., the neighbor 120 of FIG. 1) having descriptive data about the friend may be processed and the inputs in the database may be stored.

Figure 24:
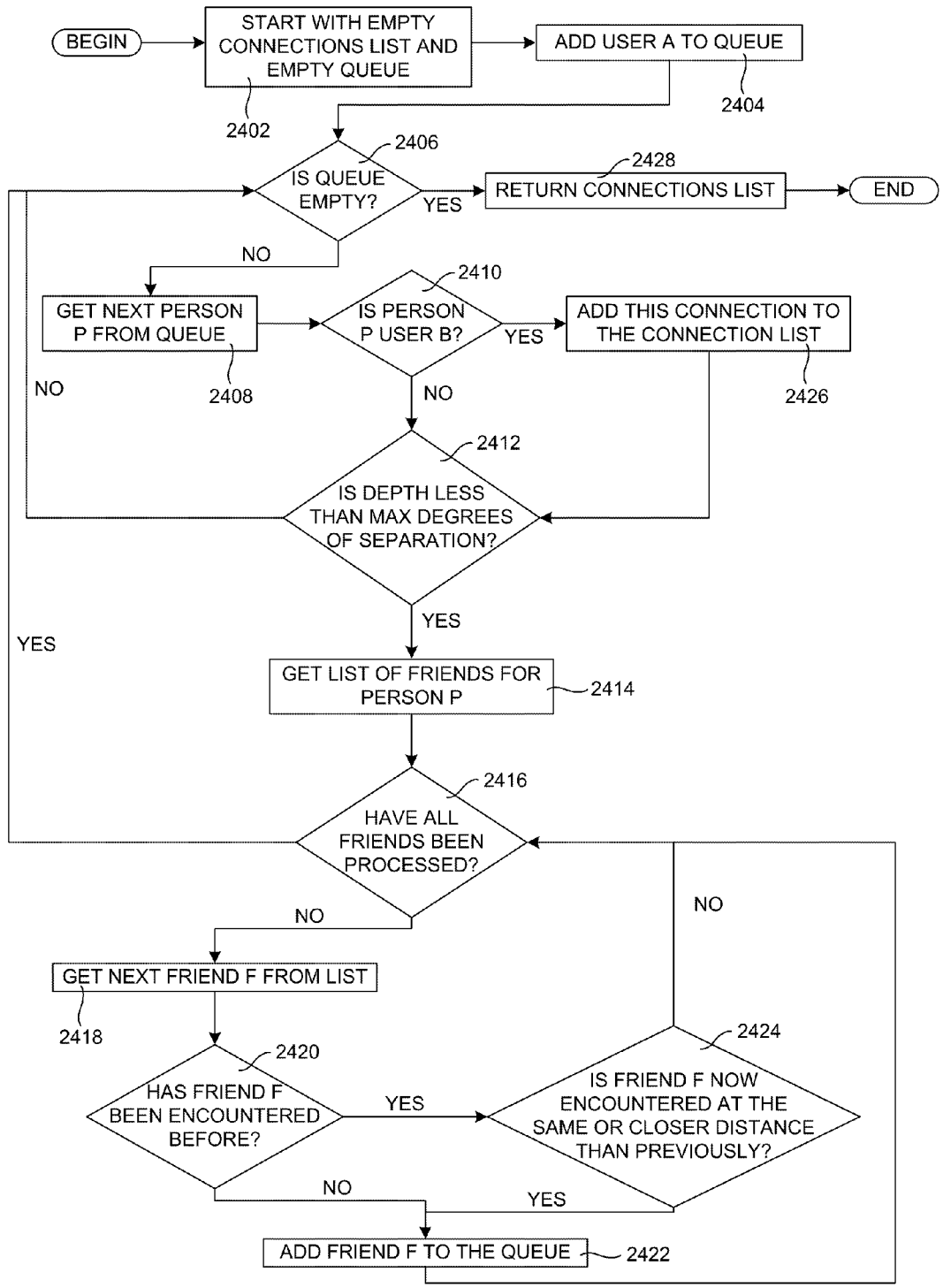
FIG. 24 is a flowchart of adding the neighbor to the queue, according to one embodiment.

FIG. 24 is a flowchart of adding the neighbor (e.g., the neighbor 120 of FIG. 1) to the queue, according to one embodiment. In operation 2402, the system may start with the empty connection list and empty queue. In operation 2404, the user may be added to the queue. In operation 2406, it is determined whether the queue is empty. In operation 2408, if it is determined that the queue is not empty then the next person P may be taken from the queue. In operation 2410, it may be determined whether the person P from the queue is user B or not. In operation 2412, if the person P is not user B then it may be determined whether the depth of the geographical location is less than maximum degrees of separation.

If it is determined that depth is more than maximum allowable degrees of separation then it may repeat the operation 2408. In operation 2414, if may be determined that the depth of the geographical location (e.g., the geographical location 1204 of FIG. 12A) is less than maximum degrees of separation then the neighbors (e.g., the neighbor 120 of FIG. 1) list for person P may be processed. In operation 2416, it may be determined whether all the neighbors (e.g., the neighbor 120 of FIG. 1) in the neighborhood (e.g., the neighborhood 102A-N of FIG. 1) have been processed or not. If all the friends are processed it may be determined the queue is empty.

In operation 2418, if all the neighbors (e.g., the neighbor 120 of FIG. 1) for person P are not processed then next neighbor N may be taken from the list. In operation 2420, it may be determined whether the neighbor (e.g., the neighbor 120 of FIG. 1) N has encountered before or not. In operation 2422, if the neighbor (e.g., the neighbor 120 of FIG. 1) has not been encountered before then the neighbor may be added to the queue. In operation 2424, if the neighbor N has been encountered before it may be further determined whether the geographical location (e.g., the geographical location 1204 of FIG. 12A) from where the neighbor (e.g., the neighbor 120 of FIG. 1) has encountered previously is the same place or closer to that place.

If it is determined that the neighbor (e.g., the neighbor 120 of FIG. 1) has encountered at the same or closer place then the friend may be added to the queue. If it may be determined that friend is not encountered at the same place or closer to that place then it may be again checked that all the friends have processed. In operation 2426, if it is determined that the person P is user B than the connection may be added to the connection list and after adding the connection to connection list it follows the operation 2412. In operation 2428, if it may be determined that queue is empty then the operation may return the connections list.

For example, a first user ID with the verified registered user (e.g., the verified registered user 1310 of FIG. 13A-B, the verified registered user 1310 of FIG. 16) and a second user ID may be applied to the different registered user. The verified registered user (e.g., the verified registered user 1310 of FIG. 13A-B, the verified registered user 1310 of FIG. 16) with the different registered user may be connected with each other through at least one of a geo-positioning data associated with the first user ID and the second user ID. In addition, a maximum degree of separation (Nmax) of at least two that is allowed for connecting any two registered users, (e.g., the two registered users who may be directly connected may be deemed to be separated by one degree of separation and two registered users who may be connected through no less than one other registered user may be deemed to be separated by two degrees of separation and two registered users who may be connected through not less than N other registered users may be deemed to be separated by N+1 degrees of separation).

Furthermore, the user ID of the different registered user may be searched (e.g., the method limits the searching of the different registered user in the sets of user IDs that may be stored as registered users who are less than Nmax degrees of separation away from the verified registered user (e.g., the verified registered user 1310 of FIG. 13A-B, the verified registered user 1310 of FIG. 16), such that the verified registered user (e.g., the verified registered user 1310 of FIG. 13A-B, the verified registered user 1310 of FIG. 16) and the different registered user who may be separated by more than Nmax degrees of separation are not found and connected.) in a set of user IDs that may be stored of registered users who are less than Nmax degrees of separation away from the verified registered user (e.g., the verified registered user 1310 of FIG. 13A-B, the verified registered user 1310 of FIG. 16), and not in the sets of user IDs that may be stored for registered users who are greater than or equal to Nmax degrees of separation away from the verified registered user (e.g., the verified registered user 1310 of FIG. 13A-B, the verified registered user 1310 of FIG. 16), until the user ID of the different registered user may be found in one of the searched sets. Also, the verified registered user (e.g., the verified registered user 1310 of FIG. 13A-B, the verified registered user 1310 of FIG. 16) may be connected to the different registered user if the user ID of the different registered user may be found in one of the searched sets.

Moreover, the sets of user IDs that may be stored of registered users may be searched initially who are directly connected to the verified registered user (e.g., the verified registered user 1310 of FIG. 13A-B, the verified registered user 1310 of FIG. 16). A profile of the different registered user may be communicated to the verified registered user (e.g., the verified registered user 1310 of FIG. 13A-B, the verified registered user 1310 of FIG. 16) to display through a marker associating the verified registered user (e.g., the verified registered user 1310 of FIG. 13A-B, the verified registered user 1310 of FIG. 16) with the different registered user. A connection path between the verified registered user (e.g., the verified registered user 1310 of FIG. 13A-B, the verified registered user 1310 of FIG. 16) and the different registered user, the connection path indicating at least one other registered user may be stored through whom the connection path between the verified registered user (e.g., the verified registered user 1310 of FIG. 13A-B, the verified registered user 1310 of FIG. 16) and the different registered user is made.

In addition, the connection path between the verified registered user (e.g., the verified registered user 1310 of FIG. 13A-B, the verified registered user 1310 of FIG. 16) and the different registered user may be communicated to the verified registered user to display. A hyperlink in the connection path of each of the at least one registered users may be embedded through whom the connection path between the verified registered user (e.g., the verified registered user 1310 of FIG. 13A-B, the verified registered user 1310 of FIG. 16) and the different registered user is made.

Figure 25:
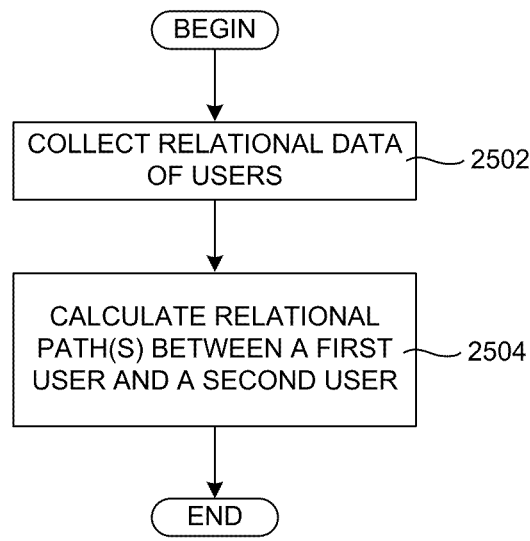
FIG. 25 is a flowchart of communicating brief profiles of the registered users, processing a hyperlink selection from the verified registered user and calculating and ensuring the Nmax degree of separation of the registered users away from verified registered users, according to one embodiment.

FIG. 25 is a flowchart of communicating brief profiles of the registered users, processing a hyperlink selection from the verified registered user (e.g., the verified registered user 1310 of FIG. 13A-B, the verified registered user 1310 of FIG. 16) and calculating and ensuring the Nmax degree of separation of the registered users away from verified registered users (e.g., the verified registered user 1310 of FIG. 13A-B, the verified registered user 1310 of FIG. 16), according to one embodiment. In operation 2502, the data of the registered users may be collected from the database. In operation 2504, the relational path between the first user and the second user may be calculated (e.g., the Nmax degree of separation between verified registered user (e.g., the verified registered user 1310 of FIG. 13A-B, the verified registered user 1310 of FIG. 16) and the registered user).

For example, the brief profiles of registered users, including a brief profile of the different registered user, to the verified registered user (e.g., the verified registered user 1310 of FIG. 13A-B, the verified registered user 1310 of FIG. 16) for display, each of the brief profiles including a hyperlink to a corresponding full profile may be communicated.

Furthermore, the hyperlink selection from the verified registered user (e.g., the verified registered user 1310 of FIG. 13A-B, the verified registered user 1310 of FIG. 16) may be processed (e.g., upon processing the hyperlink selection of the full profile of the different registered user, the full profile of the different registered user may be communicated to the verified registered user (e.g., the verified registered user 1310 of FIG. 13A-B, the verified registered user 1310 of FIG. 16) for display). In addition, the brief profiles of those registered users may be ensured who are more than Nmax degrees of separation away from the verified registered user (e.g., the verified registered user 1310 of FIG. 13A-B, the verified registered user 1310 of FIG. 16) are not communicated to the verified registered user (e.g., the verified registered user 1310 of FIG. 13A-B, the verified registered user 1310 of FIG. 16) for display.

Figure 26:
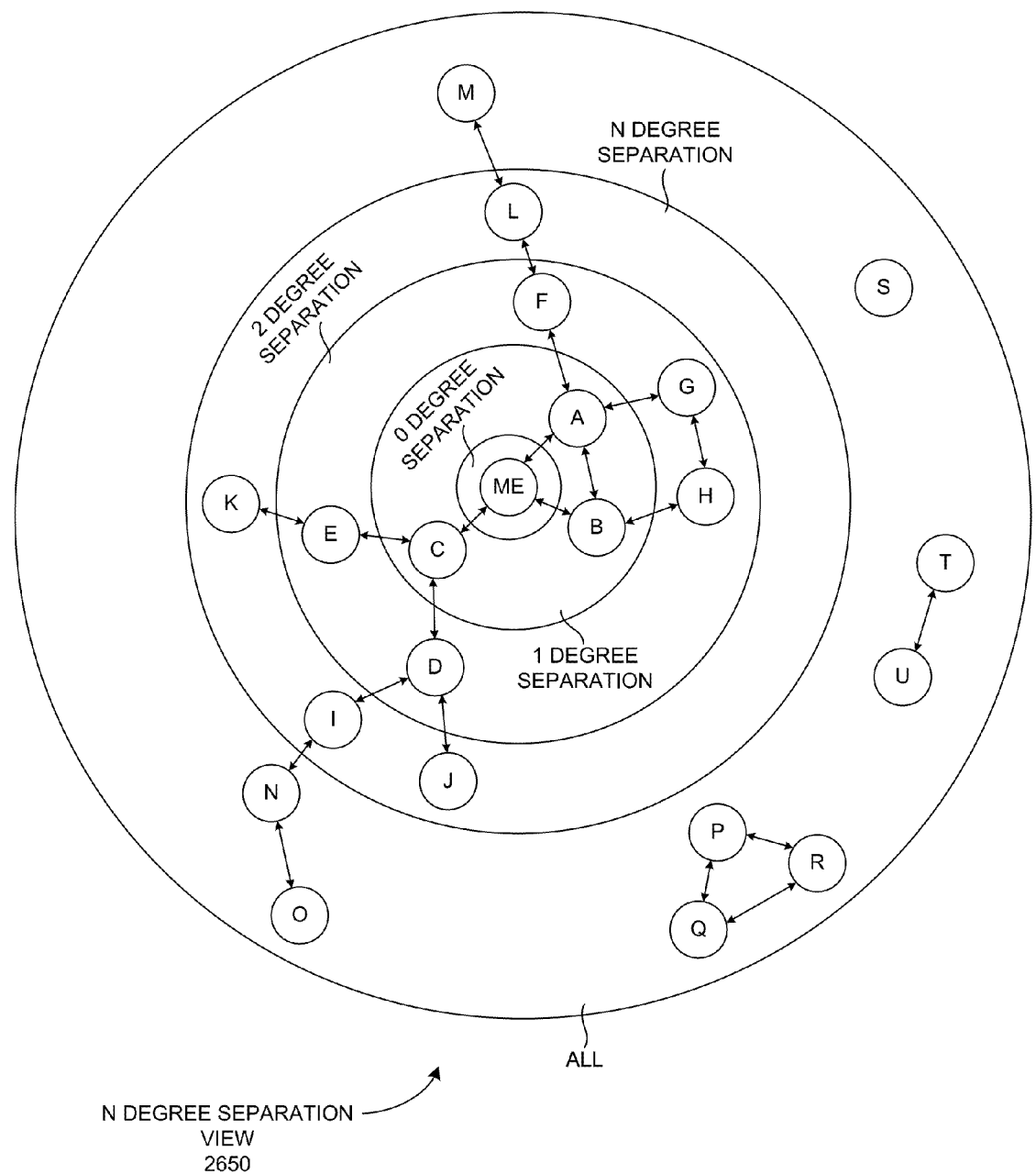
FIG. 26 is an N degree separation view, according to one embodiment.

FIG. 26 is an N degree separation view 2650, according to one embodiment. ME may be a verified registered user (e.g., the verified registered user 1310 of FIG. 13A-B, the verified registered user 1310 of FIG. 16) of the global neighborhood environment (e.g., the privacy server 100 of FIG. 1) centered in the neighborhood network. A, B, C, D, E, F, G, H, I, J, K, L, M, N, O, P, Q, R, S, T, and/or U may be the other registered user of the neighborhood network. The member of the neighborhood network may be separated from the centered verified registered user (e.g., the verified registered user 1310 of FIG. 13A-B, the verified registered user 1310 of FIG. 16) ME of the neighborhood network by certain degree of separation. The registered user A, B and C may be directly connected and are deemed to be separated by one degree of separation from verified registered user (e.g., the verified registered user 1310 of FIG. 13A-B, the verified registered user 1310 of FIG. 16) ME. The registered user D, E, F, G, and H may be connected through no less than one other registered user may be deemed to be separated by two degree of separation from verified registered user (e.g., the verified registered user 1310 of FIG. 13A-B, the verified registered user 1310 of FIG. 16) ME. The registered user I, J, K, and L may be connected through no less than N−1 other registered user may be deemed to be separated by N degree of separation from verified registered user (e.g., the verified registered user 1310 of FIG. 13A-B, the verified registered user 1310 of FIG. 16) ME. The registered user M, N, O, P, Q, R S, T and U may be all registered user.

Figure 27:
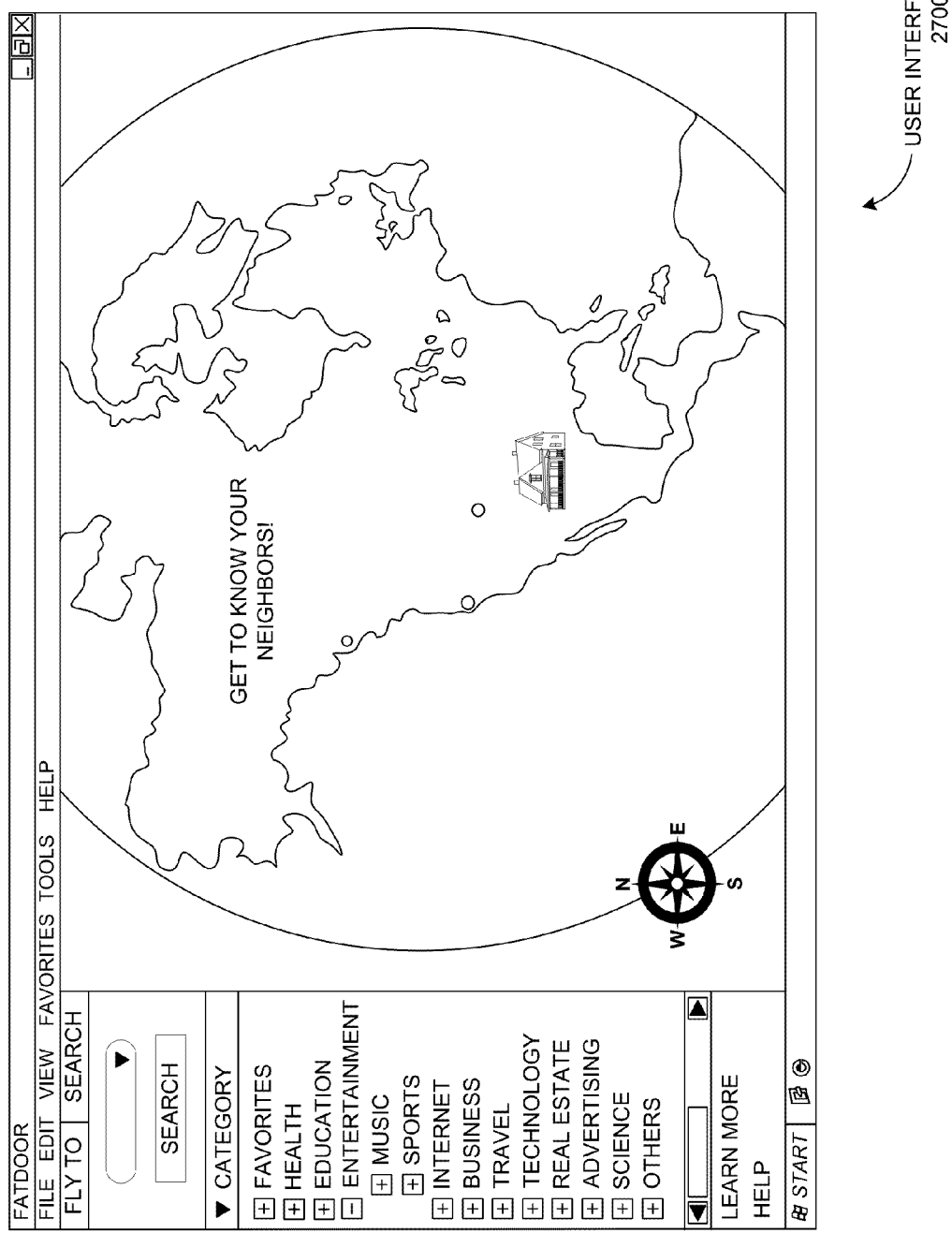
FIG. 27 is a user interface view showing a map, according to one embodiment.

FIG. 27 is a user interface view 2700 showing a map, according to one embodiment. Particularly FIG. 27 illustrates a satellite photo of a physical world. The registered user of the global neighborhood environment (e.g., the privacy server 100 of FIG. 1) may use this for exploring the geographical location (e.g., the geographical location 1204 of FIG. 12A) of the neighbors (e.g., the neighbor 120 of FIG. 1). The registered user (e.g., the verified registered user 1310 of FIG. 13A-B, the verified registered user 1310 of FIG. 16) may navigate, zoom, explore and quickly find particular desired geographical locations of the desired neighbors (e.g., the neighbor 120 of FIG. 1). This may help the registered user to read the map and/or plot the route of the neighbors (e.g., the neighbor 120 of FIG. 1) on the world map.

Figure 28A:
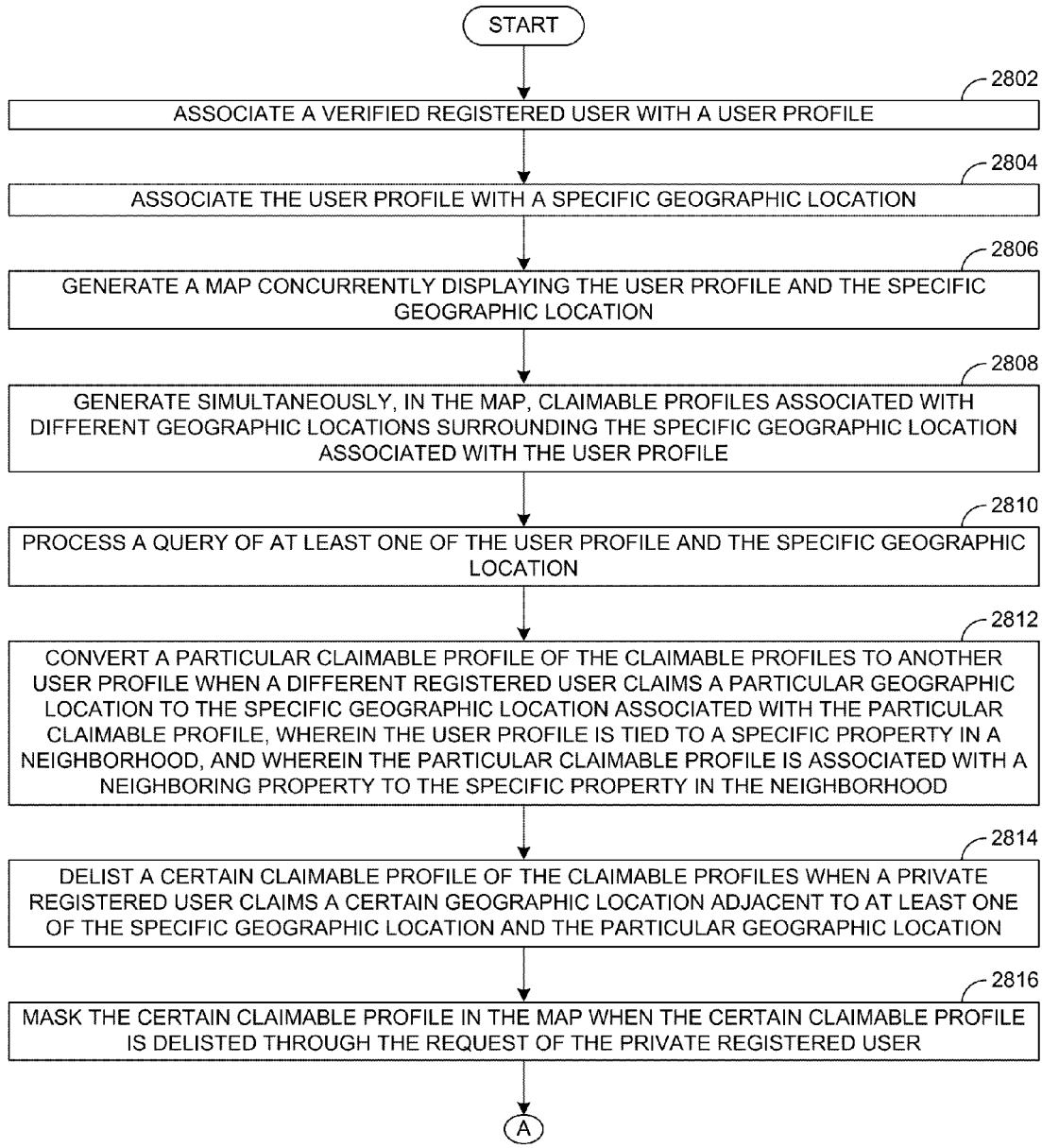
FIG. 28A is a process flow chart of searching a map based community and neighborhood contribution, according to one embodiment.

FIG. 28A is a process flow of searching map based community and neighborhood contribution, according to one embodiment. In operation 2802, a verified registered user (e.g., a verified registered user 1310 of FIG. 13A-13B, a verified registered user 1310 of FIG. 16) may be associated with a user profile (e.g., a user profile 1200 of FIG. 12A). In operation 2804, the user profile (e.g., the user profile 1200 of FIG. 12A) may be associated with a specific geographic location (e.g., a geographic location 1204 of FIG. 12A).

In operation 2806, a map (e.g., a map 1202 of FIG. 12A-12B, a map 1400 of FIG. 14, a map 1600 of FIG. 16, a map 1701 of FIG. 17) may be generated concurrently displaying the user profile (e.g., the user profile 1200 of FIG. 12A) and the specific geographic location (e.g., the geographic location 1204 of FIG. 12A). In operation, 2808, in the map, claimable profiles (e.g., a claimable profile 1206 of FIG. 12A-B, a claimable profile 1302 of FIG. 13A, a claimable profile 1704 of FIG. 17) associated with different geographic locations may be simultaneously generated surrounding the specific geographic location (e.g., the geographic location 1204 of FIG. 12A) associated with the user profile (e.g., the user profile 1200 of FIG. 12A).

In operation 2810, a query of at least one of the user profile (e.g., the user profile 1200 of FIG. 12A) and the specific geographic location (e.g., the geographic location 1204 of FIG. 12A) may be processed. In operation 2812, a particular claimable profile of the claimable profiles (e.g., the claimable profile 1206 of FIG. 12A-B, the claimable profile 1302 of FIG. 13A, the claimable profile 1704 of FIG. 17) may be converted to another user profile (e.g., the user profile 1200 of FIG. 12A) when a different registered user claims a particular geographic location to the specific geographic location (e.g., the geographic location 1204 of FIG. 12A) associated with the particular claimable profile (e.g., the claimable profile 1206 of FIG. 12A-B, the claimable profile 1302 of FIG. 13A, the claimable profile 1704 of FIG. 17), wherein the user profile (e.g., the user profile 1200 of FIG. 12A) may be tied to a specific property in a neighborhood (e.g., a neighborhood 102A-102N of FIG. 1), and wherein the particular claimable profile (e.g., the claimable profile 1206 of FIG. 12A-12B, the claimable profile 1302 of FIG. 13A, the claimable profile 1704 of FIG. 17) may be associated with a neighboring property to the specific property in the neighborhood (e.g., the neighborhood 120A-120N of FIG. 1).

In operation 2814, a certain claimable profile (e.g., the claimable profile 1206 of FIG. 12A-12B, the claimable profile 1302 of FIG. 13A, the claimable profile 1704 of FIG. 17) of the claimable profiles (e.g., the claimable profile 1206 of FIG. 12A-B, the claimable profile 1302 of FIG. 13A, the claimable profile 1704 of FIG. 17) may be delisted when a private registered user claims a certain geographic location (e.g., the geographic location 1204 of FIG. 12A) adjacent to at least one of the specific geographic location and the particular geographic location (e.g., the geographic location 1204 of FIG. 12A).

In operation 2816, the certain claimable profile (e.g., the claimable profile 1206 of FIG. 12A-B, the claimable profile 1302 of FIG. 13A, the claimable profile 1704 of FIG. 17) in the map (e.g., the map 1202 of FIG. 12A-B, the map 1400 of FIG. 14, the map 1600 of FIG. 16, the map 1701 of FIG. 17) when the certain claimable profile may be delisted and/or be masked through the request of the private registered user.

Figure 28B:
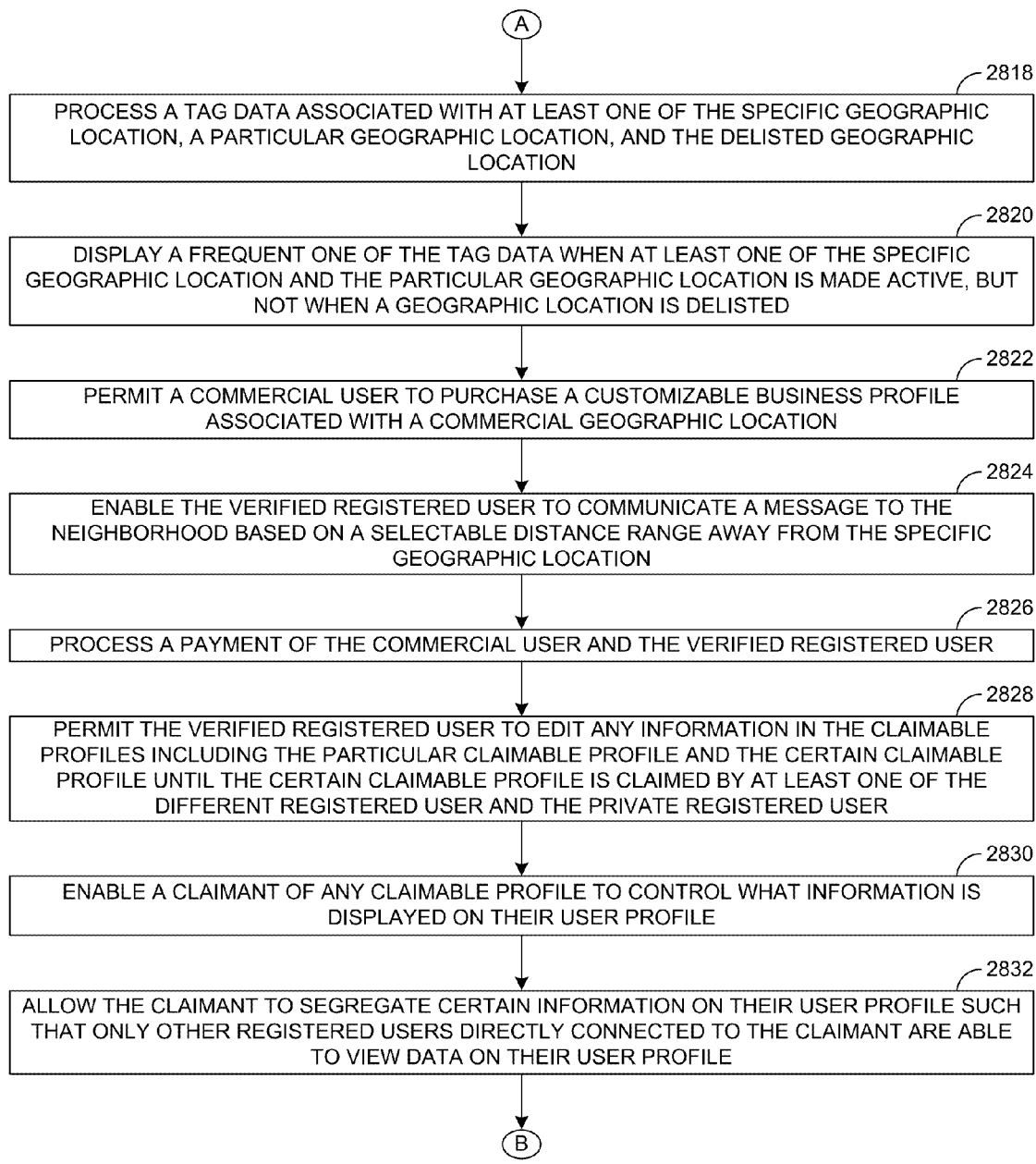
FIG. 28B is a continuation of process flow of FIG. 28A showing additional processes, according to one embodiment.

FIG. 28B is a continuation of process flow of FIG. 28A showing additional processes, according to one embodiment. In operation 2818, a tag data associated with at least one of the specific geographic location, the particular geographic location (e.g., the geographic location 1204 of FIG. 12A), and the delisted geographic location may be processed. In operation 2820, a frequent one of the tag data may be displayed when at least one of the specific geographic location and the particular geographic location (e.g., the geographic location 1204 of FIG. 12A) may be made active, but not when the geographic location (e.g., the geographic location 1204 of FIG. 12A) may be delisted.

In operation 2822, a commercial user (e.g., a commercial user 1300 of FIG. 13A-B) may be permitted to purchase a customizable business profile (e.g., a customizable business profile 1304 of FIG. 13B) associated with a commercial geographic location. In operation 2824, the verified registered user (e.g., the verified registered user 1310 of FIG. 13A-B, the verified registered user 1310 of FIG. 16) to communicate a message to the neighborhood (e.g., the neighborhood 102A-102N of FIG. 1) may be enabled based on a selectable distance range away from the specific geographic location.

In operation 2826, a payment of the commercial user (e.g., the commercial user 1300 of FIG. 13A-B) and the verified registered user (e.g., the verified registered user 1310 of FIG. 13A-B, the verified registered user 1310 of FIG. 16) may be processed. In operation 2828, the verified registered user (e.g., the verified registered user 1310 of FIG. 13A-B, the verified registered user 1310 of FIG. 16) may be permitted to edit any information in the claimable profiles (e.g., the claimable profile 1206 of FIG. 12A-B, the claimable profile 1302 of FIG. 13A, the claimable profile 1704 of FIG. 17) including the particular claimable profile and the certain claimable profile until the certain claimable profile may be claimed by at least one of the different registered user and the private registered user.

In operation 2830, a claimant of any claimable profile (e.g., the claimable profile 1206 of FIG. 12A-B, the claimable profile 1302 of FIG. 13A, the claimable profile 1704 of FIG. 17) may be enabled to control what information is displayed on their user profile (e.g., the user profile 1200 of FIG. 12A). In operation 2832, the claimant to segregate certain information on their user profile (e.g., the user profile 1200 of FIG. 12A) may be allowed such that only other registered users directly connected to the claimant are able to view data on their user profile (e.g., the user profile 1200 of FIG. 12A).

Figure 28C:
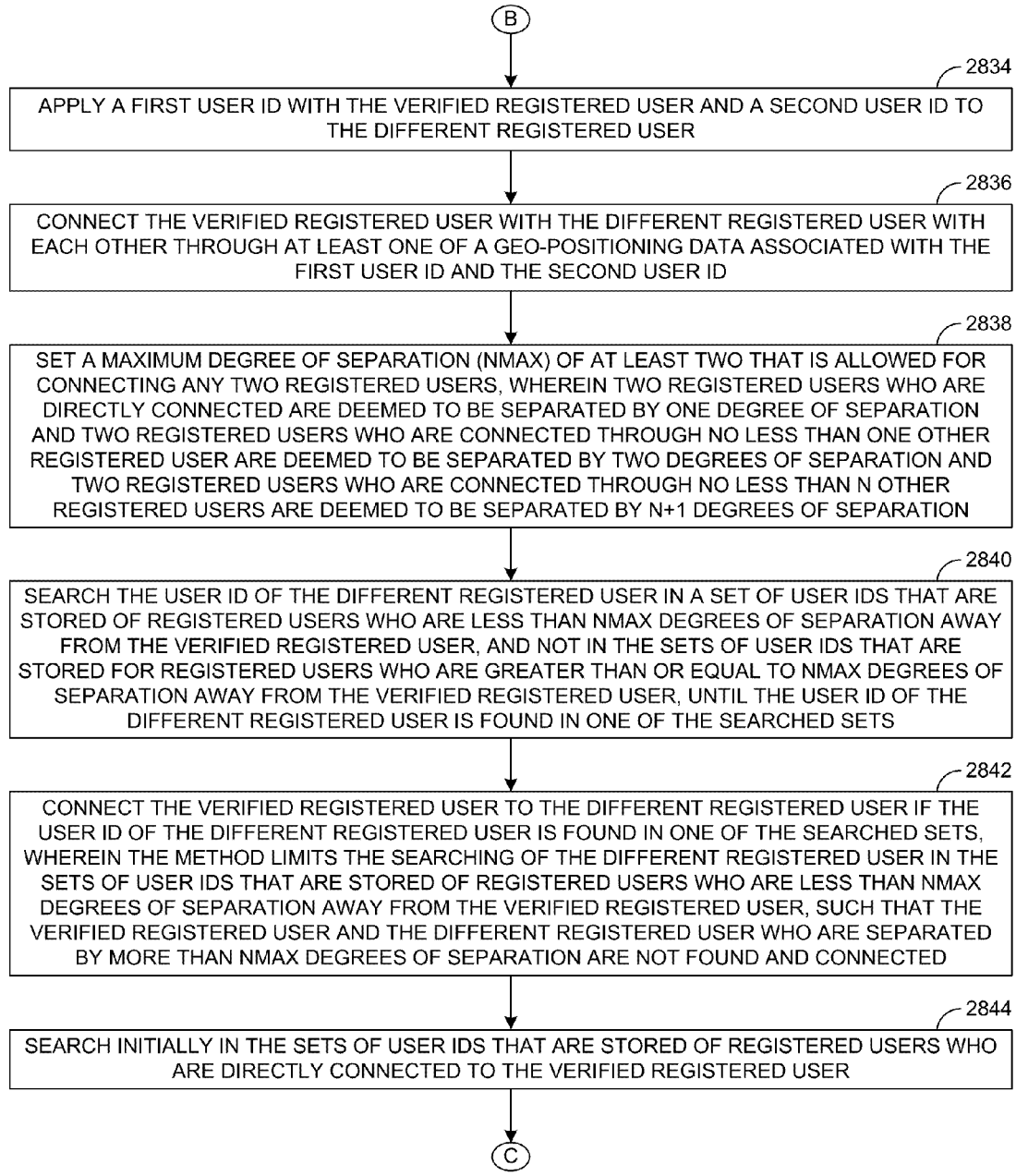
FIG. 28C is a continuation of process flow of FIG. 28B showing additional processes, according to one embodiment.

FIG. 28C is a continuation of process flow of FIG. 28B showing additional processes, according to one embodiment. In operation 2834, a first user ID with the verified registered user (e.g., the verified registered user 1310 of FIG. 13A-B, the verified registered user 1310 of FIG. 16) and a second user ID to the different registered user may be applied. In operation 2836, the verified registered user (e.g., the verified registered user 1310 of FIG. 13A-B, the verified registered user 1310 of FIG. 16) with the different registered user with each other may be connected through at least one of associated with the first user ID and the second user ID.

In operation 2838, a maximum degree of separation (Nmax) of at least two may be set that is allowed for connecting any two registered users, wherein two registered users who are directly connected may be deemed to be separated by one degree of separation and two registered users who are connected through no less than one other registered user may be deemed to be separated by two degrees of separation and two registered users who may be connected through no less than N other registered users are deemed to be separated by N+1 degrees of separation. In operation 2840, the user ID of the different registered user may be searched in a set of user IDs that are stored of registered users who are less than Nmax degrees of separation away from the verified registered user (e.g., the verified registered user 1310 of FIG. 13A-B, the verified registered user 1310 of FIG. 16), and not in the sets of user IDs that are stored for registered users who may be greater than or equal to Nmax degrees of separation away from the verified registered user (e.g., the verified registered user 1310 of FIG. 13A-B, the verified registered user 1310 of FIG. 16), until the user ID of the different registered user may be found in one of the searched sets.

In operation 2842, the verified registered user (e.g., the verified registered user 1310 of FIG. 13A-B, the verified registered user 1310 of FIG. 16) may be connected to the different registered user if the user ID of the different registered user may be found in one of the searched sets, wherein the method limits the searching of the different registered user in the sets of user IDs that may be stored of registered users who may be less than Nmax degrees of separation away from the verified registered user (e.g., the verified registered user 1310 of FIG. 13A-B, the verified registered user 1310 of FIG. 16), such that the verified registered user (e.g., the verified registered user 1310 of FIG. 13A-B, the verified registered user 1310 of FIG. 16) and the different registered user who may be separated by more than Nmax degrees of separation are not found and connected. In operation 2844, initially in the sets of user IDs that are stored of registered users who may be directly connected to the verified registered user (e.g., the verified registered user 1310 of FIG. 13A-B, the verified registered user 1310 of FIG. 16) may be initially searched.

Figure 28D:
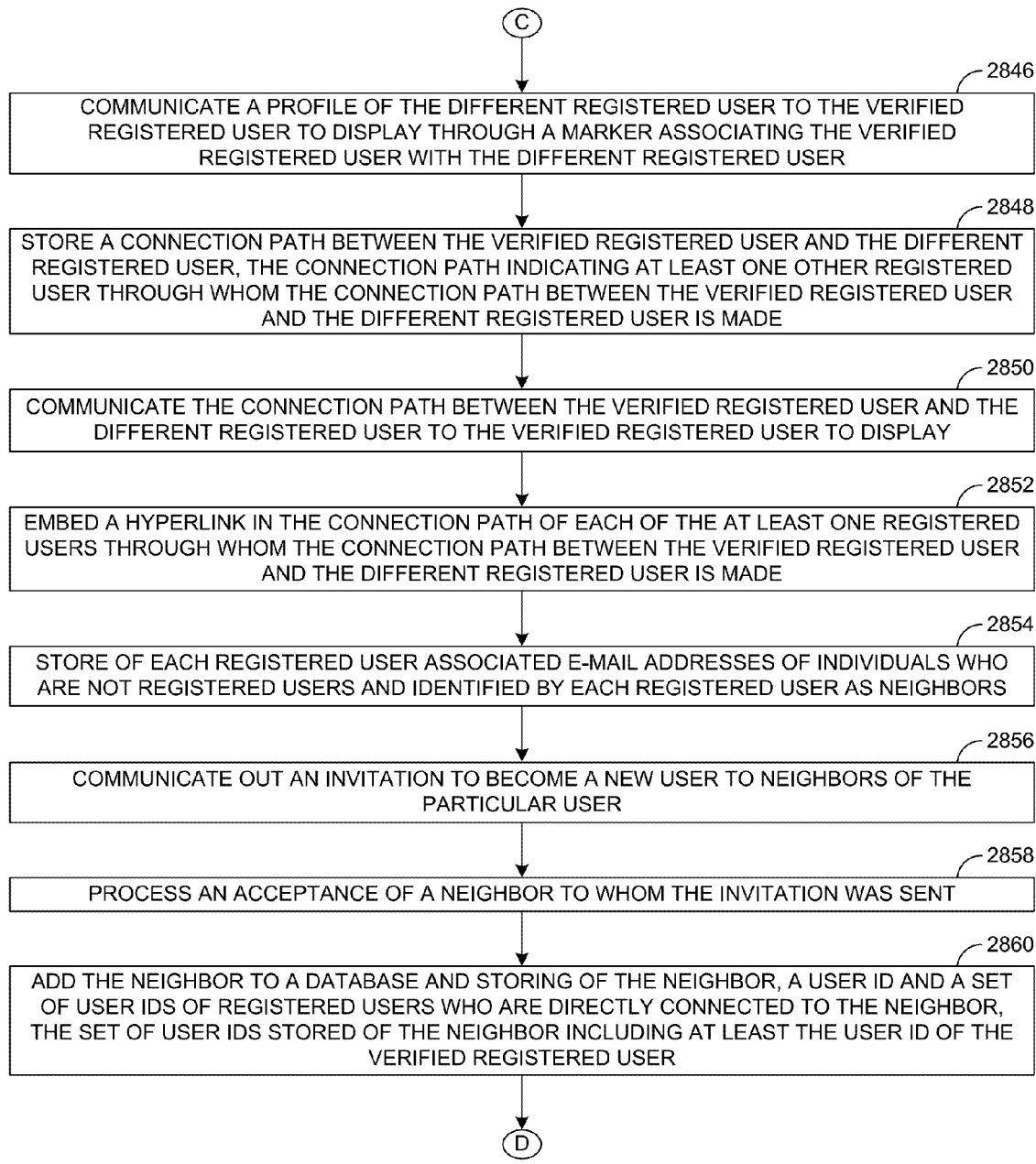
FIG. 28D is a continuation of process flow of FIG. 28C showing additional processes, according to one embodiment.

FIG. 28D is a continuation of process flow of FIG. 28C showing additional processes, according to one embodiment. In operation 2846, a profile of the different registered user to the verified registered user (e.g., the verified registered user 1310 of FIG. 13A-B, the verified registered user 1310 of FIG. 16) to display may be communicated through a marker associating the verified registered user (e.g., the verified registered user 1310 of FIG. 13A-B, the verified registered user 1310 of FIG. 16) with the different registered user.

In operation 2848, a connection path between the verified registered user (e.g., the verified registered user 1310 of FIG. 13A-B, the verified registered user 1310 of FIG. 16) and the different registered user, the connection path indicating at least one other registered user may be stored through whom the connection path between the verified registered user (e.g., the verified registered user 1310 of FIG. 13A-B, the verified registered user 1310 of FIG. 16) and the different registered user may be made.

In operation 2850, the connection path between the verified registered user (e.g., the verified registered user 1310 of FIG. 13A-B, the verified registered user 1310 of FIG. 16) and the different registered user to the verified registered user (e.g., the verified registered user 1310 of FIG. 13A-B, the verified registered user 1310 of FIG. 16) may be communicated to display.

In operation 2852, a hyperlink in the connection path of each of the at least one registered users may be embedded through whom the connection path between the verified registered user (e.g., the verified registered user 1310 of FIG. 13A-B, the verified registered user 1310 of FIG. 16) and the different registered user may be made. In operation 2854, each registered user associated e-mail addresses of individuals who are not registered users may be stored and identified by each registered user as neighbors (e.g., a neighbor 120 of FIG. 1).

In operation 2856, an invitation may be communicated to become a new user (e.g., a user 116 of FIG. 1) to neighbors (e.g., the neighbor 120 of FIG. 1) of the particular user. In operation 2858, an acceptance of the neighbor (e.g., the neighbor 120 of FIG. 1) to whom the invitation was sent may be processed. In operation 2860, the neighbor (e.g., the neighbor 120 of FIG. 1) to a database and storing of the neighbor (e.g., the neighbor 120 of FIG. 1), a user ID and the set of user IDs of registered users may be added who are directly connected to the neighbor (e.g., the neighbor 120 of FIG. 1), the set of user IDs stored of the neighbor (e.g., the neighbor 120 of FIG. 1) including at least the user ID of the verified registered user (e.g., the verified registered user 1310 of FIG. 13A-B, the verified registered user 1310 of FIG. 16).

Figure 28E:
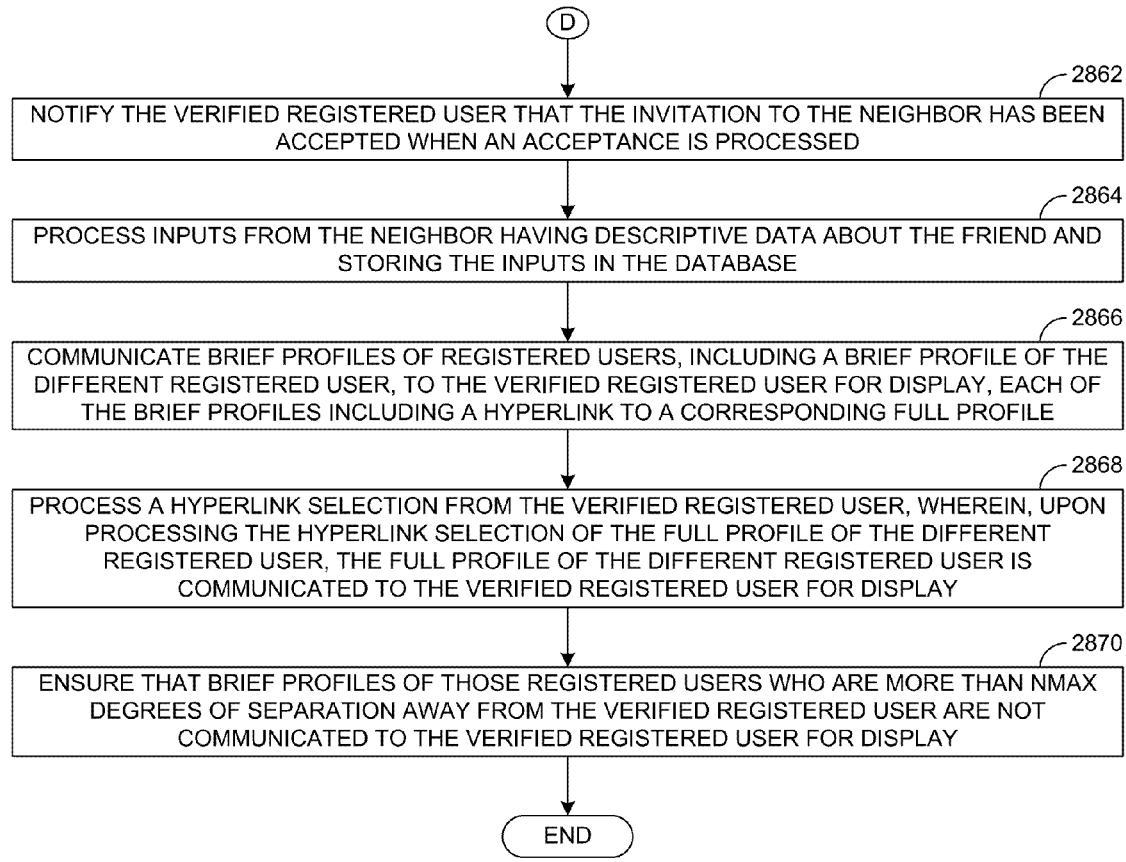
FIG. 28E is a continuation of process flow of FIG. 28D showing additional processes, according to one embodiment.

FIG. 28E is a continuation of process flow of FIG. 28D showing additional processes, according to one embodiment. In operation 2862, the verified registered user (e.g., the verified registered user 1310 of FIG. 13A-B, the verified registered user 1310 of FIG. 16) that the invitation to the neighbor (e.g., the neighbor 120 of FIG. 1) has been accepted may be notified when the acceptance is processed.

In operation 2864, inputs from the neighbor (e.g., the neighbor 120 of FIG. 1) having descriptive data about the friend and storing the inputs in the database may be processed. In operation 2866, brief profiles of registered users, including a brief profile of the different registered user may be communicated, to the verified registered user (e.g., the verified registered user 1310 of FIG. 13A-B, the verified registered user 1310 of FIG. 16) for display, each of the brief profiles including the hyperlink to a corresponding full profile.

In operation 2868, the hyperlink selection from the verified registered user (e.g., the verified registered user 1310 of FIG. 13A-B, the verified registered user 1310 of FIG. 16) may be processed, wherein, upon processing the hyperlink selection of the full profile of the different registered user, the full profile of the different registered user is communicated to the verified registered user (e.g., the verified registered user 1310 of FIG. 13A-B, the verified registered user 1310 of FIG. 16) for display.

In operation 2870, brief profiles of those registered users who may be more than Nmax degrees of separation away from the verified registered user (e.g., the verified registered user 1310 of FIG. 13A-B, the verified registered user 1310 of FIG. 16) may not communicated to the verified registered user (e.g., the verified registered user 1310 of FIG. 13A-B, the verified registered user 1310 of FIG. 16) may be ensured for display.

People in suburbia and urban cities now may not even know who their neighbors are. Communities have become more insular. There may be a few active people in each neighborhood who know about their neighborhood and are willing to share what they know with others. They should be able to share this information with others through the Internet. Many people want to know who their neighbors are and express themselves and their families through the internet. People want to also know about recommendations and what kind of civic and cultural things are in the neighborhood. What is contemplated includes: A social network for people who want to get to know their neighbors and/or neighborhoods. Particularly, one in which a set of maps of neighborhoods (e.g., such as those on Zillow.com or provided through Google® or Microsoft®) are used as a basis on which a user can identify themselves with a particular address. This address may be verified through one or more of the modules on FIG. 1. Particularly, this address may be the current address of the user is living, a previous address where the user used to live, etc.

The address may be verified through a credit check of the user, or a copy of the user's drivers license. Once the user is approved in a particular home/location, the user can leave their comments about their home. They can mark their home information proprietary, so that no one else can contribute to their info without their permission. They can have separate private and public sections, in which the private section is shared with only verified addresses of neighbors, and the public section is shared with anybody viewing their profile. The user can then create separate social networking pages for homes, churches, locations, etc. surrounding his verified address. As such, the user can express him/herself through their profile, and contribute information about what they're neighborhood is like and who lives there. Only verified individuals or entities might be able to view information in that neighborhood.

The more information the user contributes, the higher his or her status will be in the neighborhood through a marker (e.g., a number of stars), or through additional services offered to the neighbor, such as the ability to search a profiles of neighbors in a larger distance range from a verified address of the user. For example, initially, the user may only be able to search profiles within 1 mile on their principal, current home after being verified as living in there. When they create a profiles for themselves and/or contribute profiles of other people, they may widen their net of private profiles they may be allowed to search (e.g., because they become a trusted party in the neighborhood by offering civic information). Neighbors can leave feedback for each other, and arrange private block parties, etc. through their private profile. All these features may possible through one or more of the embodiments and/or modules illustrated in FIGS. 1-28. Through their public profile, neighbors can know if there is a doctor living down the street, or an attorney around the corner. The FIGS. 1-28 illustrate various embodiments that may be realized. While a description is given here, a self-evident description can be derived for the software and various methods, software, and hardware directly from the attached Figures.

A neighborhood expression and user contribution system is disclosed. In one aspect, the technology allows users to see the value of millions of homes across the United States and/or the world, not just those that the user themselves own or live in, because they can share information about their neighbors. People living in apartments or condos can use the apartment/condo modeler wizard (e.g., as illustrated in FIG. 1) to create models (e.g. 2 or 3d) of their building and share information about their apartment/home and of their neighbors with others. The technology has an integrated targeted advertising system for enabling advertisers to make money through the social community module 100 by delivering targeted and non-targeted advertisements.

Aside from giving user generated content of information of homes, the system may also provide value estimates of homes it may also offers several unique features including value changes of each home in a given time frame (e.g. 1, 5, or 10 years) and aerial views of homes as well as the price of the surrounding homes in the area. It may also provides basic data of a given home such as square footage and the number of bedrooms and bathrooms. Users may can also obtain current estimates of homes if there was a significant change made such as recently modeled kitchen.

In the example systems and methods illustrated in FIGS. 1-28, neighbors may get to know each other and their surrounding businesses more easily through the Internet. The user interface view of the social community module may include a searchable map interface and/or a social networking page on the right when one clicks a particular home/location. The map interface may/may not include information about prices of a home, or information about the number of bedrooms of a home, etc. In essence, certain critical input information may be divided as follows:

Residential location: (1) name of the persons/family living in that residence (2) Their profession if any 3) Their educational background if any (4) Their recreational interests (5) About their family description box (6) Anything else people want to post about that person including their interests, hobbies, etc. (7) An ability for users to leave endorsements.

Business location or civic location (e.g., park, govt. building, church, etc.): (1) name of the business/location (2) email of the manager of the business/location (3) phone number of the business/location if known (4) anything else people want to say about the business (good or bad), for example, contributable through a claimable.

These two will be the primary types. Various features differentiate example embodiments of the social community module from other social networks. These differentiators include (1) interface driven by address (2) maps that can be viewed, zoomed in on, tied to a parcel #, etc. (3) Anyone can populate anyone's social network page. (4) Anybody can post in one of the boxes. They can post anonymously or publicly (5) If someone wants to override information that already has been established, they will need to have an identity (e.g., user name), to override published posting information.

However, according to one embodiment, if an owner of an entity location wishes to mark their location private, and uneditable by the public without their permission, they will need to pay (e.g., a monthly fixed fee) through the social community module. Alternatively, the owner of the entity location may not need to pay to mark the location as private and uneditable by the public without the owner's permission. Example embodiments of the social community module may feature info about businesses. They may also feature info about people that live in the homes, and may/may not display information on prices, number of bedrooms, etc.

The social community module (e.g., as described in FIG. 1) may be a search engine (e.g., Google®, Yahoo®, etc.) that uses maps (e.g., satellite map views) instead of text displays to show information, user profiles, reviews, promotions, ads, directions, events, etc. relevant to user searches.

The example systems and methods illustrated in FIGS. 1-28 may facilitate a social network membership that spreads virally by users inviting their friends. For example, every person that registers has their own profile, but registration may not be required to contribute content. However, registration may be required to "own" content on your own home, and have override permission to delete things that you don't like about yourself listed about you by others. In one embodiment, the social community module may need to confirm the user's identity and address (e.g., using digital signature tools, drivers license verification, etc.), and/or the user may need to pay a monthly fixed fee (e.g., through a credit card) to control their identity.

For example, they can get a rebate, and not have to pay the monthly fee for a particular month, if they invite at least 15 people that month AND contribute information about at least 10 of their neighbors, friends, civic, or business locations in their neighborhood. People can post pics of their family, their business, their home, etc. on their profile once they 'own' their home and register. In another embodiment, endorsements for neighbors by others will be published automatically. People can search for other people by descriptors (e.g., name, profession, distance away from me, etc.)

Profiles of users may be created and/or generated on the fly, e.g., when one clicks on a home.

People may be able to visually see directions to their neighborhood businesses, rather than reading directions through text in a first phase. After time, directions (e.g., routes) can be offered as well. Users can leave their opinions on businesses, but the social community module also enables users to leave opinions on neighbors, occupants or any entity having a profile on the map display. The social community module may not attempt to restrict freedom of speech by the users, but may voluntarily delete slanderous, libelous information on the request of an owner manually at any time.

In one embodiment, the methods and systems illustrated in FIGS. 1-28 enable people to search for things they want e.g.

nearby pizzas etc. (e.g., by distance away). Advertisers can 'own' their listing by placing a display ad on nextdoor.com. Instead of click-through revenues when someone leaves the site, revenues will be realized when the link is clicked and someone views a preview html on the right of the visual map. Targeted advertisements may also be placed when someone searches a particular street, name, city, etc.

In another example embodiment, the social community module may enable users of the social network to populate profiles for apartments, buildings, condos, etc. People can create floors, layout, etc. of their building, and add social network pages on the fly when they click on a location that has multiple residents, tenants, or lessees.

A user interface associated with the social community module 100 may be clean, simple, and uncluttered (e.g., Simple message of "get to know your neighbors"). For example, the map interface shows neighbors. Methods and systems associated with the features described may focus on user experience, e.g., ensuring a compelling message to invite friends and/or others to join. A seed phase for implementation of the methods and systems illustrated in FIGS. 1-28 may be identified for building a membership associated with the social community module.

For example, a user having extensive networks in a certain area (e.g., a city) may seed those communities as well. The social network may encourage user expression, user content creation, ease of use on site to get maximum users/distribution as quickly as possible. In another embodiment, the social community module may ensure that infrastructure associated with operation of the social community module (e.g., servers) is able to handle load (e.g., data traffic) and keep up with expected growth.

For example, the user interface view illustrated in the various figures shows an example embodiment of the social community module of FIG. 1. The user interface view may include a publicly editable profile wall section allowing public postings that owners of the profile can edit. For example, any user may be able to post on an empty profile wall, but a user must claim the location to own the profile (e.g., may minimize barriers to users posting comments on profile walls).

Names featured on the profile wall may be links to the user profiles on the map (e.g., giving an immediate sense for the location of admirers (or detractors) relative to user location). In one embodiment, an action (e.g., mouse-over) on a comment would highlight the comment user's house on the map and names linking to user profiles. The user interface view may also utilize the mapping interface to link comments to locations.

For example, the various embodiments illustrate a comment announcing a garage sale, that is tied to a mappable location on the mapping interface. (e.g., allows people to browse references directly from people's profiles.). In the various figures, an example display of the mapping interface is illustrated. In this example display, houses are shown in green, a church is shown in white, the red house shows the selected location and/or the profile owner's house, question marks indicate locations without profile owners, blue buildings are commercial locations, and the pink building represents an apartment complex.

Houses with stars indicate people associated with (e.g., "friends") of the current user. In one embodiment, a user action (e.g., mouse-over) on a commercial property displayed in the mapping interface may pull up a star (e.g., "***") rating based on user reviews, and/or a link to the profile for the property. A mouse-over action on the apartment complex may pull up a building schematic for the complex with floor plans, on which the user can see friends/profiles for various floors or rooms. Question marks indicated in the display may prompt users to own that profile or post comments on the wall for that space. A user action on any house displayed in the mapping interface may pull up a profile link, summary info such as status, profession, interests, etc. associated with the profile owner, a link to add the person as a friend, and/or a link to send a message to the user (e.g., the profile owner).

In another embodiment, a default profile view shown is that of the current user (e.g., logged in), and if the user clicks on any other profile, it may show their profile in that space instead (with few text changes to indicate different person). The events in your area view of the profile display in may have a default radius for notification of events (e.g., by street, by block, by neighborhood, county, etc.) Events are associated with user profiles and may link to locations displayed on the mapping interfaces. The hot picks section may be an ad/promotional zone, with default settings for radius of alerts also configurable.

For example, the "Find a Friend" section may permit users to search by name, address, interests, status, profession, favorite movies/music/food etc. Users are also able to search within a given radius of their location. In one embodiment, the user interface view may include a link for the user to invite other people to join the network (e.g., may encourage users who see a question-mark on a house or a location on the mapping interface that corresponds to a real location associated with someone they know to contact that person and encourage them to join and own that profile through the social community module).

Some of the reasons we believe these embodiments are unique include:

Search engine that provides a visual map (e.g., rather than text) display of information relevant to user queries.

Users can search on the map for other people having certain professional, educational, personal, extracurricular, cultural, political and/or family etc. profiles or interests, within any location range.

Users can search for information on the map, that is accessible directly through profile displays. For example, the user may search for information about a certain subject and be directed to a profile of another user having information about the subject. Alternatively, the user may view the search subject itself as a visible item (e.g., if applicable to the search query) having a profile on the map display, along with additional information associated with the item (e.g., contributed by other users).

Allows users to search, browse and view information posted by other users about an entity location such as a home, a business property, a condo, an apartment complex, etc. directly on a map display Allows users to browse, form and join groups and communities based on location, preferences, interests, friend requests, etc.

Users can send messages to other people through their profiles within the map display Users can find friends, business associates, vendors, romantic partners, etc. on the map within any location range (e.g., in their neighborhood, street, subdivision, etc.) by browsing the map display or searching for people with certain profile characteristics and/or similar interests.

Users can view, browse and post comments/information/reviews about entity locations and/or people associated with those locations (e.g., occupants of a house, families, apartment residents, businesses, non-governmental entities, etc.), even for locations that do not have a profile owner. For example, all entity locations visible on the map display may link to a profile on which any user can post comments. To own the profile and edit the information posted about an entity location or the occupant(s), the occupant(s) would have to join the network associated with the social community module and become the owner of the profile. The profile owner would then become visible in the map display (e.g., entity locations without profile owners may only be visible as questions marks on the map, having blank profiles but public comment sections).

Users can share their comments and opinions about locations, preferences and/or interests on their profiles that are visible and searchable on the map display Automatically notifies users of events and promotions in an area (e.g., scope of area can be selected by the user), and highlights venues and user profiles on the map.

Users can post reviews about entity locations (e.g., businesses) such that ratings for entity locations are visible on the map. Other users can trace the location of the users that posted the comments on the map.

Users who post comments on other profiles can be traced directly on the map through their comments. Alternatively, users can choose to submit anonymous postings or comments on other user/entity profiles, and/or may choose not to be traceable on the map through their comments.

For entity locations having more than one residency unit (e.g., apartment complexes), people can create and post on profiles for any room/floor of the location (e.g., by entering information on a schematic view of the location that is visible on the map).

Users can visually determine routes/directions/orientation to locations that they can browse within the map display. Additionally, users can generate written driving, walking or public transit directions between points of interest (e.g., from the user's house to a friend's house) within the map display.

Users can communicate (e.g., through live chat) directly with other users in the area based on an association determined through their profiles Business entity locations can generate targeted ads and promotions within locations on the map display (e.g., virtual billboards).

The social community module can realize revenue based on ad clickthroughs by users, without the users being directed away from the interface. For example, when a user clicks on any targeted ad/promotion displayed on the map, the profile of the entity associated with the ad/promotion may be generated alongside the map display.

Neighborhood or neighborhood (see spelling differences) is a geographically localized community located within a larger city or suburb. The residents of a given neighborhood are called neighbors (or neighbors), although this term may also be used across much larger distances in rural areas.

Traditionally, a neighborhood is small enough that the neighbors are all able to know each other. However in practice, neighbors may not know one another very well at all. Villages aren't divided into neighborhoods, because they are already small enough that the villagers can all know each other.

The system however may work in any country and any geography of the world. In Canada and the United States, neighborhoods are often given official or semi-official status through neighborhood associations, neighborhood watches, or block watches. These may regulate such matters as lawn care and fence height, and they may provide such services as block parties, neighborhood parks, and community security. In some other places the equivalent organization is the parish, though a parish may have several neighborhoods within it depending on the area.

In localities where neighborhoods do not have an official status, questions can arise as to where one neighborhood begins and another ends, such as in the city of Philadelphia, Pa. Many cities may use districts and wards as official divisions of the city, rather than traditional neighborhood boundaries.

In the mainland of the People's Republic of China, the term is generally used for the urban administrative unit usually found immediately below the district level, although an intermediate, sub-district level exists in some cities. They are also called streets (administrative terminology may vary from city to city). Neighborhoods encompass 2,000 to 10,000 families. Within neighborhoods, families are grouped into smaller residential units or quarters of 100 to 600 families and supervised by a residents' committee; these are subdivided into residents' small groups of fifteen to forty families. In most urban areas of China, neighborhood, community, residential community, residential unit, residential quarter have the same meaning: 社区 or 小区 or 居民区 or 居住区,, and is the direct sublevel of a subdistrict (街道办事处), which is the direct sublevel of a district (区), which is the direct sublevel of a city (市). (See Political divisions of China.

The system and methods may be distributed through neighborhood associations. A neighborhood or neighborhood (see spelling differences) is a geographically localized community located within a larger city or suburb. The residents of a given neighborhood are called neighbors (or neighbors), although this term may also be used across much larger distances in rural areas.

Traditionally, a neighborhood is small enough that the neighbors are all able to know each other. However in practice, neighbors may not know one another very well at all. Villages aren't divided into neighborhoods, because they are already small enough that the villagers can all know each other. Each of the technologies and concepts disclosed herein may be embodied in software and/or hardware through one or more of the modules/embodiments discussed in FIGS. 1-28.

A block party is a large public celebration in which many members of a single neighborhood congregate to observe a positive event of some importance. Many times, there will be celebration in the form of playing music and dance. Block parties gained popularity in the United States during the 1970s. Block Parties were often held outdoors and power for the DJ's sound system was taken illegally from street lights. This was famously referenced in the song "South Bronx" by KRS-One with the line:

"Power from a street light made the place dark. But yo, they didn't care, they turned it out." It is also interesting to note that many inner city block parties were actually held illegally, as they might be described as loitering. However, police turned a blind eye to them, reasoning that if everyone from the neighborhood was gathered in one place there was less chance of crime being committed elsewhere.

In the suburbs, block parties are commonly held on holidays such as Fourth of July or Labor Day. Sometimes the occasion may be a theme such a "Welcome to the Neighborhood" for a new family or a recent popular movie. Often block parties involve barbecuing, lawn games such as Simon Says and group dancing such as the Electric Slide, the Macarena or line dancing.

In other usage, a block party has come to mean any informal public celebration. For example, a block party can be conducted via television even though there is no real block in the observance. The same is true for the Internet. The block party is closely related to the beach party. The British equivalent is the street party.

The systems and methods illustrated in FIGS. 1-28 may have software to emulate a block party or a neighborhood watch. A neighborhood watch (also called a crime watch or neighborhood crime watch) is a citizens' organization devoted to crime and vandalism prevention within a neighborhood. It is not a vigilante organization, since members are expected not to directly intervene in possible criminal activity. Instead, neighborhood watch members are to stay alert to unusual activity and contact the authorities. It builds on the concept of a town watch from Colonial America.

The current American system of neighborhood watches began developing in the late 1960s as a response to the rape and murder of Kitty Genovese in Queens, N.Y. People became outraged that three dozen witnesses did nothing to save Genovese or to apprehend her killer Some locals formed groups to watch over their neighborhoods and to look out for any suspicious activity in their areas. Shortly thereafter, the National Sheriffs' Association began a concerted effort in 1972 to revitalize the "watch group" effort nationwide.

A neighborhood watch (also called a crime watch or neighborhood crime watch) is a citizens' organization devoted to crime and vandalism prevention within a neighborhood. It is not a vigilante organization, since members are expected not to directly intervene in possible criminal activity. Instead, neighborhood watch members are to stay alert to unusual activity and contact the authorities. It builds on the concept of a town watch from Colonial America.

The current American system of neighborhood watches began developing in the late 1960s as a response to the rape and murder of Kitty Genovese in Queens, N.Y. People became outraged that three dozen witnesses did nothing to save Genovese or to apprehend her killer Some locals formed groups to watch over their neighborhoods and to look out for any suspicious activity in their areas. Shortly thereafter, the National Sheriffs' Association began a concerted effort in 1972 to revitalize the "watch group" effort nationwide.

The various methods, systems, and apparatuses disclosed herein and illustrated and described using the attached FIGS. 1-28 can be applied to creating online community organizations of neighborhoods of any form. During human growth and maturation, people encounter sets of other individuals and experiences. Infants encounter first, their immediate family, then extended family, and then local community (such as school and work). They thus develop individual and group identity through associations that connect them to life-long community experiences.

As people grow, they learn about and form perceptions of social structures. During this progression, they form personal and cultural values, a world view and attitudes toward the larger society. Gaining an understanding of group dynamics and how to "fit in" is part of socialization. Individuals develop interpersonal relationships and begin to make choices about whom to associate with and under what circumstances.

During adolescence and adulthood, the individual tends to develop a more sophisticated identity, often taking on a role as a leader or follower in groups. If associated individuals develop the intent to give of themselves, and commit to the collective well-being of the group, they begin to acquire a sense of community.

Socialization: The process of learning to adopt the behavior patterns of the community is called socialization. The most fertile time of socialization is usually the early stages of life, during which individuals develop the skills and knowledge and learn the roles necessary to function within their culture and social environment. For some psychologists, especially those in the psychodynamic tradition, the most important period of socialization is between the ages of 1 and 10. But socialization also includes adults moving into a significantly different environment, where they must learn a new set of behaviors.

Socialization is influenced primarily by the family, through which children first learn community norms. Other important influences include school, peer groups, mass media, the workplace and government. The degree to which the norms of a particular society or community are adopted determines one's willingness to engage with others. The norms of tolerance, reciprocity and trust are important "habits of the heart," as de Tocqueville put it, in an individual's involvement in community.

Continuity of the connections between leaders, between leaders and followers, and among followers is vital to the strength of a community. Members individually hold the collective personality of the whole. With sustained connections and continued conversations, participants in communities develop emotional bonds, intellectual pathways, enhanced linguistic abilities, and even a higher capacity for critical thinking and problem-solving. It could be argued that successive and sustained contact with other people might help to remove some of the tension of isolation, due to alienation, thus opening creative avenues that would have otherwise remained impassable.

Conversely, sustained involvement in tight communities may tend to increase tension in some people. However, in many cases, it is easy enough to distance oneself from the "hive" temporarily to ease this stress. Psychological maturity and effective communication skills are thought to be a function of this ability. In nearly every context, individual and collective behaviors are required to find a balance between inclusion and exclusion; for the individual, a matter of choice; for the group, a matter of charter. The sum of the creative energy (often referred to as "synergy") and the strength of the mechanisms that maintain this balance is manifest as an observable and resilient sense of community.

McMillan and Chavis (1986) identify four elements of "sense of community": 1) membership, 2) influence, 3) integration and fulfillment of needs, and 4) shared emotional connection. They give the following example of the interplay between these factors: Someone puts an announcement on the dormitory bulletin board about the formation of an intramural dormitory basketball team. People attend the organizational meeting as strangers out of their individual needs (integration and fulfillment of needs). The team is bound by place of residence (membership boundaries are set) and spends time together in practice (the contact hypothesis). They play a game and win (successful shared valent event). While playing, members exert energy on behalf of the team (personal investment in the group). As the team continues to win, team members become recognized and congratulated (gaining honor and status for being members). Someone suggests that they all buy matching shirts and shoes (common symbols) and they do so (influence).

A Sense of Community Index (SCI) has been developed by Chavis and his colleagues (1986). Although originally designed to assess sense of community in neighborhoods, the index has been adapted for use in schools, the workplace and a variety of types of communities.

Communitarianism as a group of related but distinct philosophies (or ideologies) began in the late 20th century, opposing classical liberalism, capitalism and socialism while advocating phenomena such as civil society. Not necessarily hostile to social liberalism, communitarianism rather has a different emphasis, shifting the focus of interest toward communities and societies and away from the individual. The question of priority, whether for the individual or community, must be determined in dealing with pressing ethical questions about a variety of social issues, such as health care, abortion, multiculturalism, and hate speech.

Effective communication practices in group and organizational settings are important to the formation and maintenance of communities. How ideas and values are communicated within communities are important to the induction of new members, the formulation of agendas, the selection of leaders and many other aspects. Organizational communication is the study of how people communicate within an organizational context and the influences and interactions within organizational structures. Group members depend on the flow of communication to establish their own identity within these structures and learn to function in the group setting. Although organizational communication, as a field of study, is usually geared toward companies and business groups, these may also be seen as communities. The principles can also be applied to other types of communities.

If the sense of community exists, both freedom and security exist as well. The community then takes on a life of its own, as people become free enough to share and secure enough to get along. The sense of connectedness and formation of social networks comprise what has become known as social capital.

Azadi Tower is a town square in modern Iran. Social capital is defined by Robert D. Putnam as "the collective value of all social networks (who people know) and the inclinations that arise from these networks to do things for each other (norms of reciprocity)." Social capital in action can be seen in groups of varying formality, including neighbors keeping an eye on each others' homes. However, as Putnam notes in Bowling Alone The Collapse and Revival of American Community (2000), social capital has been falling in the United States. Putnam found that over the past 25 years, attendance at club meetings has fallen 58 percent, family dinners are down 33 percent, and having friends visit has fallen 45 percent.

Western cultures are thus said to be losing the spirit of community that once were found in institutions including churches and community centers. Sociologist Ray Oldenburg states in The Great Good Place that people need three places: 1) The home, 2) the workplace, and, 3) the community hangout or gathering place.

With this philosophy in mind, many grassroots efforts such as The Project for Public Spaces are being started to create this "Third Place" in communities. They are taking form in independent bookstores, coffeehouses, local pubs and through many innovative means to create the social capital needed to foster the sense and spirit of community.

Community development is often formally conducted by universities or government agencies to improve the social well-being of local, regional and, sometimes, national communities. Less formal efforts, called community building or community organizing, seek to empower individuals and groups of people by providing them with the skills they need to effect change in their own communities. These skills often assist in building political power through the formation of large social groups working for a common agenda. Community development practitioners must understand both how to work with individuals and how to affect communities' positions within the context of larger social institutions.

Formal programs conducted by universities are often used to build a knowledge base to drive curricula in sociology and community studies. The General Social Survey from the National Opinion Research Center at the University of Chicago and the Saguaro Seminar at the John F. Kennedy School of Government at Harvard University are examples of national community development in the United States. In The United Kingdom, Oxford University has led in providing extensive research in the field through its Community Development Journal, used worldwide by sociologists and community development practitioners.

At the intersection between community development and community building are a number of programs and organizations with community development tools. One example of this is the program of the Asset Based Community Development Institute of Northwestern University. The institute makes available downloadable tools to assess community assets and make connections between non-profit groups and other organizations that can help in community building. The Institute focuses on helping communities develop by "mobilizing neighborhood assets"—building from the inside out rather than the outside in.

Community building and organizing: M. Scott Peck is of the view that the almost accidental sense of community which exists at times of crisis, for example in New York City after the attacks of Sep. 11, 2001, can be consciously built. Peck believes that the process of "conscious community building" is a process of building a shared story, and consensual decision making, built upon respect for all individuals and inclusivity of difference. He is of the belief that this process goes through four stages:

Pseudo-community: Where participants are "nice with each other", playing-safe, and presenting what they feel is the most favorable sides of their personalities. Chaos: When people move beyond the in authenticity of pseudo-community and feel safe enough to present their "shadow" selves. This stage places great demands upon the facilitator for greater leadership and organization, but Peck believes that "organizations are not communities", and this pressure should be resisted.

Emptying: This stage moves beyond the attempts to fix, heal and convert of the chaos stage, when all people become capable of acknowledging their own woundedness and brokenness, common to us all as human beings. Out of this emptying comes Authentic community: the process of deep respect and true listening for the needs of the other people in this community. This stage Peck believes can only be described as "glory" and reflects a deep yearning in every human soul for compassionate understanding from one's fellows.

More recently Scott Peck has remarked that building a sense of community is easy. It is maintaining this sense of community that is difficult in the modern world. The Ithaca Hour is an example of community-based currency. Community building can use a wide variety of practices, ranging from simple events such as potlucks and small book clubs to larger-scale efforts such as mass festivals and construction projects that involve local participants rather than outside contractors. Some communities have developed their own "Local Exchange Trading Systems" (LETS) and local currencies, such as the Ithaca Hours system, to encourage economic growth and an enhanced sense of community.

Community building that is geared toward activism is usually termed "community organizing." In these cases, organized community groups seek accountability from elected officials and increased direct representation within decision-making bodies. Where good-faith negotiations fail, these constituency-led organizations seek to pressure the decision-makers through a variety of means, including picketing, boycotting, sit-ins, petitioning, and electoral politics. The ARISE Detroit! coalition and the Toronto Public Space Committee are examples of activist networks committed to shielding local communities from government and corporate domination and inordinate influence.

Community organizing is sometimes focused on more than just resolving specific issues. Organizing often means building a widely accessible power structure, often with the end goal of distributing power equally throughout the community. Community organizers generally seek to build groups that are open and democratic in governance. Such groups facilitate and encourage consensus decision-making with a focus on the general health of the community rather than a specific interest group.

The three basic types of community organizing are grassroots organizing, coalition building, and faith-based community organizing (also called "institution-based community organizing," "broad-based community organizing" or "congregation-based community organizing").

Community service is usually performed in connection with a nonprofit organization, but it may also be undertaken under the auspices of government, one or more businesses, or by individuals. It is typically unpaid and voluntary. However, it can be part of alternative sentencing approaches in a justice system and it can be required by educational institutions.

The most common usage of the word "community" indicates a large group living in close proximity. Examples of local community include: A municipality is an administrative local area generally composed of a clearly defined territory and commonly referring to a town or village. Although large cities are also municipalities, they are often thought of as a collection of communities, due to their diversity.

A neighborhood is a geographically localized community, often within a larger city or suburb. A planned community is one that was designed from scratch and grew up more or less following the plan. Several of the world's capital cities are planned cities, notably Washington, D.C., in the United States, Canberra in Australia, and Brasilia in Brazil. It was also common during the European colonization of the Americas to build according to a plan either on fresh ground or on the ruins of earlier Amerindian cities. Identity: In some contexts, "community" indicates a group of people with a common identity other than location. Members often interact regularly. Common examples in everyday usage include: A "professional community" is a group of people with the same or related occupations. Some of those members may join a professional society, making a more defined and formalized group.

These are also sometimes known as communities of practice. A virtual community is a group of people primarily or initially communicating or interacting with each other by means of information technologies, typically over the Internet, rather than in person. These may be either communities of interest, practice or communion. (See below.) Research interest is evolving in the motivations for contributing to online communities.

Some communities share both location and other attributes. Members choose to live near each other because of one or more common interests. A retirement community is designated and at least usually designed for retirees and seniors—often restricted to those over a certain age, such as 55. It differs from a retirement home, which is a single building or small complex, by having a number of autonomous households.

An intentional community is a deliberate residential community with a much higher degree of social interaction than other communities. The members of an intentional community typically hold a common social, political or spiritual vision and share responsibilities and resources. Intentional communities include Amish villages, ashrams, cohousing, communes, ecovillages, housing cooperatives, kibbutzim, and land trusts.

Special nature of human community Music in Central Park, a public space. Definitions of community as "organisms inhabiting a common environment and interacting with one another," while scientifically accurate, do not convey the richness, diversity and complexity of human communities. Their classification, likewise is almost never precise. Untidy as it may be, community is vital for humans. M. Scott Peck expresses this in the following way: "There can be no vulnerability without risk; there can be no community without vulnerability; there can be no peace, and ultimately no life, without community." This conveys some of the distinctiveness of human community.

Embodiments described herein in FIGS. 1-11 govern a new kind of social network for neighborhoods, according to one embodiment (e.g., may be private and/or wiki-editable search engine based). It should be noted that in some embodiments, the address of an user may be masked from the public search (but still may be used for privacy considerations), according to one embodiment. Some embodiments have no preseeded data, whereas others might. Embodiments described herein may present rich, location specific information on individual residents and businesses.

A user can "Claim" one or more Business Pages and/or a Residential Pages, according to one embodiment. In order to secure their Claim, the user may verify their location associated with the Business Page and/or Residential page within 30 days, or the page becomes released to the community, according to one embodiment. A user can only have a maximum of 3 unverified Claims out at any given time, according to one embodiment. When a user clicks on "Claim this Page" on Business Profile page and/or a Residential Profile page, they can indicate the manner in which they intend to verify their claim, according to one embodiment. Benefits of Claiming a Business Page and/or Residential page may enable the user to mark their page 'Self-Editable only' from the default 'Fully Editable' status, and see "Private" listings in a claimed neighborhood around the verified location, according to one embodiment. Each edit by a user on a Residential Profile page and/or a Business Profile page may be made visible on the profile page, along with a date stamp, according to one embodiment.

Browse function: Based on the user's current location, the browse function may display a local map populated with pushpins for location-specific information, and a news feed, made up of business page edits, public people page edits, any recent broadcasts, etc., according to one embodiment. The news feed may show up on each Business Page and each Residential Page, based on activity in the surrounding area, according to one embodiment. Secure a Neighborhood function: May allow the user to identify and "secure" a neighborhood, restricting certain types of access to verified residents, according to one embodiment. Add a Pushpin function: May allow any registered or verified user to add any type of Pushpin (as described in FIG. 8), to one embodiment.

In addition to the map, the search results page may display a news feed, made up of business page edits, public people page edits, any recent broadcasts, and autogenerated alerts who has moved into the neighborhood, who has moved out of the neighborhood, any recent reviews in the neighborhood, any pushpins placed in the immediate area, etc., according to one embodiment. The news feed may prioritize entries relating to the search results, and will take into account privacy policies and preferences, according to one embodiment.

Example Newsfeeds may include:

Joe Smith moved into the neighborhood in September 2013. Welcome Joe! Like Share; 43 neighbors (hyperlink) moved in to the Cupertino library neighborhood in July 2013.

Like Share; 12 neighbors (hyperlink) verified in to the Cupertino library neighborhood in July 2013. Like Share; Raj Abhyanker invited Paul Smith, a guest to the Cupertino neighborhood. Raj indicates Paul is a friend from college looking to move into the neighborhood. Welcome Paul!; Raj Abhyanker posted a Nissan Leaf for rent $35 a day, in mountain view Rent now. Like Share This content may feed each Profile Page and helps to increase Search Engine value for content on the site, according to one embodiment. Alerts may be created and curated (prioritized, filtered) automatically and/or through crowdsourcing, to keep each page vibrant and actively updating on a regular basis (ideally once a day or more), according to one embodiment.

A Multi-Family Residence page will display a list of residents in the entire building, according to one embodiment. Clicking on any resident will display a Single Family Residence page corresponding to the individual living unit where that person resides, according to one embodiment.

For example, suppose that John Smith and Jane Smith live in apartment 12 of a large building. Their names are included in the list of residents. When a user clicks on either John Smith or Jane Smith, we will display a "Single Family Residence" page showing both John and Jane, just as if apartment 12 was a separate structure, according to one embodiment.

The broadcast feature (e.g., associated with the neighborhood broadcast data and generated by the Bezier curve algorithm 240 of the social community module 106) may be a "Radio" like function that uses the mobile device's current geospatial location to send out information to neighbors around the present geospatial location of the user, according to one embodiment. Broadcasts may be posted to neighbor pages in the geospatial vicinity (e.g., in the same neighborhood) on public and private pages in the geospatial social network, according to one embodiment. These broadcasts may enable any user, whether they live in a neighborhood or not to communicate their thoughts to those that live or work (or have claimed) a profile in the neighborhood around where the broadcaster is physically at, regardless of where the broadcaster lives, according to one embodiment. Broadcasts can be audio, video, pictures, and or text, according to one embodiment. For accountability, the broadcaster may be a verified user and their identity made public to all users who receive the broadcast in one embodiment.

This means that the broadcast feature may be restricted to be used only by devices (e.g., mobile phones) that have a GPS chip (or other geolocation device) that an identify a present location of where the broadcast is originating from, according to one embodiment. The broadcast may be sent to all users who have claimed a profile in the geo spatial vicinity where the broadcast originates, according to one embodiment. This can either be broadcast live to whoever is "tuned" in to a broadcast of video, audio, picture, and text in their neighborhood, or can be posted on each users profile if they do not hear the broadcast to the neighborhood in a live mode in one embodiment.

When a broadcast is made neighbors, around where the broadcast is made, they may receive a message that says something like:

Raj Abhyanker, a user in Menlo Park just broadcast "Japanese cultural program" video from the Cupertino Union church just now. Watch, Listen, View This broadcast may be shared with neighbors around Menlo park, and or in Cupertino. This way, Raj's neighbors and those in Cupertino can know what is happening in their neighborhoods, according to one embodiment. In one embodiment, the broadcast only goes to one area (Cupertino or Menlo park in the example above).

Broadcasts could be constrained to devices that have geospatial accuracy of present location and a current only (mobile devices for example). Otherwise, broadcasts won't mean much, according to one embodiment (would otherwise be just like thoughts/video upload without this). Broadcasts shouldn't be confused with 'upload videos', according to one embodiment. Different concepts. Why? Broadcasts have an accuracy of time and location that cannot be altered by a user, according to one embodiment, hence, mobile is the most likely medium for this not desktop computer, according to one embodiment. We should not let the user set their own location for broadcasts (like other pushpin types), according to one embodiment. Also time is fixed, according to one embodiment. Fixing and not making these two variables editable give users confidence that the broadcast was associated with a particular time and place, and creates a very unique feature, according to one embodiment. For example, it would be not useful if the broadcast is untrusted as to location of origination, according to one embodiment. E.g., I broadcast when I am somewhere only about the location I am at, according to one embodiment.

Broadcasts are different that other pushpins because location of where a broadcast, and time of broadcast is

*current location* and *current time*, according to one embodiment. They are initiated wherever a broadcaster is presently at, and added to the news feed in the broadcasters neighborhood and in the area wherever a broadcaster is presently at, according to one embodiment.

Broadcast rules may include:

1. If I post a Broadcast in my secured neighborhood, only my neighbors can see it, according to one embodiment.

2. If I post a Broadcast in different secured neighborhood then my own, my neighbors can see it (e.g., unless I turn this off in my privacy setting) and neighbors in the secured neighborhood can see it (e.g., default not turn-offable, but I can delete my broadcast), according to one embodiment.

3. If I post a Broadcast in different unsecured neighborhood then my own, my neighbors can see it (unless I turn this off in my privacy setting) and the broadcast is publicly visible on user pages of public user profiles in the unsecured neighborhood until profiles are claimed and/or the neighborhood is secured, according to one embodiment.

4. If an outsider in a secure neighborhood posts a broadcast in my secure neighborhood, it's not public, according to one embodiment.

5. If an outsider in a unsecure neighborhood posts a broadcast in my secure neighborhood, the system does not post on profiles in his unsecure neighborhood (to prevent stalking, burglary), but does post in my secure neighborhood, according to one embodiment.

Privacy settings. For each verified residential or business location, the user may set Privacy to Default, Public, Private, or Inactive, according to one embodiment. The Default setting (which is the default) means that the profile will be public, until the neighborhood is secured; in a secured neighborhood, the profile will be Private, according to one embodiment. By changing this setting, the user may force the profile to be Public or Private, regardless of whether the neighborhood is secured, according to one embodiment.

For each verified residential location, the user may set edit access to Group Editable or Self Editable, according to one embodiment.

Residential Privacy example. The residential profiles can be: Public: anyone can search, browse, or view the user profile, according to one embodiment. This is the default setting for unsecured neighborhoods (initially, all the content on the site), according to one embodiment. Private: only people in my neighborhood can search, browse, or view the user's profile, according to one embodiment. This is the default for secured neighborhoods, according to one embodiment. Inactive: nobody can search, browse, or view the profile, even within a secured neighborhood, according to one embodiment. A user may have at least one active (public or private), verified profile in order to have edit capabilities, according to one embodiment; if the user makes all profiles inactive, that user is treated (for edit purposes) as an unverified user, according to one embodiment.

Verified users can edit the privacy setting for their profile and override the default, according to one embodiment. Group Editable: anyone with access to a profile based on the privacy roles above can edit the profile, according to one embodiment. This is the default setting, according to one embodiment Self Editable, only the verified owner of a profile can edit that profile, according to one embodiment.

Exceptions Guest User. A verified user in another neighborhood is given "Guest" access to a neighborhood for a maximum of 60 days by a verified user in the neighborhood in which the guest access is given, according to one embodiment. In effect, the guest becomes a member of the neighborhood for a limited period, according to one embodiment. Friend. When a user has self-elected being friends with someone in a different neighborhood, they can view each other's profiles only (not their neighbors), according to one embodiment. One way for a user to verify a location is to submit a scanned utility bill, according to one embodiment.

When a moderator selects the Verify Utility Bills function, the screen will display a list of items for processing, according to one embodiment. Accept the utility bill as a means of verification, according to one embodiment. This will verify the user's location, and will also generate an e-mail to the user, according to one embodiment. Or Decline the utility bill as a means of verification, according to one embodiment. There will be a drop-down list to allow the moderator to select a reason, according to one embodiment; this reason will be included in an e-mail message to the user. Reasons may include: Name does not match, address does not match, name/address can't be read, not a valid utility bill, according to one embodiment.

In one embodiment, a method includes associating a verified registered user (e.g., a verified registered user 1310 of FIG. 13A-B, a verified registered user 1310 of FIG. 16) with a user profile, associating the user profile (e.g., the user profile 1200 of FIG. 12A) with a specific geographic location, generating a map (e.g., a map 1701 of FIG. 17) concurrently displaying the user profile and/or the specific geographic location and simultaneously generating, in the map (e.g., the map 1701 of FIG. 17), claimable profiles (e.g., a claimable profile 1206 of FIG. 12A-12B, a claimable profile 1302 of FIG. 13A, a claimable profile 1704 of FIG. 17) associated with different geographic locations surrounding the specific geographic location associated with the user profile (e.g., the user profile 1200 of FIG. 12A).

In another embodiment, a system includes a plurality of neighborhoods (e.g., the neighborhood(s) 102A-N of FIG. 1) having registered users and/or unregistered users of a global neighborhood environment (e.g., a privacy server 100 of FIG. 1), a social community module (e.g., a social community module 106 of FIG. 1, a social community module 106 of FIG. 2) of the global neighborhood environment (e.g., the privacy server 100 of FIG. 1) to generate a building creator (e.g., through building builder 200 of FIG. 2) in which the registered users may create and/or modify empty claimable profiles (e.g., the claimable profile 1206 of FIG. 12A-12B, the claimable profile 1302 of FIG. 13A, the claimable profile 1704 of FIG. 17), building layouts, social network pages, and/or floor levels structures housing residents and businesses in the neighborhood (e.g., the neighborhood 100 of FIG. 1), a claimable module (e.g., a claimable module 110 of FIG. 1, a claimable module 110 of FIG. 4) of the global neighborhood environment (e.g., the privacy server 100 of FIG. 1) to enable the registered users to create a social network page of themselves, and/or to edit information associated with the unregistered users identifiable through a viewing of physical properties in which the unregistered users reside when the registered users have knowledge of characteristics associated with the unregistered users.

In addition, the system may include search module (e.g., a search module 108 of FIG. 1, a search module 108 of FIG. 3) of the global neighborhood environment (e.g., the privacy server 100 of FIG. 1) to enable a people search (e.g., information stored in people database 216 of FIG. 2), a business search (e.g., information stored in business database 220 of FIG. 2), and a category search of any data in the social community module (a social community module 106 of FIG. 1, a social community module 106 of FIG. 2) and/or to enable embedding of any content in the global neighborhood environment (e.g., the privacy server 100 of FIG. 1) in other search engines, blogs, social networks, professional networks and/or static websites, a commerce module (e.g., a commerce module 112 of FIG. 1, a commerce module 112 of FIG. 5) of the global neighborhood environment (e.g., the privacy server 100 of FIG. 1).

The system may also provide an advertisement system to a business (e.g., through business display advertisement module 502 of FIG. 5) who purchase their location in the global neighborhood environment (e.g., the privacy server 100 of FIG. 1) in which the advertisement is viewable concurrently with a map indicating a location of the business, and in which revenue is attributed to the global neighborhood environment (e.g., the privacy server 100 of FIG. 1) when the registered users and/or the unregistered users click-in on a simultaneously displayed data of the advertisement along with the map indicating a location of the business, a map module (a map module 114 of FIG. 1) of the global neighborhood environment (e.g., the privacy server 100 of FIG. 1) to include a map data associated with a satellite data which serves as a basis of rendering the map in the global neighborhood environment (e.g., the privacy server 100 of FIG. 1) and/or which includes a simplified map generator (e.g., simplified map generator module 602 of FIG. 6) which can transform the map to a fewer color and location complex form using a parcel data which identifies at least some residence, civic, and/or business locations in the satellite data.

In yet another embodiment, a global neighborhood environment (e.g., a privacy server 100 of FIG. 1) includes a first instruction set to enable a social network to reside above a map data, in which the social network may be associated with specific geographical locations identifiable in the map data, a second instruction set integrated with the first instruction set to enable the users (e.g., the user 116 of FIG. 1) of the social network to create profiles of other people through a forum which provides a free form of expression of the users sharing information about any entities and/or people residing in any geographical location identifiable in the satellite map data, and/or to provide a technique of each of the users (e.g., the user 116 of FIG. 1) to claim a geographic location (a geographic location 1204 of FIG. 12A) to control content in their respective claimed geographic locations and a third instruction set integrated with the first instruction set and/or the second instruction set to enable searching of people in the global neighborhood environment (e.g., the privacy server 100 of FIG. 1) by indexing each of the data shared by the users (e.g., the user 116 of FIG. 1) of any of the people and entities residing in any geographic location (a geographic location 1204 of FIG. 12A).

An example embodiment will now be described. A person confronted with an emergency situation (e.g. the user 116, the verified user 706) may send a broadcast on a geospatially constrained social network (e.g. Fatdoor.com, Nextdoor. com). To accomplish this broadcast the person may generate the broadcast data 102 which will be sent to the privacy server 100 to generate the notification data 112. The notification data 112 may include any information contained in the broadcast data 102 such as the geospatial location, time, date, a textual description and live broadcast of audio and/or video generated by the user 116. The notification data 112 may then be radially distributed in the area with a threshold radial distance of the epicenter that may be the location of the device observing the emergency. The person may be hoping for immediate assistance from other people living nearby (e.g. the recipients (e.g., other users of the neighborhood communication system 150 such as neighbors 128 of FIG. 1)) to help confront the emergency situation. Rather than attempt to contact those living nearby individually, the person experiencing the emergency may broadcast the notification 112 to proximate neighbors simultaneously, maximizing the chance that a relevant person will appreciate, view and/or respond to the broadcast.

Additionally, for example, the broadcast may even occur automatically upon the dialing of neighborhood services as to allow concurrent notification of nearby recipients (e.g., other users of the neighborhood communication system 150 such as neighbors 128 of FIG. 1) without detracting from a conventional mode of contacting emergency services (e.g. the emergency call 1200). The emergency call 1200 may be monitored by the privacy server 100 to automatically generate the neighborhood broadcast data, including live audio of the call which the privacy server 100 may use to create a transcript 1204. The transcript 1204, along with metadata from the call that may include the geospatial location of the mobile device on which the call was made may then be broadcast according to the social community module 106 to nearby recipients (e.g., other users of the neighborhood communication system 150 such as neighbors 128 of FIG. 1). The recipients (e.g., other users of the neighborhood communication system 150 such as neighbors 128 of FIG. 1) may then be notified of the emergency situation and/or prompted to respond without detracting from a call to the neighborhood services.

For example, in an elementary school setting (e.g., the threshold radial distance may be set to a boundaries of the elementary school using the Bezier curve algorithm 240 of the social community module 106). A principal of the Sacred Brooks Elementary School Mr. Higgins may hear gunshots that he believes are coming from an on-campus location. Screams of panicked teachers and children may soon follow. Mr. Higgins may use his mobile device (e.g., his cellular phone) to call an emergency number '911'. Calling this emergency number '911' may also trigger an automatic alert to the privacy server 100 to generate the neighborhood broadcast data (or alternatively Mr. Higgins may separately send an emergency broadcast (e.g., a neighborhood broadcast using the Bezier curve algorithm 240 of the social community module 106) using the Fatdoor mobile application). All teachers at the school and parents in adjacent neighborhoods may be instantly notified (e.g., through the creation of the neighborhood broadcast data distributed as the notification data 112).

Wilson Brighton at the Fatdoor Emergency Center may receive a message that there is an emergency at the Sacred Brooks Elementary school. Wilson Brighton may open up a communication channel with Mr. Brighton and invite adjacent neighborhoods and medical professionals having claimed profiles and/or living in the area to help. In addition, Wilson may merge the emergency transmissions into a single session so that Mr. Higgins initial emergency broadcast (e.g., a neighborhood broadcast using the Bezier curve algorithm 240 of the social community module 106) is automatically merged with related other broadcasts by teachers, parents, staff, and children at the school. This single thread of broadcasts related to the Sacred Brooks Elementary school may be provided as live-feed emergency broadcast (e.g., a neighborhood broadcast using the Bezier curve algorithm 240 of the social community module 106)s to all users of Fatdoor.com having a claimed profile (e.g., a home address and/or a work address) within the threshold radial distance from Mr. Higgins (e.g., the epicenter of the broadcast). Even when parents are at work, they may still receive the broadcast live on their mobile devices because they have downloaded the Fatdoor application and have claimed their home/business address around a location of the emergency.

As a result, local neighborhood parents may arrive from their work locations, even when they work at a different location than where they live. This may save lives at the Sacred Brooks elementary school because help may arrive sooner.

For example, one recipient of Mr. Higgin's broadcast may be Samuel Wilson ("Sam"), who has two children at Sacred Brooks Elementary School: John, a bright kindergartener 6, and Samantha, a talented artist of age 10. Sam may be alerted even when he is at work on a construction site 6 miles away from the Sacred Brooks Elementary School where John and Samatha are located. Sam may receive an alert on his mobile phone that there is an emergency in his neighborhood. Jumping into his truck, Sam may drive to the school to render assistance, tuning in to the live broadcast as events unfold. Others may join in and as well and communicate and provide instructions and reassurance to Mr. Higgins and other broadcasters.

Nearby resident Chen Su, whose backyard fence adjoins the playground of Sacred Brooks, may also receive the broadcast. Chen may run outside and unlock his gate, opening it so that children may not be trapped in the playground area. Chen may then send a separate broadcast a new escape route has been established. Mr. Higgins may gather as many nearby children as he can and lead them safety through Chen's gate.

Henry Stewart, a decorated army veteran who lives a few blocks away from Sacred Brooks Elementary, may also receive the broadcast. Alarmed for the safety of the children, and knowing that it may take the police several minutes to arrive at the school, Henry may decide that it will maximize the children chance at survival if he is the first responder. Equipping his .22 caliber rifle, he may run to the school and distract or defeat the shooter in time to save many lives.

Similarly, Dr. Juan Sanchez, M.D. may have an office in the neighborhood immediately adjacent to Sacred Brooks. Dr. Sanchez and his team of medical professionals may rush to the scene, engaging in bi-directional communications with the school staff during the live broadcast event so that he knows exactly which building to arrive at. Calming victims and putting pressure on wounds until ambulances arrive, Dr. Sanchez and his team may save the lives of wounded children.

When the incident is over, many people may want to recreate the events for journalistic or evidentiary purposes. They may also want to study generally the flow of information during emergencies in their neighborhood, and decide how their school could better prepare. Similarly, they may want to ensure they are part of the broadcast system in cast there are future incidents. Persons who have not yet claimed their verified profiles in the area surrounding Sacred Brooks Elementary School on Fatdoor may go online and find profiles pre-seeded with data associated with their address. Those pre-seeded profiles may have been updated with local broadcasts. These people may be able to claim their profile and have access to previous broadcasts, including those associated with the school shootings. This may help them to better prepare for the safety of their children.

Because of the technologies described herein, the neighborhood, city, and country is a better place because emergency response teams are supplemented with information from those who have a claimed geo-spatial location around a neighborhood in which there is trouble. In addition, evidence may be formed that is admissible to prove guilt of the gunmen, defeat a defense of insanity, or impose a maximum sentence.

In another example, a user Bob Jones may be walking around Menlo Park, Calif. when he observes a robber pull out a knife and threaten to harm Paula Nelson in a parking lot if she does not give the robber her car keys. Bob may take out his mobile device and select the emergency listing criteria "major violent crime" in the user interface of the mobile application that communicates with the emergency response server. Bob may center his viewfinder on the unfolding robbery and select the "broadcast live" indicator on the user interface, as well as entering the brief description "Car jacking in progress" in a small data field. The broadcast data, including live video and audio, may be generated and sent to the emergency response server where it may be radially distributed to user profiles at a threshold radial distance from the epicenter centered on Bob's mobile device. Because Bob specified the emergency as a "major violent crime" its threshold radial distance may be larger than if Bob had selected mere "vandalism."

To further illustrate, several relevant parties may receive the broadcast. Patrick Sloan, an off-duty police detective, is alerted to Bob Jones' broadcast data by a notification sent to his mobile device. Patrick, looks his mobile device to read Bob's brief description, and notices that the event is only "0.3 miles away." Patrick selects the "respond indicator" to let Bob know he is on his way, and also selects "dial broadcaster" to establish a bi-directional communication with Bob. A map on Patrick's mobile device and a set of directions may show Patrick the fastest way to travel to the epicenter, along with warning Patrick when he is within 100 yards of the emergency.

Jason Steinbrenner, a retired surgeon, also receives Bob's broadcast. Jason opts to view Bob's live video feed. Jason notices that the robber severely lacerates Paula with his knife as he grabs Paula's keys away. Jason sees that he is only 0.7 miles away from the emergency and also selects the "respond indicator" to let Bob know he will arrive shortly. Through his user interface he sends Bob a text message "I'm a doctor."

Jane Doe, a resident living within the threshold radial distance also receives Bob's broadcast. Jane, while viewing Bob's live feed, takes note of the vehicle make, model and color. As the robber gets in Paula's car and drives away, out of Bob's view, Jane goes to her apartment window and looks outside. A minute later, Jane sees the woman's car, driven by the robber, headed down her street, trying to keep a low profile. Jane generates her own broadcast including a video feed of the car stopped at a stoplight. Patrick Sloan, driving his car to reach Bob's location, receives Jane's broadcast. Patrick, now using Jane's epicenter, redirects his path to intercept the robber. Using Jane's live video broadcast to remotely view the intersection, Patrick is able to safely approach the robber from behind and surprise him at the stoplight, capturing him.

Emergency services, which may subscribe to all emergency broadcast (e.g., a neighborhood broadcast using the Bezier curve algorithm 240 of the social community module 106)s within the threshold radial distance of the epicenter, may also have been notified. The police department and an ambulance arrive after Patrick catches the robber and Jason stabilizes the woman.

Bob and Jane may receive a summary of their broadcast data that shows them how many recipients received his broadcast, the emergency services contacted, and who was responding. Their broadcast submissions may also include a unique identifies such that the live video, recorded by the emergency response server, which may be later retrieved to provide evidence against the robber with a unique identification code.

Because of the emergency response sever described in FIGS. 1-11, Jason was able to arrive on the scene faster than emergency services, putting pressure on Paula's wound to prevent detrimental bleeding. The broadcast system also allowed Patrick to catch the perpetrator both because he was a concerned local resident and because other nearby residents, such as Jane, were alerted by Bob's original broadcast and were therefore prepared to provide additional helpful broadcasts.

Bob and Jane may live in the Lorelei neighborhood of Menlo Park, and for this reason receive the emergency broadcast data (e.g., a neighborhood broadcast generated by the social community module 106). If Bob creates an emergency broadcast, Bob may choose to restrict dissemination of his emergency broadcast just to the Lorelei neighborhood because it is an 'active' neighborhood around where Bob lives. Particularly, a minimum number of Bob's neighbors in the Lorelei neighborhood, such as 10 neighbors in the Lorelei neighborhood, may have signed up and verified their profiles through an online neighborhood social network (e.g., Fatdoor.com). If Bob is the first user that creates a private network for his neighborhood (e.g., a 'founding member'), he may need to draw geospatial boundaries and/or claim geospatial boundaries around his neighborhood and invite a threshold number of neighbors (e.g., 10 neighbors) to activate it. An amount of time for Bob to invite and activate his neighborhood may be limited (e.g., 21 days). However, Bob may request an extension of time from the privacy server 100 if Bob needs more time to invite users, and the privacy server 100 may grant this extra time. In other words, if Bob is a founding member, he may have the ability to define the neighborhood boundary and choose the neighborhood name.

The privacy server 100 may internally make corrections to either the boundaries or name that Bob set based on feedback from other neighbors and/or based on internal policies. These internal policies may include a preference for a use of official names for a community (e.g., based on local thoroughfares, a nearby park, or landmark for inspiration), a neighborhood name that is short and sweet (e.g., eliminating unnecessary words like city, state, neighbors, neighborhood, HOA, friends, etc.), with correct capitalization (e.g., to ensure that a first letter of each word is capitalized), and/or use of spaces between each word in a neighborhood name. In one embodiment, Bob may designate neighborhood 'leads' who can adjust boundaries of their neighborhood through an adjust boundaries tool. Bob may be part of an elite group of neighborhood 'leads' who keep the privacy server 100 operating smoothly by organizing information and posting neighborhood-wide information. The neighborhood leads like Bob may have special privileges such as removing inappropriate messages, adjusting neighborhood boundaries, verifying unverified members, editing the about section on a neighborhood feed, and/or promoting other members to become neighborhood leads.

Bob and his neighbors may have each verified their addresses through a postcard verification system in which they received a postcard at their home with an access code that permits each of them to access their private Lorelei neighborhood community information including emergency broadcast alerts in the online neighborhood social network (e.g., the Fatmail postcard system through which an access code may have been received at a respective Lorelei home that uniquely identifies and verifies a home in the Lorelei neighborhood). Bob may have invited a threshold number (e.g., 10) of his Lorelei neighbors prior to the Lorelei neighborhood becoming active. Bob may choose to disseminate his emergency broadcast data to a neighborhood adjacent to Lorelei, such as Menlo Park downtown (e.g., using the Bezier curve algorithm 240 of the social community module 106). Optionally, Bob may choose to restrict his emergency broadcast data just to Lorelei neighbors (e.g., using the Bezier curve algorithm 240 of the social community module 106). In other words, users of the neighborhood social network in an entirely different neighborhood, such as the Financial District neighborhood of San Francisco (about 20 miles away) may not be able to access the emergency broadcast data that Bob generates.

For example, the emergency broadcast data may be disseminated to adjacent neighborhoods that have been claimed by different users in a manner such that the emergency broadcast data is optionally disseminated to the surrounding claimed neighborhoods based on Bob's preference.

It will be understood with those skill in the art that in some embodiments, the social community module 106 may restrict dissemination of broadcast data by verified users to claimed neighborhoods in a private neighborhood social network (e.g. the privacy server 100 may be a private social network, the neighborhood curation system described herein may also be part of the private neighborhood social network) in which the broadcaster resides (e.g., has a home) using the radial algorithm (e.g., the Bezier curve algorithm 240 of FIG. 2). The privacy server 100 may include online communities designed to easily create private websites to facilitate communication among neighbors and build stronger neighborhoods (e.g., to help neighbors build stronger and safer neighborhoods).

Further, it follows that the threshold radial distance generated through the Bezier curve algorithm 240 of FIG. 2 may take on a variety of shapes other than purely circular and is defined to encompass a variety of shapes based on associated geographic, historical, political and/or cultural connotations of associated boundaries of neighborhoods and/or as defined by a city, municipality, government, and/or data provider (e.g., Maponics®, Urban Mapping®), in one embodiment. For example, the threshold radial distance may be based on a particular context, such as a school boundary, a neighborhood boundary, a college campus boundary, a subdivision boundary, a parcel boundary, and/or a zip code boundary. In an alternate embodiment, a first claiming user 116 in a particular neighborhood may draw a polygon to indicate a preferred boundary.

In an alternative embodiment, the threshold radial distance generated using the Bezier curve algorithm 240 by the privacy server 100 may be restricted to a shared apartment building (e.g., and/or an office building). In addition, it will be understood with those skilled in the art that the privacy server 100 may be operate as a function of the privacy server 100 (e.g., a neighborhood social network).

In addition, it will be understood that in some embodiments, the neighborhood broadcast data is generated by the police department (e.g., and/or others of the neighborhood services) in the form of crime alerts, health alerts, fire alerts, and other emergency alerts and provided as a feed (e.g., a Real Simple Syndication (RSS) feed) to the privacy server 100 for distribution to relevant ones of the claimed neighborhoods in the privacy server 100. It will be understood that the neighborhood broadcast data may appear in a 'feed' provided to users of the privacy server 100 (e.g., a private social network for neighbors) on their profile pages based on access control privileges set by the social community module using the Bezier curve algorithm 240. For example, access to the neighborhood broadcast data may be limited to just a claimed neighborhood (e.g., as defined by neighborhood boundaries) and/or optionally adjacent neighborhoods.

In one embodiment, the privacy server 100 may provide police departments and other municipal agencies with a separate login in which they can invite neighbors themselves, provide for a virtual neighborhood watch and emergency preparedness groups, and conduct high value crime and safety related discussions from local police and fire officials without requiring any technical integration. This may provide police departments and municipalities with a single channel to easily broadcast information across neighborhoods that they manage, and receive and track neighborhood level membership and activity to identify leaders of a neighborhood.

For example, communications defined from one broadcasting user to an adjacent neighborhood o may involve sharing information about a suspicious activity that might affect several neighborhoods, explaining about a lost pet that might have wandered into an adjoining neighborhood, to rally support from neighbors from multiple neighborhoods to address civic issues, to spread the word about events like local theater production or neighborhood garage sales, and/or to ask for advice or recommendations from the widest range of people in a community). In one embodiment, the privacy server 100 may prevent self-promotional messages that are inappropriate (e.g., a user sending such messages may be suspended from the geospatially constrained social network using the crowd sourced moderation algorithm 204. In one embodiment, the user 116 may personalize nearby neighborhoods so that the user can choose exactly which nearby neighborhoods (if any) they wish to communicate with. The user 116 may be able to flag a neighborhood feeds from adjacent neighborhoods. In addition, leaders from a particular neighborhood may be able to communicate privately with leaders of an adjoining neighborhood to plan and organize on behalf of an entire constituency. Similarly, users 106 may be able to filter feeds to only display messages from the neighborhood that they reside in. The user 116 may be able to restrict posts (e.g., pushpin placements) only in the neighborhood they are presently in. In one embodiment, nearby neighbors may (or may not) be able to access profiles of adjacent neighborhoods.

It will also be understood that in some embodiments, that users may be 'verified' through alternate means, for example through a utility bill verification (e.g., to verify that a user's address on a utility bill matches the residential address they seek to claim), a credit card verification (e.g., or debit card verification), a phone number verification (e.g., reverse phone number lookup), a privately-published access code (e.g., distributed to a neighborhood association president, and/or distributed at a neighborhood gathering), and a neighbor vouching method (e.g., in which an existing verified neighbor 'vouches' for a new neighbor as being someone that they personally know to be living in a neighborhood.

In one embodiment, the privacy server 100 ensures a secure and trusted environment for a neighborhood website by requiring all members to verify their address. In this embodiment, verification may provide assurance the assurance that new members are indeed residing at the address they provided when registering for an account in the privacy server 100. Once a neighborhood has launched out of pilot status, only members who have verified their address may be able access to their neighborhood website content.

It will be understood that among the various ways of verifying an address, a user of the privacy server 100 may uses the following methods to verify the address of every member:

A. Postcard. The privacy server 100 can send a postcard to the address listed on an account of the user 116 with a unique code printed on it (e.g., using the Fatmail postcard campaign). The code may allow the user 116 to log in and verify their account.

B. Credit or Debit Card. The privacy server 100 may be able to verify a home address through a credit or debit card billing address. In one embodiment, billing address may be confirmed without storing personally identifiable information and/or charging a credit card.

C. Home Phone. If a user 116 has a landline phone, the user may receive an automated phone call from the privacy server 100 that may provide with a unique code to verify an account of the user 116.

D. Neighborhood Leader. A neighborhood leader of the geo-spatially constrained social network can use a verify neighbors feature of the privacy server 100 to vouch for and verify neighbors.

E. Mobile Phone. A user 116 may receive a call to a mobile phone associated with the user 116 to verify their account.

F. Neighbor Invitations. A neighbor who is a verified member of the privacy server 100 can vouch for, and may invite another neighbor to join the privacy server 100. Accepting such an invitation may allow the user 116 to join the privacy server 100 as a verified member, according to one embodiment.

H. Social Security Number (SSN). The privacy server 100 can verify a home address when the user 116 provides the last 4 digits of a SSN (e.g., not stored by the privacy server 100 for privacy reasons).

It will be also understood that in a preferred embodiment neighborhood boundaries are defined by the social community module 106 using the Bezier curve algorithm 240 of FIG. 2 may be constrained to work in neighborhoods having a threshold number of homes (e.g., 10 homes, alternatively 100 homes in a neighborhood) and more (e.g., up to thousands of homes) as this may be needed to reach the critical mass of active posters that is needed to help the privacy server 100 succeed. In one embodiment, 'groups' may be creatable in smaller neighborhoods having fewer than the threshold number of homes for communications in micro-communities within a claimed neighborhood.

It will also be appreciated that in some embodiments, a mobile device (e.g., the device 1806, the device 1808 of FIG. 18) may be a desktop computer, a laptop computer, and/or a non-transitory broadcasting module. In addition, it will be understood that the prepopulated data (e.g., preseeded data) described herein may not be created through data licensed from others, but rather may be user generated content of organically created profiles in the geo-spatial social network created by different users who have each verified their profiles.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

For example, the social community module 106, the search module 108, the claimable module 110, the commerce module 112, the map module 114, the building builder module 200, the $N^{th}$ degree module, the tagging module 204, the verify module 206, the groups generator module 208, the pushpin module 210, the profile module 212, the announce module 214, the friend finder module 222, the neighbor-neighbor help module 224, the business search module 302, the communicate module 306, the directory assistance module 308, the embedding module 310, the no-match module 312, the range selector module 314, the user-place claimable module, the user-user claimable module 402, the user—neighbor claimable module 404, the user-business claimable module 406, the reviews module 408, the defamation prevention module 410, the claimable social network conversion module 412, the claim module 414, the data segment module 416, the dispute resolution module 418, the resident announce payment module 500, the business display advertisement module 502, the geo-position advertisement ranking module 504, the content syndication module 506, the text advertisement module 508, the community market place module 510, the click-in tracking module 512, the satellite data module 600, the cartoon map converter module 604, the profile pointer module 606, the parcel module 608 and the occupant module 610 of FIGS. 1-28 may be embodied through the social community circuit, the search circuit, the claimable circuit, the commerce circuit, the map circuit, the building builder circuit, the $N^{th}$ degree circuit, the tagging circuit, the verify circuit, the groups circuit, the pushpin circuit, the profile circuit, the announce circuit, the friends finder circuit, the neighbor-neighbor help circuit, the business search circuit, the communicate circuit, the embedding circuit, the no-match circuit, the range selector circuit, the user-place claimable circuit, the user-user claimable circuit, the user-neighbor claimable circuit, the user-business circuit, the reviews circuit, the defamation prevention circuit, the claimable social network conversion circuit, the claim circuit, the data segment circuit, the dispute resolution circuit, the resident announce payment circuit, the business display advertisement circuit, the geo-position advertisement ranking circuit, the content syndication circuit, the text advertisement circuit, the community market place circuit, the click-in tracking circuit, the satellite data circuit, the cartoon map converter circuit, the profile pointer circuit, the parcel circuit, the occupant circuit using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A neighborhood communication system comprising:
a privacy server to verify that each user lives at a residence associated with a claimable residential address of the online community formed through a social community module of the privacy server using a processor and a memory;
a network; and
a mapping server communicatively coupled with the privacy server through the network to generate a latitudinal data and a longitudinal data associated with each claimable residential address of the online community associated with each user of the online community,
wherein the privacy server to automatically determine a set of access privileges in the online community associated with each user of the online community by constraining access in the online community based on a neighborhood boundary determined using a Bezier curve algorithm of the privacy server,
wherein the privacy server to optionally extend the threshold radial distance to an adjacent boundary of an adjacent neighborhood based a request of the particular user,
wherein the privacy server to generate a separate login to the online community designed to be usable by at least one of a police department, a municipal agency, a neighborhood association, and a neighborhood leader associated with the particular neighborhood,
wherein the separate login to permit at least one of the police department, the municipal agency, the neighborhood association, and the neighborhood leader to:
invite residents of the particular neighborhood themselves using the privacy server using a self-authenticating access code that permits new users that enter the self-authenticating access code in the online community to automatically join the particular neighborhood as verified users,
generate at least one of a virtual neighborhood watch group and an emergency preparedness group restricted to users verified in the particular neighborhood using the privacy server,
conduct high value crime and safety related discussions from local police and fire officials that is restricted to users verified in the particular neighborhood using the privacy server,
broadcast information across the particular neighborhood, and
receive and track neighborhood level membership and activity to identify leaders from the restricted group of users verified in the particular neighborhood using the privacy server.

2. The neighborhood communication system of claim 1:
wherein the privacy server to transform the claimable residential address into a claimed address upon an occurrence of an event,
wherein the privacy server to instantiate the event when a particular user is associated with the claimable residential address based on a verification of the particular user as living at a particular residential address associated with the claimable residential address using the privacy server,
wherein the privacy server to constrain the particular user to communicate through the online community only with a set of neighbors having verified addresses using the privacy server,
wherein the privacy server to define the set of neighbors as other users of the online community that have each verified their addresses in the online community using the privacy server and which have each claimed residential addresses that are in a threshold radial distance from the claimed address of the particular user; and
wherein the privacy server to apply an address verification algorithm associated with each user of the online community.

3. The neighborhood communication system of claim 2:
wherein the privacy server to constrain the threshold radial distance to be less than a distance of the neighborhood boundary using the Bezier curve algorithm,
wherein the privacy server to permit the neighborhood boundary to take on a variety of shapes based on at least one of an associated geographic connotation, a historical connotation, a political connotation, and a cultural connotation of neighborhood boundaries, and
wherein the privacy server to apply a database of constraints associated with neighborhood boundaries that are imposed on a map view of the online community when permitting the neighborhood boundary to take on the variety of shapes.

4. The neighborhood communication system of claim 3:
wherein the privacy server to generate a user-generated boundary in a form of a polygon describing geospatial boundaries defining the particular neighborhood when a first user of a particular neighborhood that verifies a first residential address of the particular neighborhood using the privacy server prior to other users in that particular neighborhood verifying their addresses in that particular neighborhood places a set of points defining the particular neighborhood using a set of drawing tools in the map view of the online community.

5. The neighborhood communication system of claim 4:
wherein the privacy server to permit each of the restricted group of users verified in the particular neighborhood using the privacy server to:
share information about a suspicious activity that is likely to affect several neighborhoods,
explain about a lost pet that might have wandered into an adjoining neighborhood,
rally support from neighbors from multiple neighborhoods to address civic issues,
spread information about events comprising a local theater production and a neighborhood garage sale, and
solicit advice and recommendations from the restricted group of users verified in the particular neighborhood and optionally in the adjacent neighborhood.

6. The neighborhood communication system of claim 5:
wherein the privacy server to flag a neighborhood feed from the particular neighborhood and optionally from the adjacent neighborhood as being inappropriate, and
wherein the privacy server to suspend users that repeatedly communicate self-promotional messages that are inappropriate as voted based on a sensibility of any one of the verified users of the particular neighborhood and optionally from the adjacent neighborhood.

7. The neighborhood communication system of claim 6:
wherein the privacy server to personalize which nearby neighborhoods that verified users are able to communicate through based on a request of the particular user, and
wherein the privacy server to permit the neighborhood leader to communicate privately with leaders of an adjoining neighborhood to plan and organize on behalf of an entire constituency of verified users of the particular neighborhood associated with the neighborhood leader.

8. The neighborhood communication system of claim 7:
wherein the privacy server to filter feeds to only display messages from the particular neighborhood associated with each verified user, and
wherein the privacy server to restrict posts only in the particular neighborhood to verified users having verified addresses within the neighborhood boundary.

9. The neighborhood communication system of claim 8 wherein the address verification algorithm of the privacy server utilizes a set of verification methods to perform verification of the particular user through any of a:
a postcard verification method through which the privacy server generates a physical postcard that is postal mailed to addresses of requesting users in the particular neighborhood and having a unique alphanumeric sequence in a form of an access code printed thereon which authenticates users that enter the access code to view and search privileges in the particular neighborhood of the online community,
a credit card verification method through which the privacy server verifies the claimable residential address when at least one a credit card billing address and a debit card billing address is matched with an inputted address through an authentication services provider,
a privately-published access code method through which the privacy server communicates to user profiles of at least one of the police department, the municipal agency, the neighborhood association, and the neighborhood leader an instant access code that is printable at town hall meetings and gatherings sponsored by any one of the police department, the municipal agency, the neighborhood association, and the neighborhood leader,
a neighbor vouching method through which the privacy server authenticates new users when existing verified users agree to a candidacy of new users in the particular neighborhood,
a phone verification method through which the privacy server authenticates new users whose phone number is matched with an inputted phone number through the authentication services provider, and
a social security verification method through which the privacy server authenticates new users whose social security number is matched with an inputted social security number through the authentication services provider.

10. The neighborhood communication system of claim 9:
wherein the privacy server to initially set the particular neighborhood to a pilot phase status in which the online community of the particular neighborhood is provisionally defined until a minimum number of users verify their residential addresses in the particular neighborhood through the privacy server, and
wherein the privacy server to automatically delete profiles of users that remain unverified after a threshold window of time.

11. The neighborhood communication system of claim 10 wherein the neighborhood communication system is designed to create private websites to facilitate communication among neighbors and build stronger neighborhoods.

12. A method of a neighborhood communication system comprising:
verifying that each user lives at a residence associated with a claimable residential address of the online community formed through a social community module of the privacy server using a processor and a memory;
generating a latitudinal data and a longitudinal data associated with each claimable residential address of the online community associated with each user of the online community;
determining a set of access privileges in the online community associated with each user of the online community by constraining access in the online community based on a neighborhood boundary determined using a Bezier curve algorithm of the privacy server;
optionally extending the threshold radial distance to an adjacent boundary of an adjacent neighborhood based a request of the particular user;
generating a separate login to the online community designed to be usable by at least one of a police department, a municipal agency, a neighborhood association, and a neighborhood leader associated with the particular neighborhood;
permitting at least one of the police department, the municipal agency, the neighborhood association, and the neighborhood leader to at least one:
invite residents of the particular neighborhood themselves using the privacy server using a self-authenticating access code that permits new users that enter the self-authenticating access code in the online community to automatically join the particular neighborhood as verified users,
generate at least one of a virtual neighborhood watch group and an emergency preparedness group restricted to users verified in the particular neighborhood using the privacy server,
conduct high value crime and safety related discussions from local police and fire officials that is restricted to users verified in the particular neighborhood using the privacy server,
broadcast information across the particular neighborhood, and
receive and track neighborhood level membership and activity to identify leaders from the restricted group of users verified in the particular neighborhood using the privacy server.

13. The method of claim 12:
transforming the claimable residential address into a claimed address upon an occurrence of an event;
instantiating the event when a particular user is associated with the claimable residential address based on a verification of the particular user as living at a particular residential address associated with the claimable residential address using the privacy server;
constraining the particular user to communicate through the online community only with a set of neighbors having verified addresses using the privacy server;
defining the set of neighbors as other users of the online community that have each verified their addresses in the online community using the privacy server and which have each claimed residential addresses that are in a threshold radial distance from the claimed address of the particular use; and
applying an address verification algorithm associated with each user of the online community using a privacy server.

14. The method of claim 13:
constraining the threshold radial distance to be less than a distance of the neighborhood boundary using the Bezier curve algorithm;
permitting the neighborhood boundary to take on a variety of shapes based on at least one of an associated geographic connotation, a historical connotation, a political connotation, and a cultural connotation of neighborhood boundaries; and applying a database of constraints associated with neighborhood boundaries that are imposed on a map view of the online community when permitting the neighborhood boundary to take on the variety of shapes.

15. The method of claim 14:

generating a user-generated boundary in a form of a polygon describing geospatial boundaries defining the particular neighborhood when a first user of a particular neighborhood that verifies a first residential address of the particular neighborhood using the privacy server prior to other users in that particular neighborhood verifying their addresses in that particular neighborhood places a set of points defining the particular neighborhood using a set of drawing tools in the map view of the online community.

16. The method of claim 15:

permitting each of the restricted group of users verified in the particular neighborhood using the privacy server to:
 share information about a suspicious activity that is likely to affect several neighborhoods,
 explain about a lost pet that might have wandered into an adjoining neighborhood,
 rally support from neighbors from multiple neighborhoods to address civic issues,
 spread information about events comprising a local theater production and a neighborhood garage sale, and
 solicit advice and recommendations from the restricted group of users verified in the particular neighborhood and optionally in the adjacent neighborhood.

17. The method of claim 16:

flagging a neighborhood feed from the particular neighborhood and optionally from the adjacent neighborhood as being inappropriate; and suspending users that repeatedly communicate self-promotional messages that are inappropriate as voted based on a sensibility of any one of the verified users of the particular neighborhood and optionally from the adjacent neighborhood.

18. The method of claim 17:

personalizing which nearby neighborhoods that verified users are able to communicate through based on a request of the particular user; and permitting the neighborhood leader to communicate privately with leaders of an adjoining neighborhood to plan and organize on behalf of an entire constituency of verified users of the particular neighborhood associated with the neighborhood leader.

19. The neighborhood communication system of claim 18:

filtering feeds to only display messages from the particular neighborhood associated with each verified user; and restricting posts only in the particular neighborhood to verified users having verified addresses within the neighborhood boundary.

20. The method of claim 19:

utilizing a set of verification methods to perform verification of the particular user through:
 generating a physical postcard that is postal mailed to addresses of requesting users in the particular neighborhood and having a unique alphanumeric sequence in a form of an access code printed thereon which authenticates users that enter the access code to view and search privileges in the particular neighborhood of the online community;
 verifying the claimable residential address when at least one a credit card billing address and a debit card billing address is matched with an inputted address through an authentication services provider;
 communicating to user profiles of at least one of the police department, the municipal agency, the neighborhood association, and the neighborhood leader an instant access code that is printable at town hall meetings and gatherings sponsored by any one of the police department, the municipal agency, the neighborhood association, and the neighborhood leader;
 authenticating new users when existing verified users agree to a candidacy of new users in the particular neighborhood;
 authenticating new users whose phone number is matched with an inputted phone number through the authentication services provider; and
 authenticating new users whose social security number is matched with an inputted social security number through the authentication services provider.

21. The method of claim 20:

initially setting the particular neighborhood to a pilot phase status in which the online community of the particular neighborhood is provisionally defined until a minimum number of users verify their residential addresses in the particular neighborhood through the privacy server; and automatically deleting profiles of users that remain unverified after a threshold window of time.

22. The method of claim 21 wherein the neighborhood communication system is designed to create private websites to facilitate communication among neighbors and build stronger neighborhoods.

23. A neighborhood communication system comprising:

a privacy server to verify that each user lives at a residence associated with a claimable residential address of the online community formed through a social community module of the privacy server using a processor and a memory;

a network; and a mapping server communicatively coupled with the privacy server through the network to generate a latitudinal data and a longitudinal data associated with each claimable residential address of the online community associated with each user of the online community, wherein the privacy server to automatically determine a set of access privileges in the online community associated with each user of the online community by constraining access in the online community based on a neighborhood boundary determined using a Bezier curve algorithm of the privacy server, wherein the privacy server to transform the claimable residential address into a claimed address upon an occurrence of an event, wherein the privacy server to instantiate the event when a particular user is associated with the claimable residential address based on a verification of the particular user as living at a particular residential address associated with the claimable residential address using the privacy server, wherein the privacy server to constrain the particular user to communicate through the online community only with a set of neighbors having verified addresses using the privacy server, wherein the privacy server to define the set of neighbors as other users of the online community that have each verified their addresses in the online community using the privacy server and which have each claimed residential addresses that are in a threshold radial distance from the claimed address of the particular user, wherein the privacy server to optionally extend the threshold radial distance to an adjacent boundary of an adjacent neighborhood based a request of the particular user, wherein the privacy server to generate a separate login to the online community designed to be usable by at least one of a police department, a municipal agency, a neighborhood association, and a neighborhood leader associated with the particular neighborhood, wherein the separate login to permit at least one of the police department, the municipal agency, the neighborhood association, and the neighborhood leader to:
- invite residents of the particular neighborhood themselves using the privacy server using a self-authenticating access code that permits new users that enter the self-authenticating access code in the online community to automatically join the particular neighborhood as verified users,
- generate at least one of a virtual neighborhood watch group and an emergency preparedness group restricted to users verified in the particular neighborhood using the privacy server,
- conduct high value crime and safety related discussions from local police and fire officials that is restricted to users verified in the particular neighborhood using the privacy server,
- broadcast information across the particular neighborhood, and
- receive and track neighborhood level membership and activity to identify leaders from the restricted group of users verified in the particular neighborhood using the privacy server.

24. The neighborhood communication system of claim 23:

wherein the privacy server to constrain the threshold radial distance to be less than a distance of the neighborhood boundary using the Bezier curve algorithm, wherein the privacy server to permit the neighborhood boundary to take on a variety of shapes based on at least one of an associated geographic connotation, a historical connotation, a political connotation, and a cultural connotation of neighborhood boundaries, wherein the privacy server to apply a database of constraints associated with neighborhood boundaries that are imposed on a map view of the online community when permitting the neighborhood boundary to take on the variety of shapes, wherein the privacy server to apply an address verification algorithm associated with each user of an online community, and wherein the privacy server to generate a user-generated boundary in a form of a polygon describing geospatial boundaries defining the particular neighborhood when a first user of a particular neighborhood that verifies a first residential address of the particular neighborhood using the privacy server prior to other users in that particular neighborhood verifying their addresses in that particular neighborhood places a set of points defining the particular neighborhood using a set of drawing tools in the map view of the online community.

25. The neighborhood communication system of claim 24:

wherein the privacy server to permit each of the restricted group of users verified in the particular neighborhood using the privacy server to:
- share information about a suspicious activity that is likely to affect several neighborhoods,
- explain about a lost pet that might have wandered into an adjoining neighborhood,
- rally support from neighbors from multiple neighborhoods to address civic issues,
- spread information about events comprising a local theater production and a neighborhood garage sale, and
- solicit advice and recommendations from the restricted group of users verified in the particular neighborhood and optionally in the adjacent neighborhood.

26. The neighborhood communication system of claim 25:

wherein the privacy server to flag a neighborhood feed from the particular neighborhood and optionally from the adjacent neighborhood as being inappropriate, wherein the privacy server to suspend users that repeatedly communicate self-promotional messages that are inappropriate as voted based on a sensibility of any one of the verified users of the particular neighborhood and optionally from the adjacent neighborhood, wherein the privacy server to personalize which nearby neighborhoods that verified users are able to communicate through based on a request of the particular user, wherein the privacy server to permit the neighborhood leader to communicate privately with leaders of an adjoining neighborhood to plan and organize on behalf of an entire constituency of verified users of the particular neighborhood associated with the neighborhood leader, wherein the privacy server to filter feeds to only display messages from the particular neighborhood associated with each verified user, and wherein the privacy server to restrict posts only in the particular neighborhood to verified users having verified addresses within the neighborhood boundary.

27. The neighborhood communication system of claim 26:

wherein the privacy server to initially set the particular neighborhood to a pilot phase status in which the online community of the particular neighborhood is provisionally defined until a minimum number of users verify their residential addresses in the particular neighborhood through the privacy server, wherein the privacy server to automatically delete profiles of users that remain unverified after a threshold window of time, wherein the neighborhood communication system is designed to create private websites to facilitate communication among neighbors and build stronger neighborhoods, and wherein the address verification algorithm of the privacy server utilizes a set of verification methods to perform verification of the particular user through any of a:

a postcard verification method through which the privacy server generates a physical postcard that is postal mailed to addresses of requesting users in the particular neighborhood and having a unique alphanumeric sequence in a form of an access code printed thereon which authenticates users that enter the access code to view and search privileges in the particular neighborhood of the online community, a credit card verification method through which the privacy server verifies the claimable residential address when at least one a credit card billing address and a debit card billing address is matched with an inputted address through an authentication services provider, a privately-published access code method through which the privacy server communicates to user profiles of at least one of the police department, the municipal agency, the neighborhood association, and the neighborhood leader an instant access code that is printable at town hall meetings and gatherings sponsored by any one of the police department, the municipal agency, the neighborhood association, and the neighborhood leader, a neighbor vouching method through which the privacy server authenticates new users when existing verified users agree to a candidacy of new users in the particular neighborhood, a phone verification method through which the privacy server authenticates new users whose phone number is matched with an inputted phone number through the authentication services provider, and a social security verification method through which the privacy server authenticates new users whose social security number is matched with an inputted social security number through the authentication services provider.

* * * * *